US008489981B2

(12) United States Patent
Flake et al.

(10) Patent No.: US 8,489,981 B2
(45) **Date of Patent: *Jul. 16, 2013**

(54) LOOK AHEAD OF LINKS/ALTER LINKS

(75) Inventors: Gary W. Flake, Bellevue, WA (US); William H. Gates, III, Redmond, WA (US); Roderick A. Hyde, Redmond, WA (US); Edward K. Y. Jung, Bellevue, WA (US); Royce A. Levien, Lexington, MA (US); Robert W. Lord, Seattle, WA (US); Mark A. Malamud, Seattle, WA (US); Richard F. Rashid, Redmond, WA (US); John D. Rinaldo, Jr., Bellevue, WA (US); Clarence T. Tegreene, Bellevue, WA (US); Charles Whitmer, North Bend, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1018 days.

This patent is subject to a terminal disclaimer.

(21) Appl. No.: 12/214,784

(22) Filed: Jun. 20, 2008

(65) Prior Publication Data

US 2009/0164992 A1 Jun. 25, 2009

Related U.S. Application Data

(63) Continuation-in-part of application No. 12/154,148, filed on May 20, 2008, and a continuation-in-part of application No. 12/154,423, filed on May 22, 2008, and a continuation-in-part of application No. 12/154,436, filed on May 22, 2008, and a continuation-in-part of application No. 12/005,064, filed on Dec. 21, 2007, now abandoned, and a continuation-in-part of application No. 12/005,637, filed on Dec. 27, 2007, now abandoned, and a continuation-in-part of application No. 12/074,855, filed on Mar. 6, 2008.

(51) Int. Cl.
*G06F 9/455* (2006.01)
*G06F 17/30* (2006.01)

(52) U.S. Cl.
USPC .......................................... 715/208; 715/812

(58) Field of Classification Search
USPC .................................................... 715/812, 1
See application file for complete search history.

(56) References Cited

U.S. PATENT DOCUMENTS 5,619,710 A 4/1997 Travis, Jr. et al.
6,125,387 A 9/2000 Simonoff et al.

(Continued)

FOREIGN PATENT DOCUMENTS

WO WO2007/106185 9/2007

OTHER PUBLICATIONS

Garfinkel et al., A Virtual Machine Introspection Based Architecture for Intrusion Detection, Google 2003, pp. 1-16.*

(Continued)

*Primary Examiner* — Andrea Leggett
(74) *Attorney, Agent, or Firm* — Suiter Swantz pc llo

(57) ABSTRACT

A computationally-implemented method comprises retrieving at least a portion of data from a data source, determining an acceptability of an effect of the retrieved at least a portion of the data at least in part via a virtual machine representation of at least a part of an end user's real machine having one or more end-user specified preferences, and providing at least one data display option to the end user's real machine based on the determining acceptability of the effect of the retrieved at least a portion of the data.

35 Claims, 40 Drawing Sheets

U.S. PATENT DOCUMENTS

| | | | | |
|---|---|---|---|---|
| 6,353,850 | B1 | 3/2002 | Wies et al. | |
| 6,424,979 | B1 | 7/2002 | Livingston et al. | |
| 6,510,458 | B1 | 1/2003 | Berstis et al. | |
| 6,572,662 | B2 | 6/2003 | Manohar et al. | |
| 6,665,659 | B1 | 12/2003 | Logan | |
| 6,850,252 | B1 | 2/2005 | Hoffberg | |
| 6,990,590 | B2 | 1/2006 | Hanson et al. | |
| 7,069,562 | B2 | 6/2006 | Kushnirskiy et al. | |
| 7,181,744 | B2 | 2/2007 | Shultz et al. | |
| 7,188,216 | B1 | 3/2007 | Rajkumar et al. | |
| 7,730,190 | B2 | 6/2010 | Coile et al. | |
| 7,818,215 | B2 | 10/2010 | King et al. | |
| 7,920,714 | B2 | 4/2011 | O'Neil | |
| 2002/0095411 | A1 | 7/2002 | Caldwell et al. | |
| 2002/0174185 | A1 | 11/2002 | Rawat et al. | |
| 2003/0009495 | A1 | 1/2003 | Adjaoute | |
| 2003/0014659 | A1 | 1/2003 | Zhu | |
| 2003/0172050 | A1 | 9/2003 | Decime et al. | |
| 2004/0073924 | A1 | 4/2004 | Pendakur | |
| 2004/0122856 | A1 | 6/2004 | Clearwater | |
| 2005/0050222 | A1 | 3/2005 | Packer | |
| 2005/0060365 | A1 | 3/2005 | Robinson et al. | |
| 2005/0278333 | A1 | 12/2005 | Daniels et al. | |
| 2006/0031505 | A1 | 2/2006 | Ashley | |
| 2006/0047663 | A1* | 3/2006 | Rail | 707/10 |
| 2006/0059091 | A1 | 3/2006 | Wang et al. | |
| 2006/0072724 | A1 | 4/2006 | Cohen et al. | |
| 2006/0101514 | A1 | 5/2006 | Milener et al. | |
| 2006/0206715 | A1 | 9/2006 | Cowan et al. | |
| 2006/0259592 | A1 | 11/2006 | Angeline | |
| 2006/0271395 | A1 | 11/2006 | Harris et al. | |
| 2007/0053513 | A1 | 3/2007 | Hoffberg | |
| 2007/0067775 | A1* | 3/2007 | Shultz et al. | 718/102 |
| 2007/0271610 | A1 | 11/2007 | Grobman | |
| 2007/0288589 | A1 | 12/2007 | Chen et al. | |
| 2007/0294689 | A1 | 12/2007 | Garney | |
| 2008/0004802 | A1 | 1/2008 | Horvitz | |
| 2008/0005264 | A1 | 1/2008 | Brunell et al. | |
| 2008/0046592 | A1 | 2/2008 | Gilhuly et al. | |
| 2008/0133540 | A1 | 6/2008 | Hubbard et al. | |
| 2008/0155602 | A1 | 6/2008 | Collet et al. | |
| 2008/0199042 | A1 | 8/2008 | Smith | |
| 2008/0244579 | A1 | 10/2008 | Muller | |
| 2008/0289023 | A1* | 11/2008 | Wardrop | 726/9 |
| 2008/0307066 | A1 | 12/2008 | Amidon et al. | |
| 2009/0024592 | A1 | 1/2009 | Lazarski et al. | |
| 2009/0164924 | A1 | 6/2009 | Flake et al. | |
| 2009/0164993 | A1 | 6/2009 | Flake et al. | |
| 2009/0165134 | A1 | 6/2009 | Flake et al. | |
| 2009/0319462 | A1 | 12/2009 | Tirpak et al. | |
| 2011/0016468 | A1 | 1/2011 | Singh | |
| 2011/0033080 | A1 | 2/2011 | King et al. | |
| 2011/0041084 | A1* | 2/2011 | Karam | 715/753 |
| 2011/0228791 | A1 | 9/2011 | Flinta et al. | |
| 2012/0054367 | A1 | 3/2012 | Ramakrishnan et al. | |
| 2012/0208510 | A1 | 8/2012 | Engstrom et al. | |

OTHER PUBLICATIONS

Wade Roush, VMware Flaw Shows Virtualized Systems Aren't Necessarily More Secure, Boston Firm Argues, Feb. 27, 2008, p. 3, Publisher: http://www.xconomy.com/boston/2008/02/27/vmware-flaw-shows-virtualized-systems-arent-necessari . . . , Published in: US.

Wade Roush, Microsoft Delivers Surprise Early Challenge to WMware, Dec. 14, 2007, p. 2, Publisher: http://www.xconomy.com/boston/2007/12/14/microsoft-deliver-surprise-early-challenge-to-vmware/, Published in: US.

Wade Roush, New VMware Acquisition Thinstall Helps Companies Say Goodbye to Installing Windows Software, Jan. 15, 2008, p. 3, Publisher: http://www.xconomy.com/boston/2008/01/15/new-vmware-acquisition-thinstall-helps-companies-say- . . . , Published in: US.

Erik Mellgren, VMware Sees Sweet Future for B-hive, May 29, 2008, p. 3, Publisher: http://www.xconomy.com/boston/2008/05/29/vmware-sees-sweet-futre-for-b-hive/, Published in: US.

Wade Roush, VMware Feeling Pressure as Virtualization Becomes A Commodity, Nov. 14, 2007, p. 4, Publisher: http:/www.xconomy.com/boston/2007/11/14/vmware-feeling-pressure-as-virtualization-becomes-a-co . . . , Published in: US.

Erik Mellgren, Battery Ventures Invests in 'Endpoint Virtualization' Company Neocleus, Jun. 18, 2008, p. 2, Publisher: www.xconomy.com/boston/2008/06/18/battery-ventures-invests-in-endpoint-virtualization-comp . . . , Published in: US.

Garfinkel et al.; "A Virtual Machine Introspection Based Architecture for Intrusion Detection"; In Proc. Network and Distributed Systems Security Symposium; bearing a date of 2003 and printed on Feb. 3, 2012; pp. 191-206.

"VMware Virtual SMP"; VMware, Inc.; bearing a date of 2007; 1 page; located at www.vmware.com.

Zhang et al.; "The Role of URLs in Objectionable Web Content Categorization"; Proceedings of the 2006 IEEE/WIC/ACM International Conference on Web Intelligence; bearing a date of 2006; 7 pages; IEEE.

Anderson, Kenneth M.; "Integrating Open Hypermedia Systems with the World Wide Web"; ACM; bearing a date of 1997; pp. 1-10; ACM.

Diamadis et al.; "Efficient cooperative searching on the Web: system design and evaluation"; International Journal of Human-Computer Studies; bearing a date of 2004; pp. 699-724; vol. 61; Elsevier Ltd.

* cited by examiner

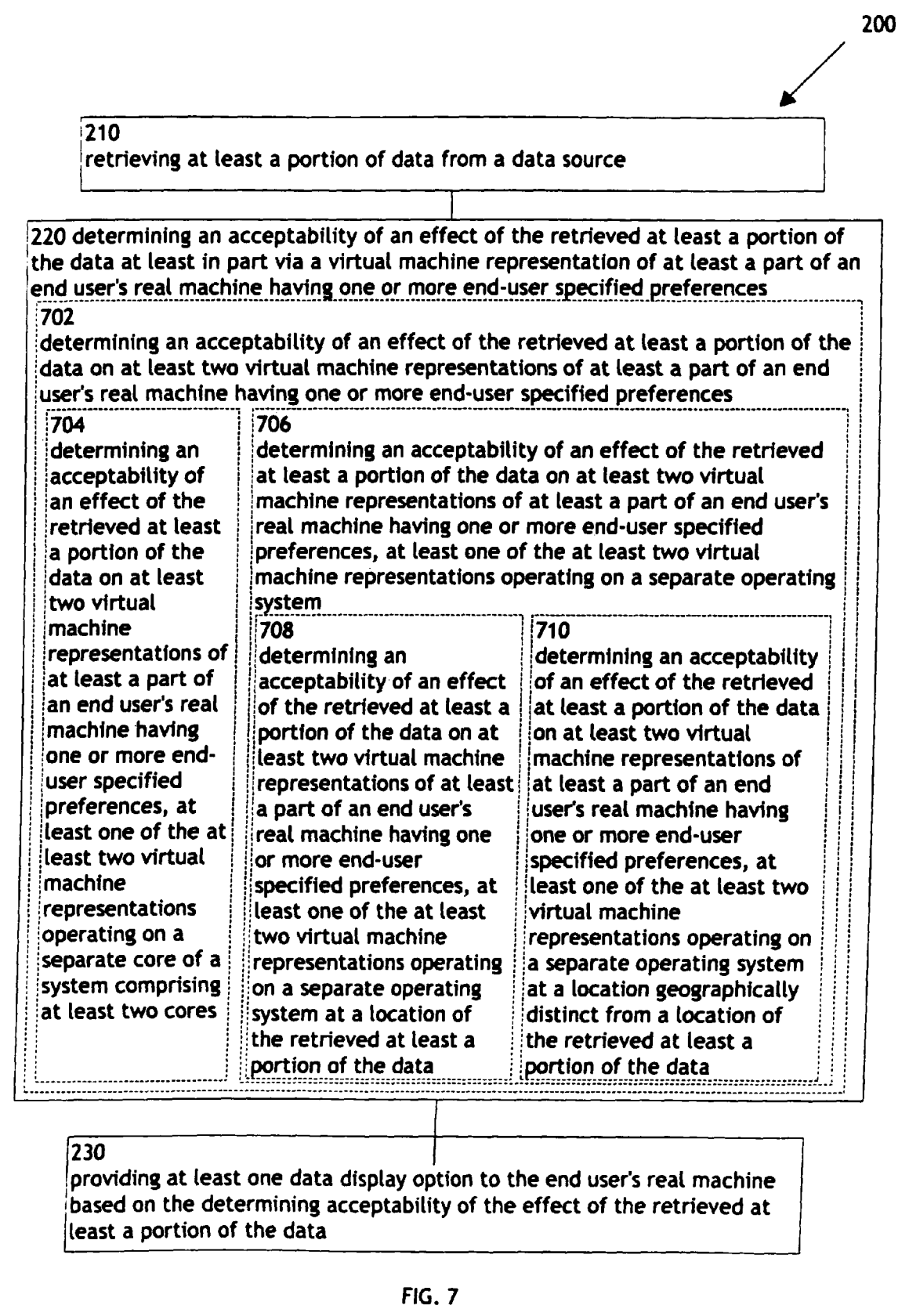

200

210
retrieving at least a portion of data from a data source 220 determining an acceptability of an effect of the retrieved at least a portion of the data at least in part via a virtual machine representation of at least a part of an end user's real machine having one or more end-user specified preferences 702
determining an acceptability of an effect of the retrieved at least a portion of the data on at least two virtual machine representations of at least a part of an end user's real machine having one or more end-user specified preferences 704
determining an acceptability of an effect of the retrieved at least a portion of the data on at least two virtual machine representations of at least a part of an end user's real machine having one or more end-user specified preferences, at least one of the at least two virtual machine representations operating on a separate core of a system comprising at least two cores 706
determining an acceptability of an effect of the retrieved at least a portion of the data on at least two virtual machine representations of at least a part of an end user's real machine having one or more end-user specified preferences, at least one of the at least two virtual machine representations operating on a separate operating system 708
determining an acceptability of an effect of the retrieved at least a portion of the data on at least two virtual machine representations of at least a part of an end user's real machine having one or more end-user specified preferences, at least one of the at least two virtual machine representations operating on a separate operating system at a location of the retrieved at least a portion of the data 710
determining an acceptability of an effect of the retrieved at least a portion of the data on at least two virtual machine representations of at least a part of an end user's real machine having one or more end-user specified preferences, at least one of the at least two virtual machine representations operating on a separate operating system at a location geographically distinct from a location of the retrieved at least a portion of the data 230
providing at least one data display option to the end user's real machine based on the determining acceptability of the effect of the retrieved at least a portion of the data

FIG. 7

LOOK AHEAD OF LINKS/ALTER LINKS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application entitled LOOK AHEAD OF LINKS/ALTER LINKS, naming Gary W. Flake William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed 21 Dec. 2007, application Ser. No. 12/005,064, now abandoned which is currently co-pending, or is an application of which a currently co-pending application is entitled to the benefit of the filing date.
2. For purposes of the USPTO extra-statutory requirements, the present application constitutes a continuation-in-part of U.S. patent application entitled LOOK AHEAD OF LINKS/ALTER LINKS, naming Gary W. Flake William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed Dec. 27, 2007, application Ser. No. 12/005,637, now abandoned which is currently co-pending, or is an application of which a currently co-pending application is entitled to the benefit of the filing date.
3. For purposes of the USPTO extra-statutory requirements, the present application constitutes a continuation-in-part of U.S. patent application entitled LOOK AHEAD OF LINKS/ALTER LINKS, naming Gary W. Flake William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed Mar. 6, 2008, application Ser. No. 12/074,855, which is currently co-pending, or is an application of which a currently co-pending application is entitled to the benefit of the filing date.
4. For purposes of the USPTO extra-statutory requirements, the present application constitutes a continuation-in-part of United States Patent Application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed May 20, 2008, application Ser. No. 12/154,148, which is currently co-pending, or is an application of which a currently co-pending application is entitled to the benefit of the filing date.
5. For purposes of the USPTO extra-statutory requirements, the present application constitutes a continuation-in-part of United States Patent Application entitled LOOK AHEAD OF LINKS/ALTER LINKS, naming Gary W. Flake; William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed May 22, 2008, application Ser. No. 12/154,423 which is currently co-pending, or is an application of which a currently co-pending application is entitled to the benefit of the filing date.
6. For purposes of the USPTO extra-statutory requirements, the present application constitutes a continuation-in-part of United States Patent Application entitled LOOK AHEAD OF LINKS/ALTER LINKS, naming Gary W. Flake William H. Gates, III; Roderick A. Hyde; Edward K. Y. Jung; Royce A. Levien; Robert W. Lord; Mark A. Malamud; Richard F. Rashid; John D. Rinaldo, Jr.; Clarence T. Tegreene; Charles Whitmer; and Lowell L. Wood, Jr. as inventors, filed May 22, 2008, application Ser. No. 12/154,436 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

BACKGROUND

Web sites often contain links to other web sites enabling a user to navigate from one web site to another. Certain links may contain data that may compromise security and/or privacy. Certain links may contain data that a user may not desire to view.

SUMMARY

A computationally implemented method includes, but is not limited to: retrieving at least a portion of data from a data source; determining an acceptability of an effect of the retrieved at least a portion of the data at least in part via a virtual machine representation of at least a part of an end user's real machine having one or more end-user specified preferences; and providing at least one data display option to the end user's real machine based on the determining acceptability of the effect of the retrieved at least a portion of the data. In addition to the foregoing, other computationally implemented method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for retrieving at least a portion of data from a data source; means for determining an acceptability of an effect of the retrieved at least a portion of the data at least in part via a virtual machine representation of at least a part of an end user's real machine having one or more end-user specified preferences; and means for providing at least one data display option to the end user's real machine based on the determining acceptability of the effect of the retrieved at least a portion of the data In addition to the foregoing, other system aspects are described in the claims, drawings, and text forming a part of the present disclosure.

A computationally implemented system includes, but is not limited to: circuitry for retrieving at least a portion of data from a data source; circuitry for determining an acceptability of an effect of the retrieved at least a portion of the data at least in part via a virtual machine representation of at least a part of an end user's real machine having one or more end-user specified preferences; and circuitry for providing at least one data display option to the end user's real machine based on the determining acceptability of the effect of the retrieved at least a portion of the data. In addition to the foregoing, other system aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 7 illustrates an alternative embodiment of the operational flow of FIG. 2.

DETAILED DESCRIPTION

Figure 1A:
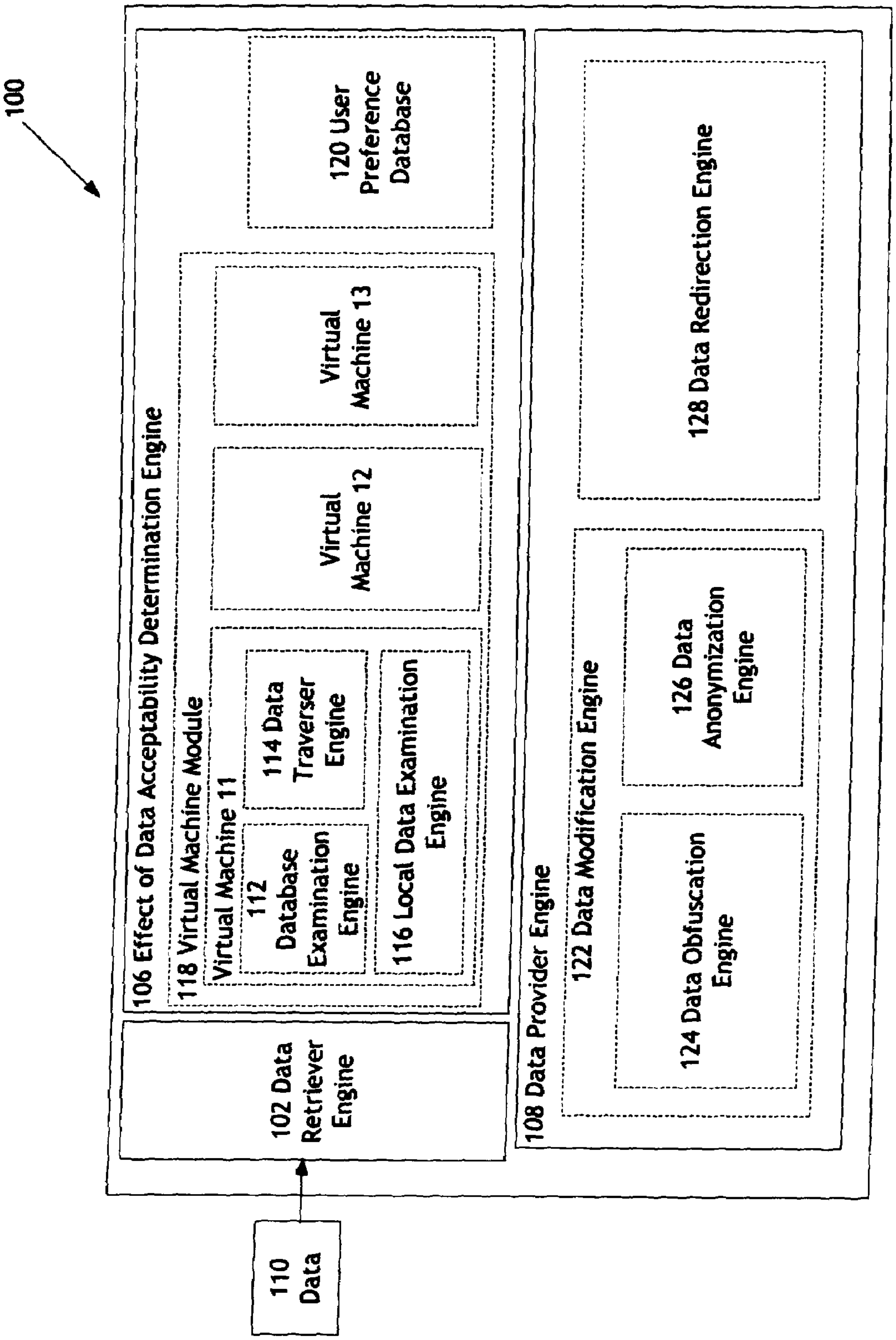
FIG. 1A illustrates an exemplary environment in which one or more technologies may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1A, a system 100 related to looking ahead for data is illustrated. The system 100 may include a data retriever engine 102, an Effect of data acceptability determination engine 106, and a data provider engine 108. Effect of data acceptability determination engine 106 may include a virtual machine module 118 including one or more virtual machines 11, 12, and/or 13, further including a database examination engine 112, a data traverser engine 114, and a local data examination engine 116, and a user preference database 120. Data provider engine 108 may include a data modification engine 122 that may further include a data obfuscation engine 124 and a data anonymization engine 126. Data provider engine 108 may also include a data redirection engine 128.

Figure 1B:
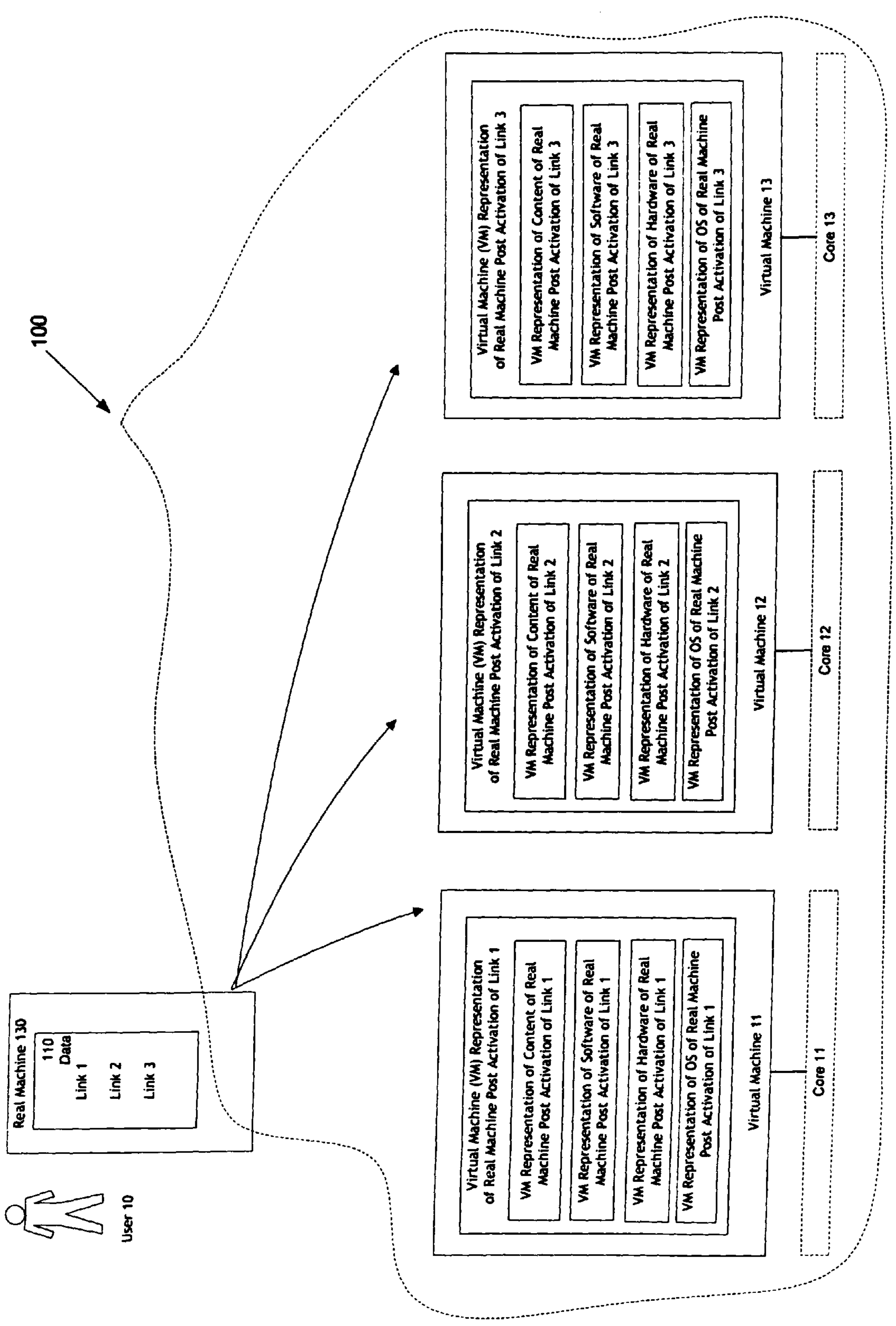
FIG. 1B illustrates an operational view of a real machine in which at least a portion of the system illustrated in FIG. 1A has been implemented.

FIG. 1B shows an operational view of real machine 130 (e.g., a desktop, notebook, or other type computing system, including or excluding one or more peripheral devices) in which at least a portion of system 100 (FIG. 1A) has been implemented. In some instances, system 100 is at least partially implemented in a single core processor at least partially resident within real machine 130 (e.g., one or more virtual machines of virtual machine module 118 at least partially implemented on a single-core processor of real machine 130). In other instances, system 100 is at least partially implemented in a multi-core processor at least partially resident within real machine 130 (e.g., one or more virtual machines of virtual machine module 118 at least partially respectively implemented on one or more cores of a multi-core processor of real machine 130). In other instances, system 100 is at least partially implemented in a single-core processor at least partially non-resident within real machine 130 (e.g., one or more virtual machines of virtual machine module 118 at least partially implemented on a single-core processor of a hosting site/machine/system physically distal from real machine 130). In other instances, system 100 is at least partially implemented in a multi-core processor at least partially non-resident within real machine 130 (e.g., one or more virtual machines of virtual machine module 118 at least partially respectively implemented on one or more cores of a multi-core processor of a hosting site/machine/system physically distal from real machine 130).

FIG. 1B depicts real machine 130 containing data 110 (e.g., a Web page) containing Link 1, Link 2, and Link 3. FIG. 1B illustrates an example in which at least a part of system 100 traverses Link 1, Link 2, and Link 3 of data 110 via virtual machine representations of real machine 130. In some instances, such virtual machine traversals are utilized to prospectively determine what might happen should real machine 130 be used to traverse such links. For example, determining how such traversal(s) might compare to one or more user-associated preferences of real machine 130 (e.g., that user 10 prefers to visit sites having content acceptable to a defined organization, such a government; that user 10 prefers not to visit sites having malware or spyware; that user 10 prefers not to visit sites that reset real machine hardware options (e.g., audio/visual peripherals); that user 10 prefers not to visit sites that reset real machine software options (e.g., proxy servers); etc.). User-associated preferences of real machine 130 may be stored in user preference database 120 (FIG. 1A) of Effect of data acceptability determination engine 106 (FIG. 1A). User preference database 120 may contain user preferences with respect to content of the real machine 130, hardware of the real machine 130, software of the real machine 130 and an operating system of the real machine 130. User preference database 120 may be in communication with virtual machine module 118 (FIG. 1A). Specifically, virtual machine module 118 (FIG. 1A) may receive user preference database information from user preference database 120 (FIG. 1A) and spawn a copy of at least a portion of user preference database 120 (FIG. 1A) on each of virtual machines 11, 12, and/or 13.

FIG. 1B further illustrates virtual machine 11. Virtual machine 11 may be illustrated as included in virtual machine module 118 (FIG. 1A) of Effect of data acceptability determination engine 106 (FIG. 1A). FIG. 1B shows virtual machine 11 encompassing a virtual machine representation of real machine 130, post (e.g. subsequent to) activation of Link 1 (e.g., as at least a part of real machine 130 would exist had link 1 actually been traversed on real machine 130). FIG. 1B depicts virtual machine 11 including a virtual machine representation of the content of the real machine 130 post activation of Link 1. Examples of such content include a movie file, a music file, a script (e.g., Java script or Active X control), a markup language, an email, etc., downloaded onto real machine 130 from one or more sources associated with activation/traversal of Link 1.

FIG. 1B also illustrates virtual machine 11 including a virtual machine representation of software (e.g., a state of software) of the real machine 130 post (e.g. subsequent to) activation of Link 1. Examples of such software might include a commercial word processing program or suite of programs (e.g. Microsoft® Office for Windows), an open source Web browser (e.g., Mozilla's Firefox® Browser), an AJAX mash up (e.g., an executing JavaScript™ and/or data retrieved by same via an XML-like scheme), or a commercial database management system (e.g., one or more of Oracle Corporation's various products), a commercial anti-malware/spyware programs (e.g., such as those of Symantec Corporation or McAfee, Inc.), etc.

FIG. 1B also illustrates virtual machine 11 including a virtual machine representation of hardware (e.g. a state of the hardware) of the real machine 130 post activation of Link 1. Examples of such hardware might include all or part of a chipset (e.g., data processor and/or graphics processor chipsets such as those of Intel Corporation and/or NvidiaCorporation), a memory chip (e.g., flash memory and/or random access memories such as those of Sandisk Corporation and/or Samsung Electronics, Co., LTD), a data bus, a hard disk (e.g., such as those of Seagate Technology, LLC), a network adapter (e.g., wireless and/or wired LAN adapters such as those of Linksys and/or CiscoTechnology, Inc.), printer, a removable drive (e.g., flash drive), a cell phone, etc.

FIG. 1B also illustrates virtual machine 11 including a virtual machine representation of an operating system (e.g., a state of an operating system and/or network operating system) of the real machine 130 post activation of Link 1. Examples of such an operating system might include a computer operating system (e.g., e.g. Microsoft® Windows 2000, Unix, Linux, etc) and/or a network operating system (e.g., the Internet Operating System available from Cisco Technology, Inc. Netware® available from Novell, Inc., and/or Solaris available from Sun Microsystems, Inc.).

FIG. 1B also illustrates that virtual machine 11 may run on core 11 of a multi-core processor. In addition to the herein, those skilled in the art will appreciate that the virtual machine representations discussed herein are not limited to specific examples described, but instead include any components of real machine 130 as such might be understood in the art. Examples of the foregoing would include firmware, logic associated with display units, logic associated with robotics, application specific integrated circuits, etc.

As noted, in some instances system 100 may traverse (e.g. view) links of data 110 via one or virtual machine representations of at least a part of real machine 130. Accordingly, FIG. 1B shows virtual machine 12 encompassing a virtual machine representation of real machine 130 (e.g., one or more states of one or more components associated with real machine 130), post activation of Link 2. FIG. 1B depicts virtual machine 12 at least partly running on core 12 of a multi-core processor. Virtual machine module 118 (FIG. 1A) of Effect of data acceptability determination engine 106 (FIG. 1A) may be illustrated to include virtual machine 12.

FIG. 1B also illustrates virtual machine 12 may include a virtual machine representation of content (e.g. a video) of real machine 130 post activation of Link 2, a virtual machine representation of software (e.g. Microsoft Office for Windows) of real machine 130 post activation of Link 2, a virtual machine representation of hardware (e.g. the circuitry or processor of the real machine) of real machine 130 post activation of Link 2, and a virtual machine representation of operating system (e.g. Microsoft Windows 2000, XP, Vista) of real machine 130 post activation of Link 2.

As noted, in some instances system 100 may traverse links of data 110 via one or more virtual machine representations of at least a part of real machine 130. Accordingly, FIG. 1B shows virtual machine 13 encompassing a virtual machine representation of real machine 130, post activation of Link 3 (e.g., representative of one or more states of one or more hardware/software/firmware components of/resident within real machine 130). The foregoing constitutes one example of how system 100 may use virtual machine 13 to traverse Link 3 (e.g. download a media player as requested by activation of Link 3). Virtual machine module 118 (FIG. 1A) of Effect of data acceptability determination engine 106 (FIG. 1A) may include virtual machine 13. FIG. 1B further illustrates virtual machine 13 may include a virtual machine representation of the content (e.g. a markup language) of the real machine 130 post activation of Link 3, a virtual machine representation of the software (e.g. Unix) of the real machine 130 post activation of Link 3, a virtual machine representation of the hardware (e.g. a hard disk) of the real machine 130 post activation of Link 3, and a virtual machine representation of the operating system (e.g. Solaris Operating System) of the real machine 130 post activation of Link 3. FIG. 1B shows that virtual machine 13 may be run on core 13 of a multi-core processor.

Upon traversal of links 1, 2, and 3 by virtual machines 11, 12, and/or 13, respectively, each of virtual machines 11, 12, and/or 13 may determine whether an effect of the retrieved data is acceptable to a user based on a user's preferences. Virtual machines 11, 12, and/or 13 may compare the traversed data to one or more user preferences stored in a user preference database 120 (FIG. 1A). User preference database information may be communicated to virtual machine module 118 (FIG. 1A) and a copy of at least a portion of user preference database 120 may be spawned (e.g. generated) on each of virtual machines 11, 12, and/or 13. Virtual machines 11, 12, and/or 13 may communicate the results of a respective comparison of activation of a link (e.g. loading at least a portion of a link's content onto a virtual machine 11, 12, and/or 13) to a user preference (e.g. a preference not to load malware onto a user's real machine) to virtual machine module 118 (FIG. 1A). Virtual machine module 118 (FIG. 1A) may communicate the results of a comparison of activation of a link to a user preference to Effect of data acceptability determination engine 106 (FIG. 1A). Effect of data acceptability determination engine 106 may communicate the comparison to the data provider engine 108 (FIG. 1A). The data provider engine 108 may then provide the results (e.g. one or more weblinks approved for viewing) to a real machine 130 (e.g. a computing device with or without associated peripherals) that may be viewable to a user 10 on a display.

Figure 1C:
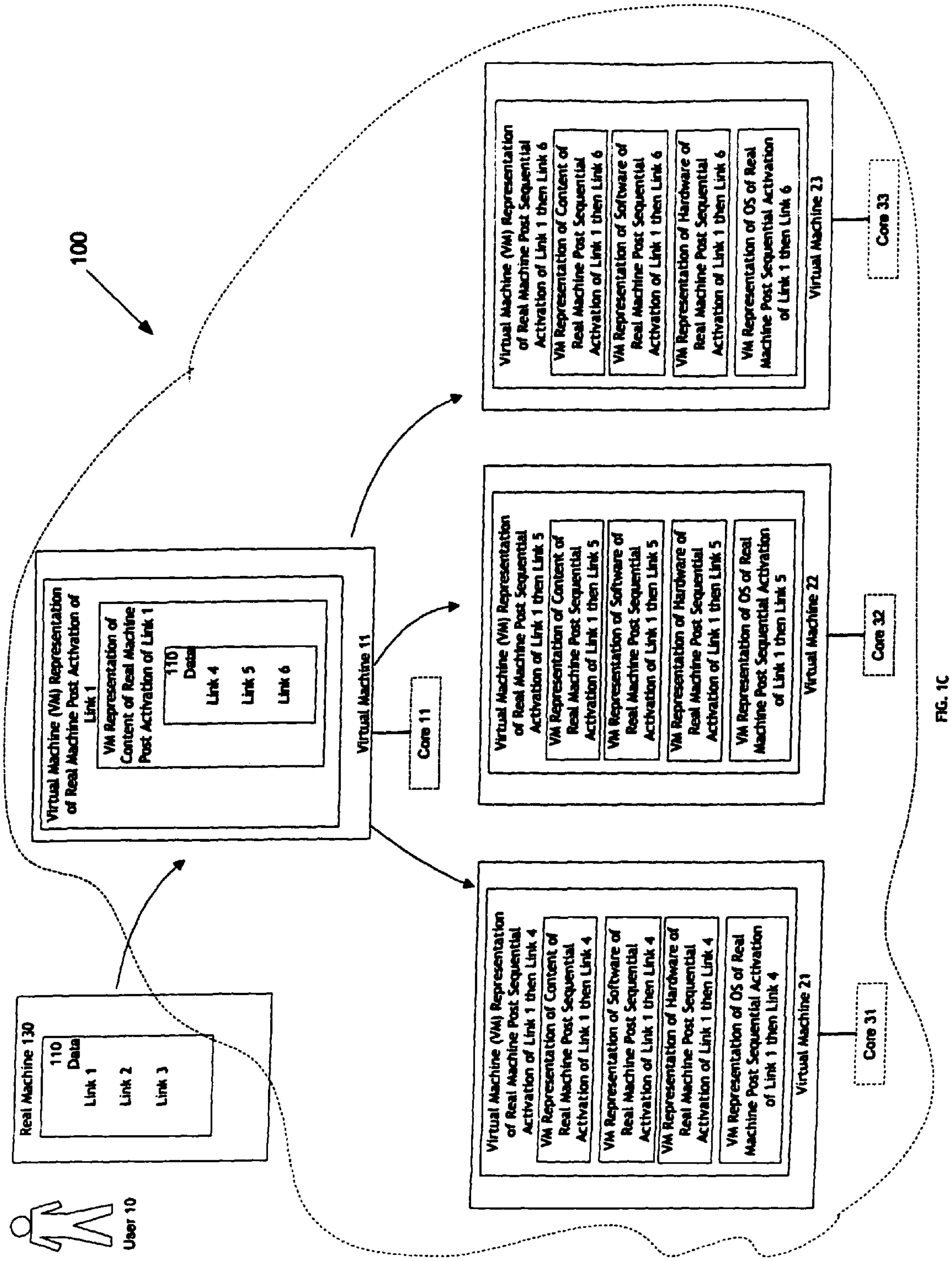
FIG. 1C illustrates an operational view of a real machine in which at least a portion of the system illustrated in FIG. 1A has been implemented.

FIG. 1C shows a partial follow-on operational view of real machine 130 (e.g., a desktop, notebook, or other type computing system of an end user) in which at least a portion of system 100 (FIG. 1A) has been implemented (e.g., a follow-on operational view of the systems/methods illustrated as in FIG. 1B). Specifically, FIG. 1C shows a drill-down view of an example of the virtual machine 11 including a virtual machine representation of the content of the real machine 130 post activation of Link 1 (e.g., a drill-down on the systems/methods shown/described in relation to FIG. 1B). In this drill down example, depicted is the virtual machine representation of the content of the real machine 130 post activation of Link 1. In the example shown, the content is depicted as data 110 having Link 4, Link 5 and Link 6. As a specific example, data 110 could be a Web page containing embedded Link 4 to an advertisement, Link 5 to a video file, and Link 6 to a still image file.

In some instances, system 100 may use additional virtual machine representations of at least a part of real machine 130 to prospectively traverse Link 4, Link 5, and Link 6. Accordingly, FIG. 1C illustrates system 100 generating virtual machine representations of real machine 130, used to traverse Links 4, 5, and 6, in the context of virtual machines 21, 22, and 23, respectively. Those skilled in the art will thus appreciate that, in the example shown in FIG. 1C, system 100 is creating second-order virtual machine representations to prospectively investigate the effects on the states of various components of real machine 130 via sequential traversals of links. That is, the virtual machine representations of real machine 130 encompassed in virtual machine 21, virtual machine 22, and virtual machine 23 of FIG. 1C are generated by system 100 based on the first-order virtual machine representation of virtual machine 11 as shown/described in relation to FIG. 1B.

Upon traversal of links 4, 5, and 6 by virtual machines 21, 22, and 23, respectively, each of virtual machines 21, 22, and 23 may determine whether an effect of the retrieved data is acceptable to a user based on a user's preferences. Virtual machines 21, 22, and 23 may compare the traversed data to one or more user preferences stored in a user preference database 120 (FIG. 1A). As previously described, user preference database information may be communicated to virtual machine module 118 (FIG. 1A), and a copy of at least a portion of user preference database 120 may be spawned (e.g. generated) on each of virtual machines 11, 12, and/or 13. Virtual machine 11 may then communicate user preference database information (e.g., a preference to prevent installation of shareware onto an end user's real machine) to each of virtual machines 21, 22, and 23, and a copy of a user preference database 120 (FIG. 1A) may be spawned on each of virtual machines 21,22, and 23. Virtual machines 21, 22, and 23 may communicate the results of a respective comparison of an activation of a link (e.g. loading at least a portion of a link's content onto a virtual machine 21, 22, and/or 23) to a user preference (e.g. a preference to prevent installation of a rootkit onto a user's real machine) to virtual machine 11. Virtual machine 11 may communicate the results of a comparison to virtual machine module 118 (FIG. 1A). Virtual machine module 118 (FIG. 1A) may communicate the results of a comparison of an activation of a link to a user preference to effect of data acceptability determination engine 106 (FIG. 1A). Effect of data acceptability determination engine 106 may communicate the comparison to the data provider engine 108 (FIG. 1A). The data provider engine 108 may then provide the results (e.g. one or more weblinks approved for viewing) to a real machine 130 (e.g. an end user's computing device with or without associated peripherals) that may be viewable to a user 10 on a display.

FIG. 1C shows virtual machine 21 encompassing a virtual machine representation of real machine 130 post (e.g. subsequent to) a sequential activation of Link 1 (e.g., as shown on FIG. 1B) then Link 4 (e.g., as shown on FIG. 1C). FIG. 1C depicts that in one instance virtual machine 21 may be run on core 31 of a multi-core processor. FIG. 1C depicts system 100 traversing Link 4 via a virtual machine representation of real machine 130 encompassed within virtual machine 21. Accordingly, FIG. 1C illustrates virtual machine 21 including a virtual machine representation of content (e.g., a movie, web page, music file, etc.) of the real machine 130 post sequential activation of Link 1 then Link 4, a virtual machine representation of the software (e.g.) of the real machine 130 post sequential activation of Link 1 then Link 4, a virtual machine representation of the hardware (e.g. the circuitry or processor of the real machine) of the real machine 130 post sequential activation of Link 1 then Link 4, and a virtual machine representation of the operating system (e.g. Linux) of the real machine 130 post sequential activation of Link 1 then Link 4.

FIG. 1C shows virtual machine 22 encompassing a virtual machine representation of real machine 130 post (e.g., subsequent to) a sequential activation of Link 1 (e.g., as shown on FIG. 1B) then Link 5 (e.g., as shown on FIG. 1C). FIG. 1C depicts that in one instance virtual machine 22 may be run on core 32 of a multi-core processor. FIG. 1C depicts system 100 traversing Link 5 via a virtual machine representation of real machine 130 encompassed within virtual machine 22. Accordingly, FIG. 1C illustrates virtual machine 22 including a virtual machine representation of content (e.g. a graphical image, a text file, an email, etc) of the real machine 130 post (e.g., subsequent to) sequential activation of Link 1 then Link 5, a virtual machine representation of software (e.g. an AJAX mashup) of the real machine 130 post sequential activation of Link 1 then Link 5, a virtual machine representation of hardware (e.g. a network adapter) of the real machine 130 post sequential activation of Link 1 then Link 5, and a virtual machine representation of an operating system (e.g. Mac OS/X) of the real machine 130 post sequential activation of Link 1 then Link 5.

FIG. 1C shows virtual machine 23 may be a virtual machine representation of real machine 130 post (e.g., subsequent to) sequential activation of Link 1 (e.g., FIG. 1B) then Link 6 (e.g., FIG. 1C). FIG. 1C depicts that in one instance virtual machine 23 may be run on core 33 of a multi-core processor. System 100 is shown using virtual machine 23 to traverse Link 6. FIG. 1C further illustrates virtual machine 23 encompassing a virtual machine representation of the content (e.g. a music file) of the real machine 130 post sequential activation of Link 1 then Link 6, a virtual machine representation of the software (e.g. a commercial database management system) of the real machine 130 post sequential activation of Link 1 then Link 6, a virtual machine representation of the hardware (e.g. a removable drive) of the real machine 130 post sequential activation of Link 1 then Link 6, and a virtual machine representation of the operating system (e.g. GNU, Berkeley Software Distribution) of the real machine 130 post sequential activation of Link 1 then Link 6 (e.g., as such might appear after activation of a link installed by a rootkit via malware/spyware).

Those skilled in the art will appreciate that system 100 may generate as many virtual machines as necessary to traverse individual links of interest, and that the examples herein are used for sake of clarity. Those skilled in the art will appreciate that examples used herein are meant to be indicative of the fact that system 100 can run in whole or in part on proximate single or multi-core machines and/or distal single or multi-core machines, on distributed computing systems (e.g., GRID or clustered), on local computing systems, or hosted computing systems, etc.

Figure 1D:
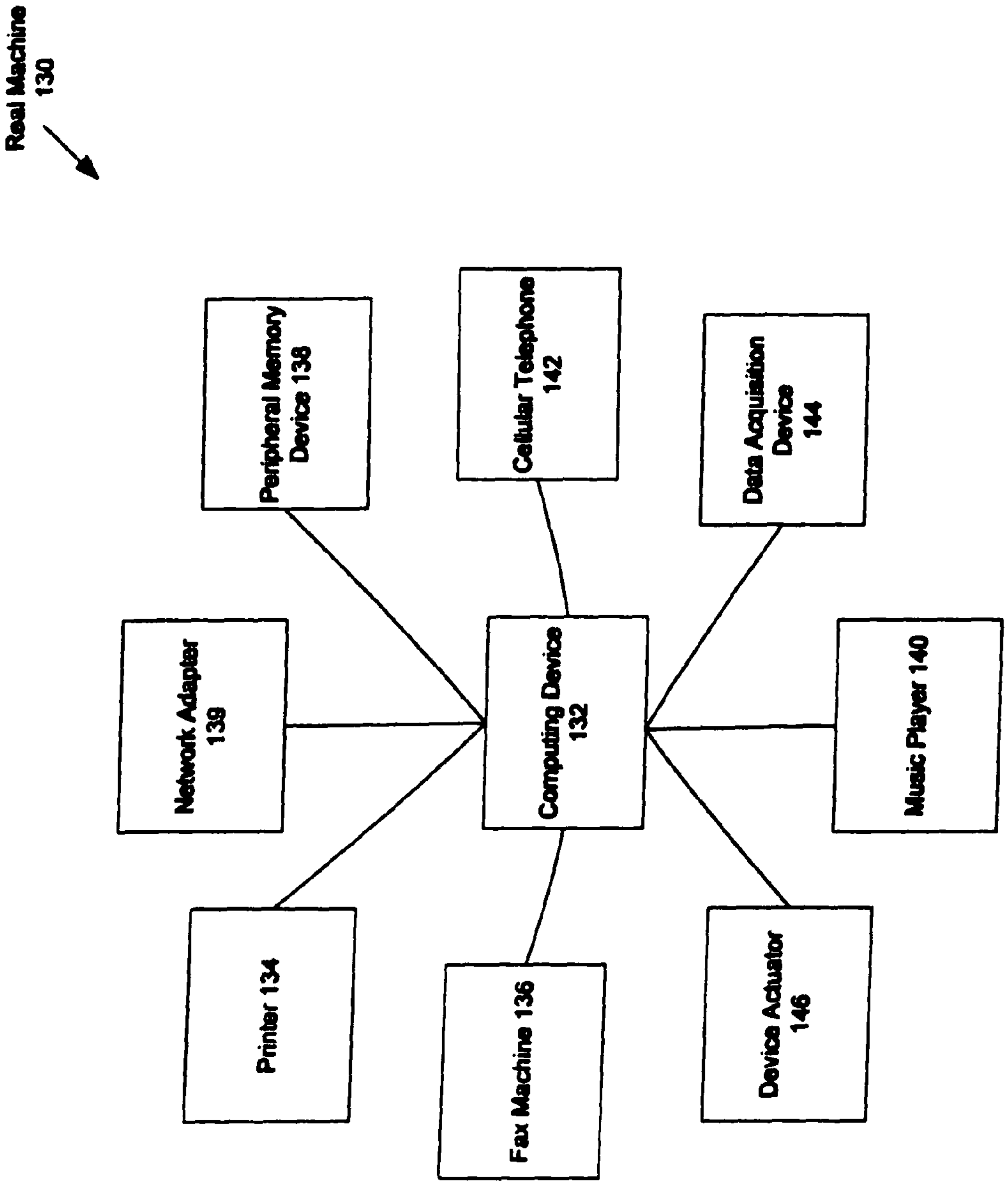
FIG. 1D illustrates an operational view of a real machine in which at least a portion of the system illustrated in FIG. 1A has been implemented.

FIG. 1D shows a representative view of an implementation of real machine 130 (e.g., a desktop, notebook, or other type computing system, and/or one or more peripheral devices). FIG. 1D illustrates that implementations of real machine 130 may include all/part of computing device 132 and/or all/part of one or one or more peripherals associated computing device 132. The computing device 132 may be any device capable of processing one or more programming instructions. For example, the computing device 132 may be a desktop computer, a laptop computer, a notebook computer, a mobile phone, a personal digital assistant (PDA), combinations thereof, and/or other suitable computing devices.

As noted, in some instances, real machine 130 may also include at least a portion of one or more peripheral devices connected/connectable (e.g., via wired, waveguide, or wireless connections) to real machine 130. Peripheral devices may include one or more printers 134, one or more fax machines 136, one or more peripheral memory devices 138 (e.g., flash drive, memory stick), one or more network adapters 139 (e.g., wired or wireless network adapters), one or more music players 140, one or more cellular telephones 142, one or more data acquisition devices 144 (e.g. robots) and/or one or more device actuators 146 (e.g., an hydraulic arm, a radiation emitter, or any other component(s) of industrial/medical systems).

Figure 2:
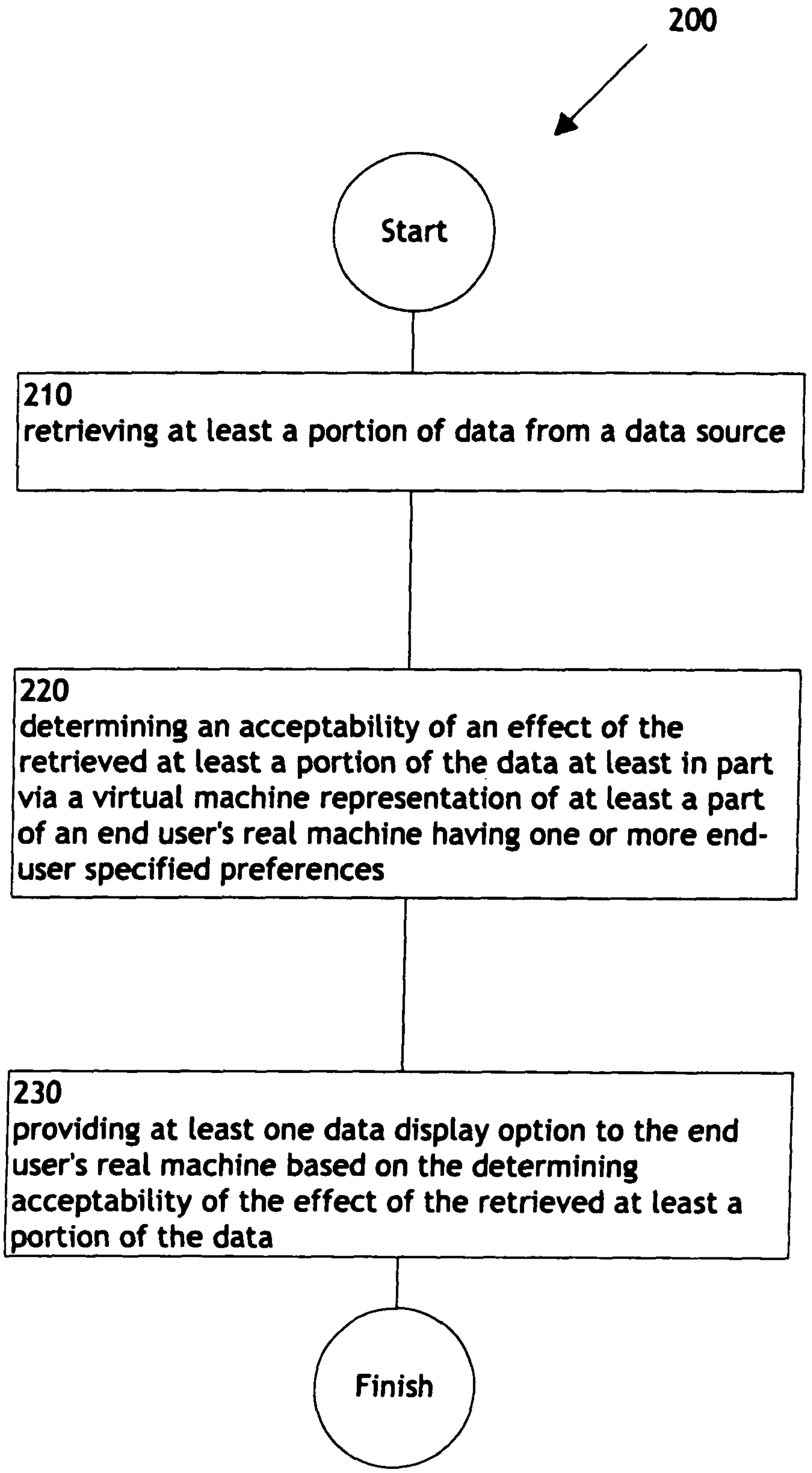
FIG. 2 illustrates an operational flow representing example operations related to providing acceptable data to a real machine.

FIG. 2 illustrates an operational flow 200 representing example operations related to FIGS. 1A, 1B, 1C and 1D. In FIG. 2 and in following figures that include various examples of operational flows, discussion and explanation may be provided with respect to the above-described examples of FIGS. 1A, 1B, 1C, and 1D and/or with respect to other examples and contexts. However, it should be understood that the operational flows may be executed in a number of other environments and contexts, and/or in modified versions of FIGS. 1A, 1B, 1C, and 1D. Also, although the various operational flows are presented in the sequence(s) illustrated, it should be understood that the various operations may be performed in other orders than those which are illustrated, or may be performed concurrently.

After a start operation, the operational flow 200 moves to an operation 210. Operation 210 depicts retrieving at least a portion of data from a data source (e.g. a computer accessible from the internet). For example, FIG. 1A shows a data retriever engine 102. Data retriever engine 102 may retrieve (e.g. download) data 110 (e.g. a web page) from a data source such as a computer accessible from the internet. For example, data retriever engine 102 may set a URL and add a querystring value to the URL. Data retriever engine 102 may then make a request to the URL and scan the response received from the URL. Data 110 may be a web site or web page containing one or more links to additional web sites, such as shown, for example, in FIG. 1B and/or FIG. 1C. Data 110 may in some instances be textual, a two-dimensional or three-dimensional image, audible, or video representations, which in some instances may entail programming code such as html, javascript, C, C++, or any other programming code capable of producing text, visual images, audio content, video content or any combination of text, visual images, audible content and video content.

Then, operation 220 depicts determining an acceptability of an effect of the retrieved at least a portion of the data at least in part via a virtual machine representation of at least a part of an end user's real machine having one or more end-user specified preferences. Continuing the example above, FIG. 1A illustrates an Effect of data acceptability determination engine 106. Effect of data acceptability determination engine 106 may receive data from data retriever engine 102. Effect of data acceptability determination engine 106 (FIG. 1A) may utilize, for example, virtual machine 12 (FIG. 1A) spawned by virtual machine module 118 to determine whether data associated with Link 2 would result in a change in the operating system of real machine 130 contra to a user preference regarding the operating system as stored in the user preference database 120.

Then, operation 230 depicts providing at least one data display option to the end user's real machine based on the determining acceptability of the effect of the retrieved at least a portion of the data. FIG. 1A illustrates a data provider engine 108. Data provider engine 108 may be in communication with Effect of data acceptability determination engine 106, which may receive data from data retriever engine 102. Effect of data acceptability determination engine 106 may transfer at least an effect of data acceptability determination to the data provider engine 108 to provide at least one data display option. In one example, data provider engine 108 (FIG. 1A) provides data via placing the data on a visual display, where the data is such that it meets one or more thresholds associated with the effect of data acceptability determination. Provided data may be a list of web links, a web page, or other data (e.g., text, video, audio) that either have been deemed acceptable by Effect of data acceptability determination engine 106 or that have been modified (e.g., obfuscated), such as by data modification engine 122, such that the to-be-displayed data is determined to be acceptable under user preferences. Display option may include providing a visual display of the data (e.g., displaying text, playing a video, etc.), providing an audible presentation of the data (e.g., playing an audio file), providing a mixed media display of the data (e.g., playing a video and an associated audio file), and so on. Provided data may be modified via the data modification engine 122. For instance, provided data may be obfuscated via the data obfuscation engine 124 (e.g., at least a portion of the displayed data may be blurred out or disabled), or provided data may be anonymized via the data anonymization engine 126 (e.g., at least a portion of the data may be deleted entirely). Data provider engine 108 (FIG. 1A) may receive at least one display instruction (e.g. OK to display links 1 and 2) from at least one component of Effect of data acceptability determination engine 106 (FIG. 1A) for at least a portion of data to be displayed. For instance, each of virtual machines 11, 12, and/or 13 may include one or more instruction generating modules configured to provide an instruction to the Effect of data acceptability determination engine 106 after a comparison of an activation of a link to a user preference stored in a copy of the user preference database 120 (FIG. 1A) spawned on the virtual machines 11, 12, and/or 13. Such instruction may include an instruction to the data provider engine 108 to prevent the data provider engine 108 from displaying data that may configure a hardware profile of real machine 130 counter to anti-viral settings stored in the user preference database 120 (FIG. 1A), or an instruction to the data provider engine 108 to prevent the data provider engine 108 from displaying data that may configure an operating system of real machine 130 counter to a previous operating system of the real machine (130) (e.g. determine if a rootkit has been installed).

Figure 3:
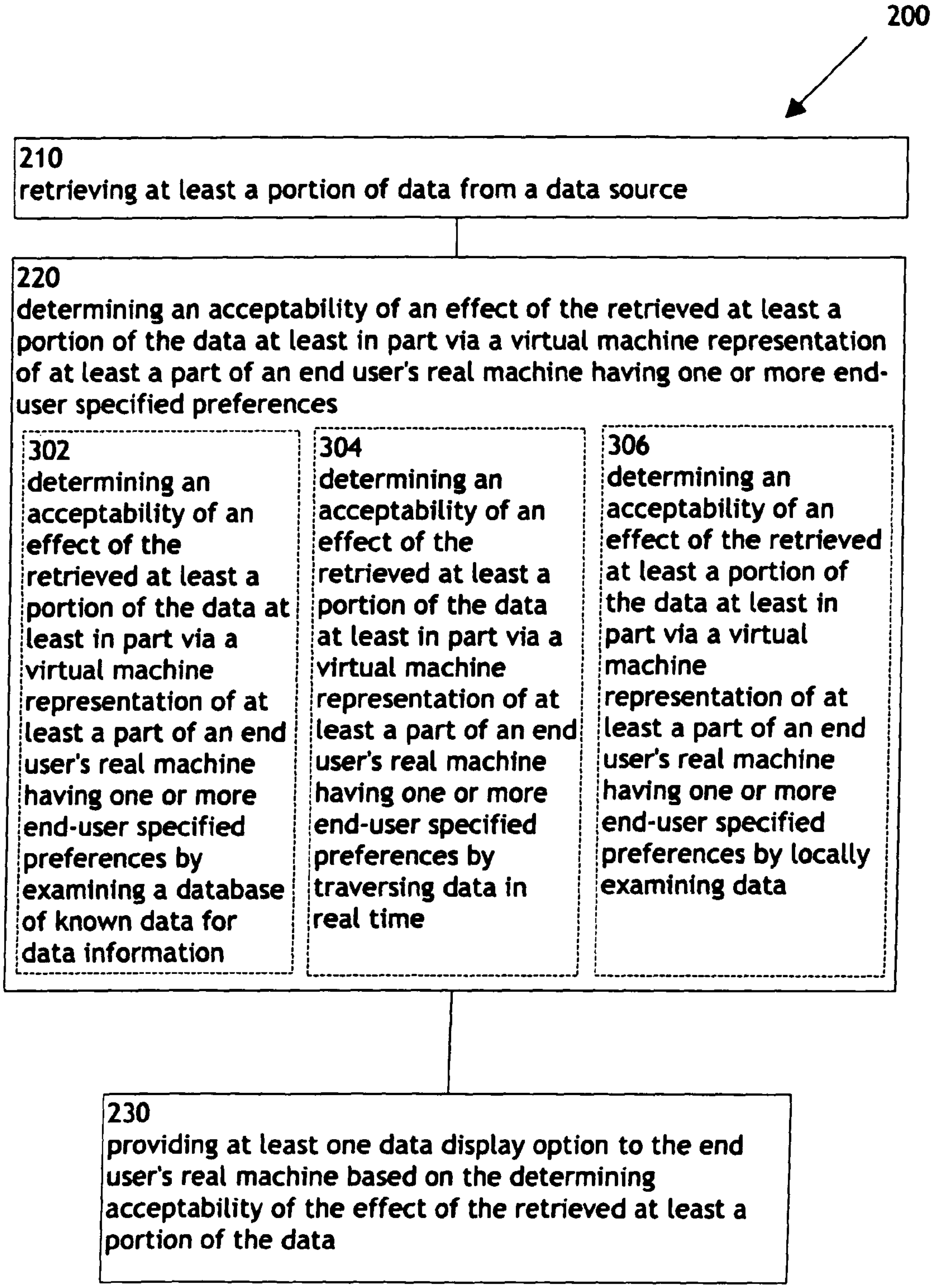
FIG. 3 illustrates an alternative embodiment of the operational flow of FIG. 2.

FIG. 3 illustrates alternative embodiments of the example operational flow 200 of FIG. 2. FIG. 3 illustrates example embodiments where the operation 220 may include at least one additional operation. Additional operations may include an operation 302, an operation 304, and/or an operation 306.

The operation 302 illustrates determining an acceptability of an effect of the retrieved at least a portion of the data at least in part via a virtual machine representation of at least a part of an end user's real machine having one or more end-user specified preferences by examining a database of known data for data information. Continuing the example above, data retriever engine 102 (FIG. 1A) may retrieve data 110 retrieved from a data source by the data retriever engine 102 and communicate data 110 to Effect of data acceptability engine 106, which transfers data 110 to the database examination engine 112. Database examination engine 112 may be configured to examine a database of data provided, for example, by a data provider service or a database of data stored on a real machine 130 and compare examined database data to the retrieved data 110. Effect of data acceptability determination engine 106 may utilize format/protocol information to determine whether database examination engine should call a specific database or library (e.g., a Windows Media Player library) to obtain file information. File information may be utilized to compare retrieved data 110 to data stored in a library. For instance, a database may include a list of links viewed by a user or pre-approved by a user based on one or more user-specified preferences, such as links from a specific source of information (e.g., the Roman Catholic Church) and may provide an indication to the Effect of data acceptability engine 106 that data 110 is pre-approved data.

The operation 304 illustrates determining an acceptability of an effect of the retrieved at least a portion of the data at least in part via a virtual machine representation of at least a part of an end user's real machine having one or more end-user specified preferences by traversing data in real time. Continuing the example above, data retriever engine 102 (FIG. 1A) may retrieve data 110 retrieved from a data source by the data retriever engine 102 and communicate data 110 to Effect of data acceptability engine 106, which transfers data 110 to the data traverser engine 114. Data traverser engine 114 may traverse links of data 110. For instance, data traverser engine 114 may be configured to traverse (e.g., scan) the data 110 to determine the content of the data (e.g., text, images, video files). Accordingly, FIG. 1B shows virtual machine 11 encompassing a virtual machine representation of real machine 130, post activation of Link 3 (e.g., representative of one or more states of one or more hardware/software/firmware components of/resident within real machine 130). Data traversal may occur in real time (e.g., simultaneously as data is loading). Upon traversal of at least a portion of Link 3 by the data traverser engine 114, Effect of data acceptability determination engine 106 may determine whether an effect of the retrieved data is acceptable to a user based on a user's preferences by comparing the traversed data to one or more user preferences stored in a user preference database 120 (FIG. 1A).

The operation 306 illustrates determining an acceptability of an effect of the retrieved at least a portion of the data at least in part via a virtual machine representation of at least a part of an end user's real machine having one or more end-user specified preferences by locally examining data. For instance, continuing the example above, Effect of data acceptability engine 106 may receive data 110 retrieved from a data source (e.g. a computer accessible through the internet) by the data retriever engine 102 and communicate data 110 to a local data examination engine 116 (FIG. 1A) of virtual machine 11. Local data examination engine 116 may extract data content information from at least a portion of the data. Local data examination engine 116 may locally (e.g., on the real machine 130) examine (e.g., analyze) at least a portion of the data (e.g., one or more pointers in the data) to determine data content (e.g., an audio file is a .wav file). For instance, local data examination engine 116 may view an amount of html source code to locate markers signifying the format of at least a portion of data content. The local examination engine 116 may examine the data 110 on the real machine 130 at the location of the real machine 130 (e.g. executed on a sub-system within an end user's real machine) to determine data content (e.g. a downloadable software program).

Figure 4:
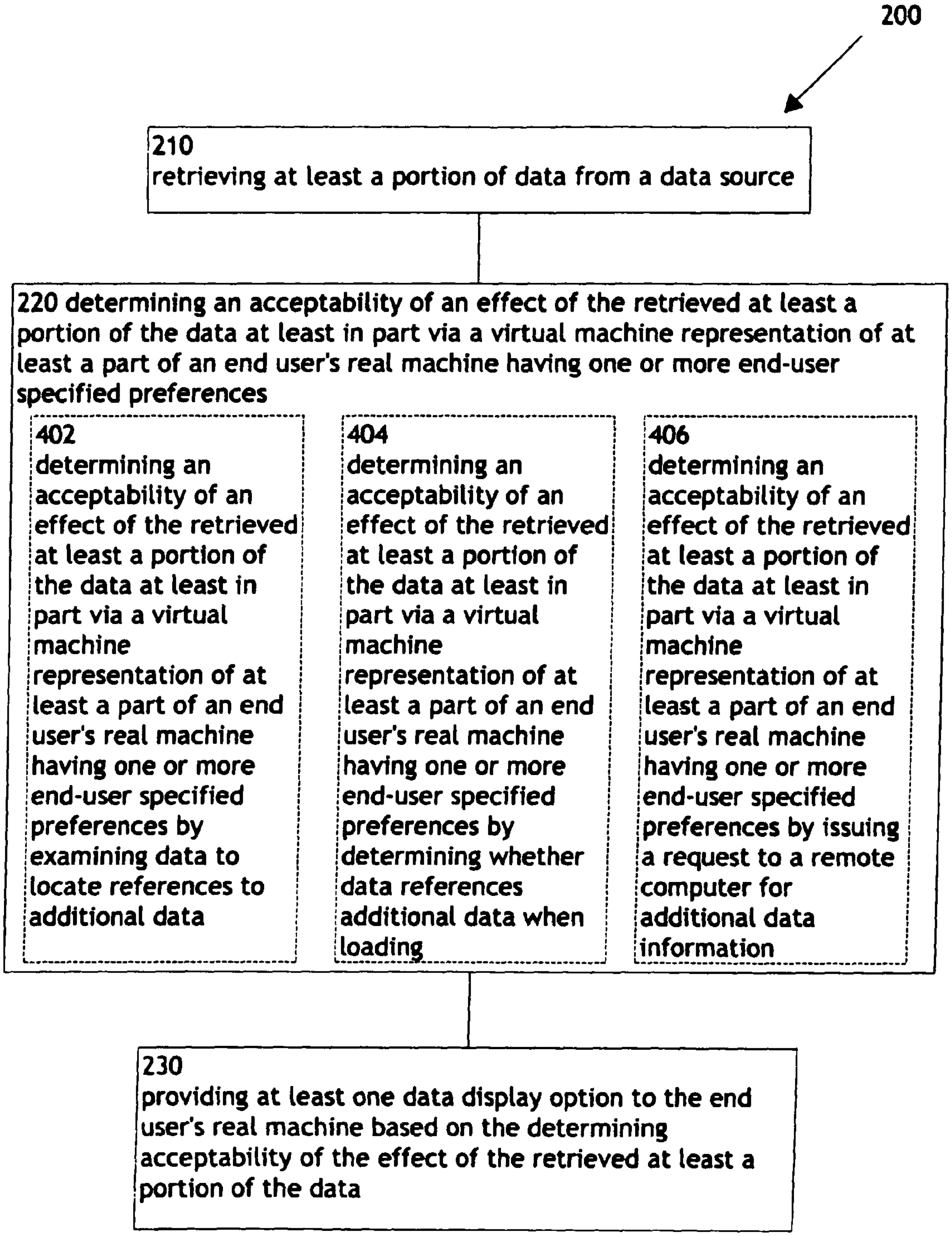
FIG. 4 illustrates an alternative embodiment of the operational flow of FIG. 2.

FIG. 4 illustrates alternative embodiments of the example operational flow 200 of FIG. 2. FIG. 4 illustrates example embodiments where the operation 220 may include at least one additional operation. Additional operations may include an operation 402, an operation 404, and/or an operation 406.

The operation 402 illustrates determining an acceptability of an effect of the retrieved at least a portion of the data at least in part via a virtual machine representation of at least a part of an end user's real machine having one or more end-user specified preferences by examining data to locate references to additional data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13 further including data traverser engine 114 and local data examination engine 116. At least one of virtual machines 11, 12, and/or 13 may utilize at least one of data traverser engine 114 and local data examination engine 116 to examine (e.g. scan) at least a portion of data (e.g. an imbedded link on a webpage) to determine if the data references additional data (e.g. one or more additional links). Additional data may be a web page comprising text and/or an image, a link to a web page, a video or any combination of text, images, links to web pages, or videos. Virtual machines 11, 12, and/or 13 may traverse additional data to determine an acceptability of an effect of the data. Effect of data acceptability determination may be communicated to Effect of data acceptability determination engine 106 that may communicate an effect of data acceptability determination to a data provider engine 108.

The operation 404 illustrates determining an acceptability of an effect of the retrieved at least a portion of the data at least in part via a virtual machine representation of at least a part of an end user's real machine having one or more end-user specified preferences by determining whether data references additional data when loading. Continuing the example above, FIG. 1A illustrates the Effect of data acceptability determination engine 106 further including a virtual machine module 118 and a user preference database 120. Effect of data acceptability determination engine 106 may transfer retrieved data to the virtual machine module 118. Virtual machine module 118 (FIG. 1A) may spawn at least one virtual machine 11, 12, and/or 13, and transfer the data to at least one of virtual machines 11, 12, and/or 13 further including data traverser engine 114 and local data examination engine 116. At least one of virtual machines 11, 12, and/or 13 may utilize at least one of data traverser engine 114 and local data examination engine 116 to examine retrieved data in real time as it loads. For instance, if a link to a webpage immediately (e.g. as soon as the link is activated) references an additional link (e.g. to redirect a user), a virtual machine 11, 12, and/or 13 may determine that such a reference to an additional link (e.g., a pop-up, selectable URL) has been made. Virtual machines 11, 12, and/or 13 may determine whether data references additional data at any time when the data is loading. Effect of data acceptability determination engine 106 may communicate an effect of data acceptability determination to a data provider engine 108.

The operation 406 illustrates determining an acceptability of an effect of the retrieved at least a portion of the data at least in part via a virtual machine representation of at least a part of an end user's real machine having one or more end-user specified preferences by issuing a request to a remote computer for additional data information. Continuing the example above, FIG. 1A illustrates the Effect of data acceptability determination engine 106 further including a virtual machine module 118 and a user preference database 120. Effect of data acceptability determination engine 106 may transfer retrieved data to the virtual machine module 118. Virtual machine module 118 (FIG. 1A) may spawn at least one virtual machine 11, 12, and/or 13 and transfer the data to at least one of virtual machines 11, 12, and/or 13 further including data traverser engine 114 and local data examination engine 116. At least one of virtual machines 11, 12, and/or 13 may utilize at least one of data traverser engine 114 and local data examination engine 116 to examine data of an additional link or links and issue a request to receive additional data information from the remote computer or remote system (e.g. a computer at a geographically distinct location). System 100 may include any number of communication modules (not shown) configured to communicate over local or remote communication channels to the remote server or remote system.

Figure 5:
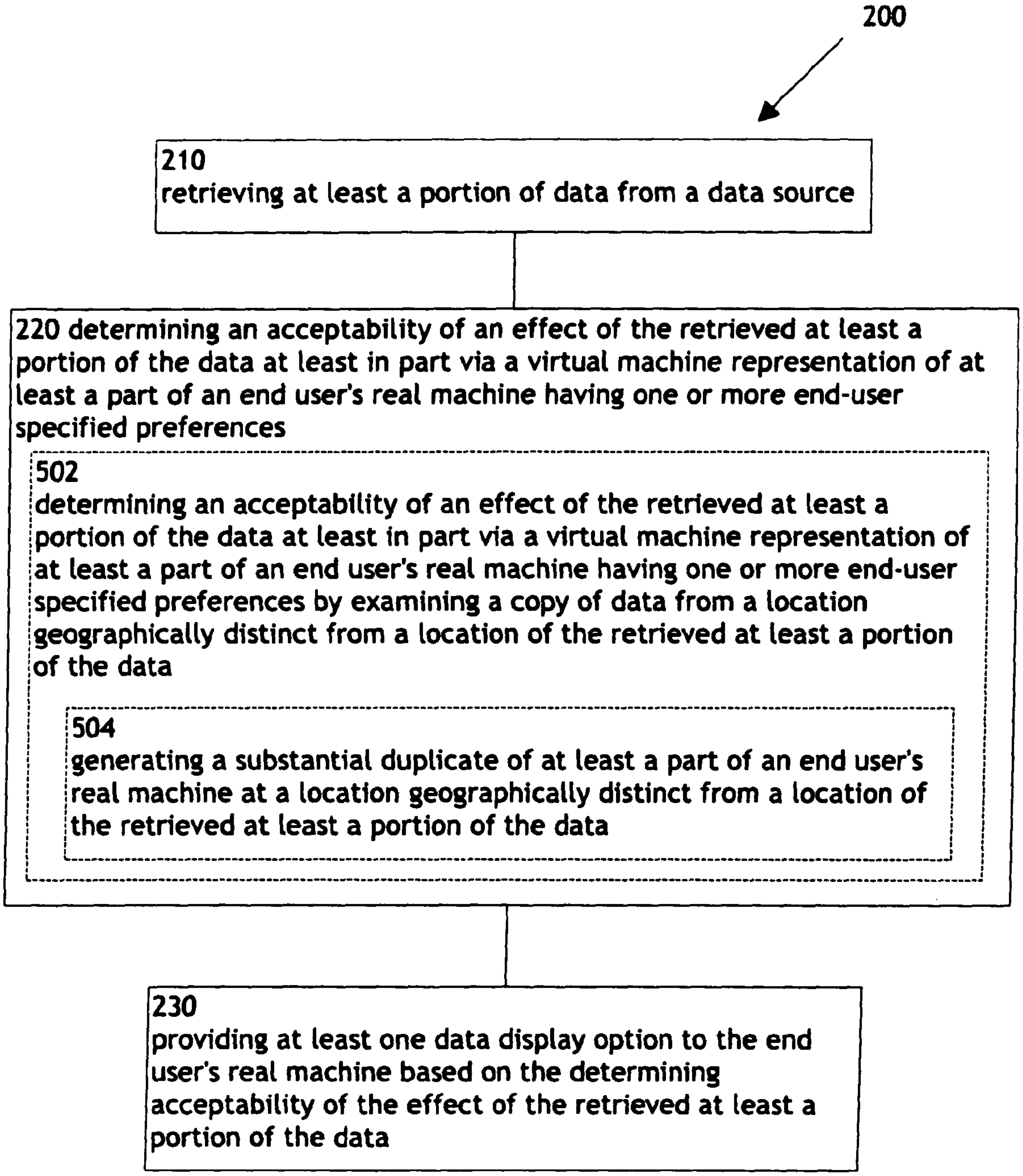
FIG. 5 illustrates an alternative embodiment of the operational flow of FIG. 2.

FIG. 5 illustrates alternative embodiments of the example operational flow 200 of FIG. 2. FIG. 5 illustrates example embodiments where the operation 220 may include at least one additional operation. Additional operations may include an operation 502, an operation 504, and/or an operation 506.

The operation 502 illustrates determining an acceptability of an effect of the retrieved at least a portion of the data at least in part via a virtual machine representation of at least a part of an end user's real machine having one or more end-user specified preferences by examining a copy of data from a location geographically distinct from a location of the retrieved at least a portion of the data. Continuing the example above, Effect of data acceptability determination engine 106 may transfer retrieved data to the virtual machine module 118. FIG. 1A illustrates the Effect of data acceptability determination engine 106 further including a virtual machine module 118 and a user preference database 120. Virtual machine module 118 (FIG. 1A) may spawn at least one virtual machine 11, 12, and/or 13 and transfer the data to at least one of virtual machines 11, 12, and/or 13 to issue a request to a remote computer to examine additional data information at the remote location (e.g. a remote server farm). System 100 may include any number of communication modules (not shown) configured to communicate over local or remote communication channels to the remote server or remote system.

The operation 504 illustrates generating a substantial duplicate of at least a part of an end user's real machine at a location geographically distinct from a location of the retrieved at least a portion of the data. Continuing the example above, a virtual machine 11, 12, and/or 13 of the real machine 130 may be located at a geographically distinct location such as a remote server, or a remote system configured duplicate data from the real machine 130 and to receive and examine real machine information transferred to the remote server or remote system. In one embodiment, generating a substantial duplicate of at least a part of an end user's real machine at a location geographically distinct from a location of the retrieved at least a portion of the data may include a remote server or remote system gathering parameters of an end user's real machine to assist in generating a virtual duplicate of the end user's real machine at the remote server or remote system (e.g. hosted on, running on, or being implemented on the remote server or remote system).

Figure 6:
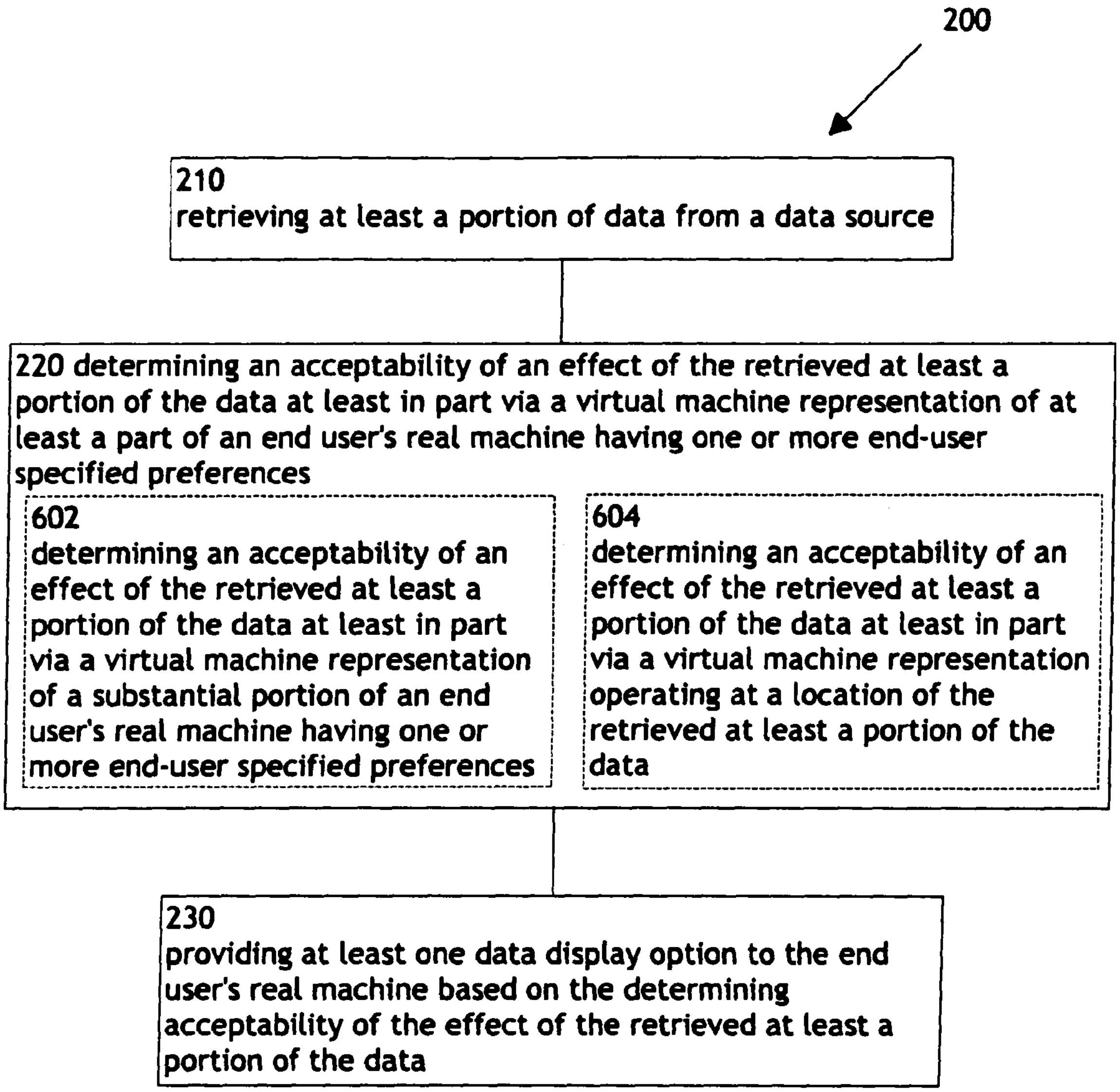
FIG. 6 illustrates an alternative embodiment of the operational flow of FIG. 2.

FIG. 6 illustrates alternative embodiments of the example operational flow 200 of FIG. 2. FIG. 6 illustrates example embodiments where the operation 220 may include at least one additional operation. Additional operations may include an operation 602, an operation 604, and/or an operation 606.

The operation 602 illustrates determining an acceptability of an effect of the retrieved at least a portion of the data at least in part via a virtual machine representation of a substantial portion of an end user's real machine having one or more end-user specified preferences. Continuing the example above, FIG. 1B illustrates virtual machines 11, 12, and 13 including a virtual machine representation of content of the real machine 130, software of the real machine 130, hardware of the real machine 130, and an operating system of the real machine 130. Virtual machines 11, 12, and/or 13 may include most or all of at least one of the content of the real machine 130 (e.g. a substantial portion of the text, image, audio, and video files of the real machine), software of the real machine 130 (e.g. a substantial portion of any program or suite of programs installed on the real machine), hardware of the real machine 130 (a substantial portion of the circuitry comprising the real machine), and/or an operating system of the real machine 130 (e.g. a substantial portion of a Windows® operating system installed on the real machine).

The operation 604 illustrates determining an acceptability of an effect of data at least in part via a virtual machine representation operating at a location of the retrieved at least a portion of the data. Continuing the example above, Effect of data acceptability determination engine 106 may transfer retrieved data to the virtual machine module 118. FIG. 1A illustrates the Effect of data acceptability determination engine 106 further including a virtual machine module 118 and a user preference database 120. Virtual machine module 118 includes virtual machines 11, 12, and/or 13. FIG. 1A further illustrates the Effect of data acceptability determination engine 106 further including a virtual machine module 118 and a user preference database 120. Virtual machine module 118 (FIG. 1A) may spawn at least one virtual machine 11, 12, and/or 13 and transfer the data to at least one of virtual machines 11, 12, and/or 13. In one implementation, all or part of virtual machines 11, 12, and/or 13 may be generated on the real machine 130 (e.g. as a subsystem of real machine 130). For instance, all or part of virtual machines 11, 12, and/or 13 may be generated on a disk, a memory chip, a core of a multi-core processor, etc. of an end user's real machine.

FIG. 7 illustrates alternative embodiments of the example operational flow 200 of FIG. 2. FIG. 7 illustrates example embodiments where the operation 220 may include at least one additional operation. Additional operations may include an operation 702, an operation 704, an operation 706, and/or an operation 708.

The operation 702 illustrates determining an acceptability of an effect of the retrieved at least a portion of the data on at least two virtual machine representations of at least a part of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least two virtual machines 11, 12, and/or 13, and transfer the data to at least one of virtual machines 11, 12, and/or 13. FIG. 1B shows virtual machines 11, 12, and 13 encompassing a virtual machine representation of real machine 130, post (e.g., subsequent to) activation of Link 1, Link 2, and Link 3, respectively (e.g., as at least a part of real machine 130 would exist had Link 1, Link 2, and/or Link 3 actually been traversed on real machine 130). FIG. 1B further depicts virtual machines 11, 12, and/or 13 including a virtual machine representation of content of the real machine 130 post activation of Link 1, Link 2, and/or Link 3, respectively. Examples of such content include a movie, music file, a script (e.g., Java script or Active X control), a markup language, an email, etc. downloaded onto real machine 130 from one or more sources associated with activation/traversal of Link 1, Link 2, and/or Link 3. An example of determining an acceptability of an effect of the data at least in part via at least two virtual machine representations of at least a part of an end user's real machine may include determining an acceptability of an effect of the data at least in part via a virtual machine representation of at least a portion of the content of the real machine and a virtual machine representation of at least a portion of hardware of the real machine, for example, the state of virtual machine 11 and the state of virtual machine 12 after loading at least a portion of the data contained in Link 1.

The operation 704 illustrates determining an acceptability of an effect of the retrieved at least a portion of the data on at least two virtual machine representations of at least a part of an end user's real machine having one or more end-user specified preferences, at least one of the at least two virtual machine representations operating on a separate core of a system comprising at least two cores. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. As illustrated in FIGS. 1B and 1C, each of virtual machine 11, virtual machine 12, virtual machine 13, virtual machine 21, virtual machine 22, and virtual machine 23 may operate on an individual core 11, 12, 13, 31, 32, 33, respectively, of a multi-core processor, or virtual machine 11 may run on one core and virtual machines 12, 13 may run on the other core of a dual core processor such as an Intel® dual core processor and so on. The multi-core processor may include a plurality of processor cores packaged in one processor package. The term core as used herein may refer, for example, to a single processor of a multiprocessor system, or to a processor core of a multi-core processor. Multi-core processor may be utilized as portable computers such as laptop computers, personal digital assistants, or desktop computers, or servers, or another form of processor based system. Combinations of these types of platforms may be present. The multi-core system may include a multi-core processor, each core comprising a separate address space, and having internal to that address space.

The operation 706 illustrates determining an acceptability of an effect of the retrieved at least a portion of the data on at least two virtual machine representations of at least a part of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least two of virtual machines 11, 12, and/or 13. At least one of virtual machines 11, 12, and/or 13 may operate on a separate operating system at a location of the data (e.g. executed on a subsystem, such as the virtual machine module 118 (FIG. A) including a plurality of virtual machines 11, 12, and/or 13 (FIG. 1B) within the real machine 130).

The operation 708 illustrates determining an acceptability of an effect of the retrieved at least a portion of the data on at least two virtual machine representations of at least a part of an end user's real machine having one or more end-user specified preferences, at least one of the at least two virtual machine representations operating on a separate operating system at a location of the retrieved at least a portion of the data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. FIG. 1B further illustrates virtual machines 11, 12, 13. In one implementation, any of virtual machines 11, 12, 13 may be generated on the real machine 130 (e.g. as a subsystem of real machine 130).

The operation 710 illustrates determining an acceptability of an effect of the retrieved at least a portion of the data on at least two virtual machine representations of at least a part of an end user's real machine having one or more end-user specified preferences, at least one of the at least two virtual machine representations operating on a separate operating system at a location geographically distinct from a location of the retrieved at least a portion of the data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. At least one virtual machine, for example virtual machine 12, may be virtual machines operating at geographically distinct location such as a remote server, or a remote system configured to receive and examine real machine information transferred to the remote system and duplicate data from the real machine 130. In some instances, each virtual machine may be generated on one or more separate cores of a multi-core processor. In another embodiment, determining an acceptability of an effect of the retrieved at least a portion of the data on at least two virtual machine representations of at least a part of an end user's real machine having one or more end-user specified preferences, at least one of the at least two virtual machine representations operating on a separate operating system at a location geographically distinct from a location of the retrieved at least a portion of the data may include gathering parameters of an end user's real machine to assist in generating a virtual duplicate of the end user's real machine at a remote location such as a remote server or remote computing system (e.g. hosted on, running on, or being implemented on the remote server or remote system).

Figure 8:
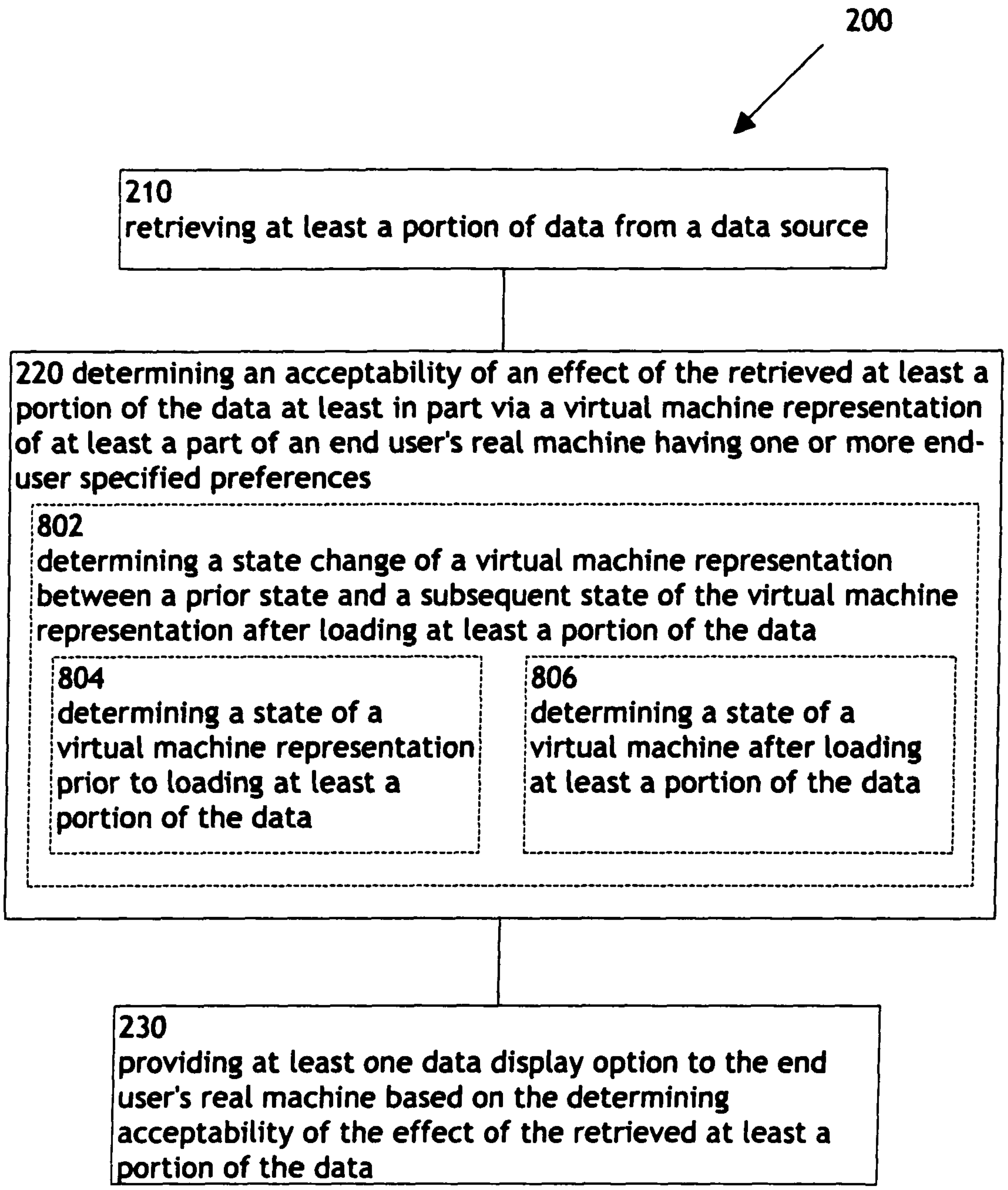
FIG. 8 illustrates an alternative embodiment of the operational flow of FIG. 2.

FIG. 8 illustrates alternative embodiments of the example operational flow 200 of FIG. 2. FIG. 8 illustrates example embodiments where the operation 220 may include at least one additional operation. Additional operations may include an operation 802, an operation 804, and/or an operation 806.

The operation 802 illustrates determining a state change of a virtual machine representation between a prior state and a subsequent state of the virtual machine representation after loading at least a portion of data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. A state change (e.g., a decrease in memory) of at least one of virtual machines 11, 12, and/or 13 (FIG. 1B) may be determined by a component of at least one of virtual machines 11, 12, and/or 13 measuring a characteristic of the virtual machine representation of the content, software, hardware or operating system of the real machine 130 before and after the at least a portion of data has loaded. For instance, a state change may be measured after a search result containing a plurality of web links has loaded and at least one web link has been activated.

The operation 804 illustrates determining a state of a virtual machine representation prior to loading at least a portion of data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. At least one of virtual machines 11, 12, and/or 13 (FIG. 1B) may determine a state of at least one component (e.g., the hardware) of the virtual machine prior to activation (e.g., before) of a link. Virtual machine state may be representative of a state for all or at least a portion of the components (e.g., content, software, hardware, operating system) of the real machine 130 represented by the virtual machine 11, 12, and/or 13. For instance, at least one of virtual machines 11, 12, and/or 13 may be determined to be free of viruses, an amount of virtual machine memory may be measured, or a processing speed of at least one of virtual machines 11, 12, and/or 13 may be determined. At least one of virtual machines 11, 12, and/or 13 may contain a diagnostic application configured to analyze virtual machine performance and contents.

The operation 806 illustrates determining a state of a virtual machine representation after loading at least a portion of data. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. At least one of virtual machines 11, 12, and/or 13 (FIG. 1B) may determine a state of at least one component (e.g., the hardware) of the virtual machine subsequent to (e.g., after) activation of a link. For instance a virtual machine state may be representative of a state for all characteristics of the real machine 130 content, software, hardware or operating system represented by at least one of virtual machines 11, 12, and/or 13 after at least a portion of the data has loaded. For instance, at least one of virtual machines 11, 12, and/or 13 may be determined to contain a virus, an amount of virtual machine memory may be measured, or a processing speed of at least one of virtual machines 11, 12, and/or 13 may be determined. At least one of virtual machines 11, 12, and/or 13 may be examined to determine, for example, if a virus or any other undesired software is present on the machine after at least a portion of the data has loaded by examining the virtual machine representation of the operating system of the real machine 130 (FIG. 1B), or if information from the real machine 130 has been transferred to an external location by examining the software of the real machine 130.

Figure 9:
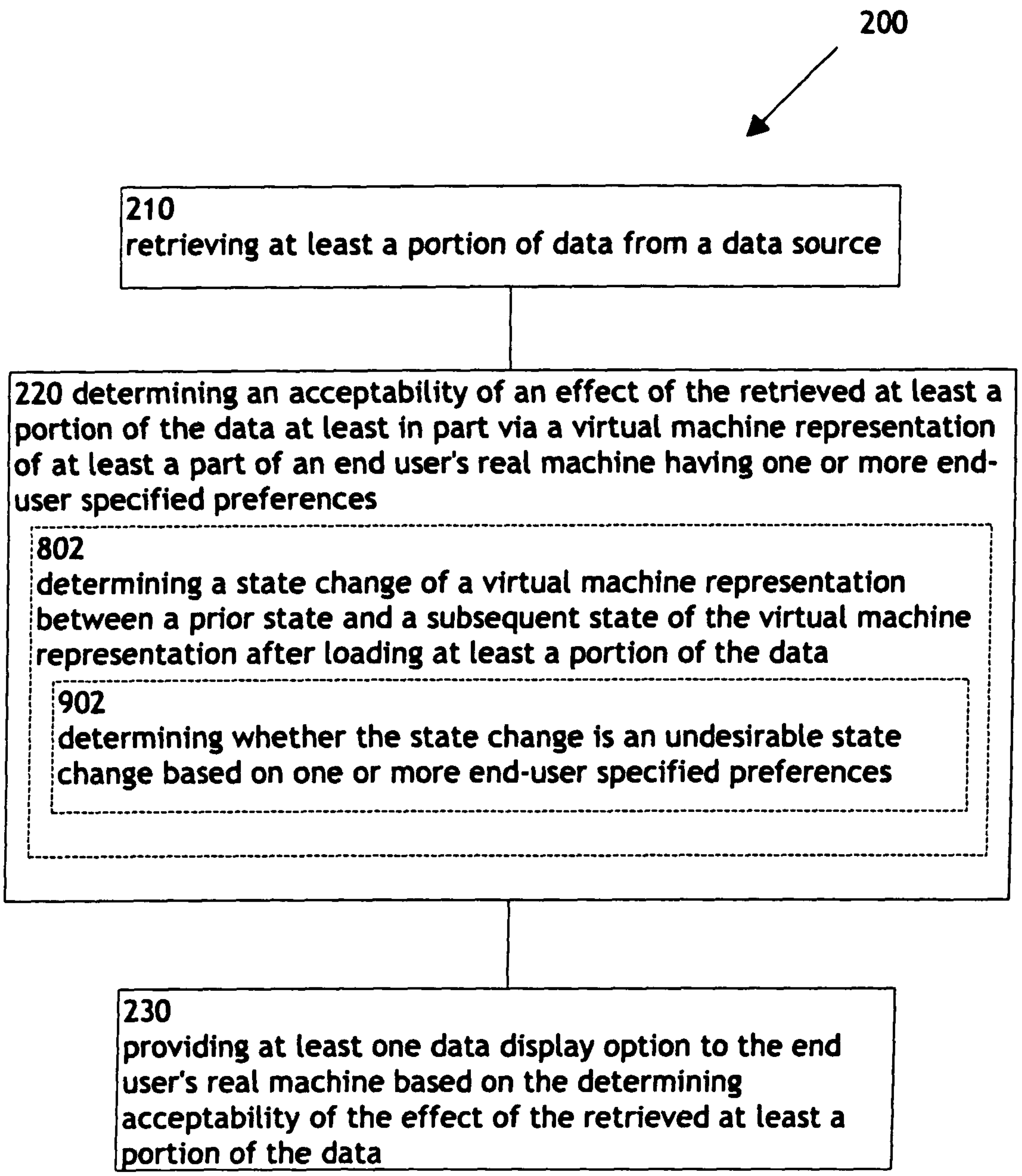
FIG. 9 illustrates an alternative embodiment of the operational flow of FIG. 2.

FIG. 9 illustrates alternative embodiments of the example operational flow 200 of FIG. 2. FIG. 9 illustrates example embodiments where the operation 220 may include at least one additional operation. Additional operations may include an operation 902.

The operation 902 illustrates determining whether the state change is an undesirable state change based on one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. An undesirable state change may be determined by examining the changes to at least one of virtual machines 11, 12, and/or 13 (FIG. 1B) and comparing the state change of at least one of virtual machines 11, 12, and/or 13 to user preference database information spawned on at least one of virtual machines 11, 12, and/or 13 by a transfer of user preference database information from the user preference database 120 (FIG. 1A) to the virtual machine module 118 (FIG. 1A) which spawns a copy of at least a portion of the user preference database 120 (FIG. 1A) onto at least one of virtual machines 11, 12, and/or 13. An undesirable state change may include any undesirable state change including, but not limited to, a decrease in memory or processing speed and/or the presence of a virus or other undesirable software after at least a portion of the data has loaded. Undesirable state changes may further include an undesirable transfer of information located on at least one of virtual machines 11, 12, and/or 13 to an external location, an undesirable transfer of data onto at least one of virtual machines 11, 12, and/or 13 from an external location after at least a portion of the data has loaded on at least one of virtual machines 11, 12, and/or 13 that may result in an undesired change in the state of content, software, hardware or an operating system of the real machine 130 and/or an undesirable transfer of data onto at least one of virtual machines 11, 12, and/or 13 where at least a portion of the transferred data may be found objectionable when viewed by a user 10.

Figure 10:
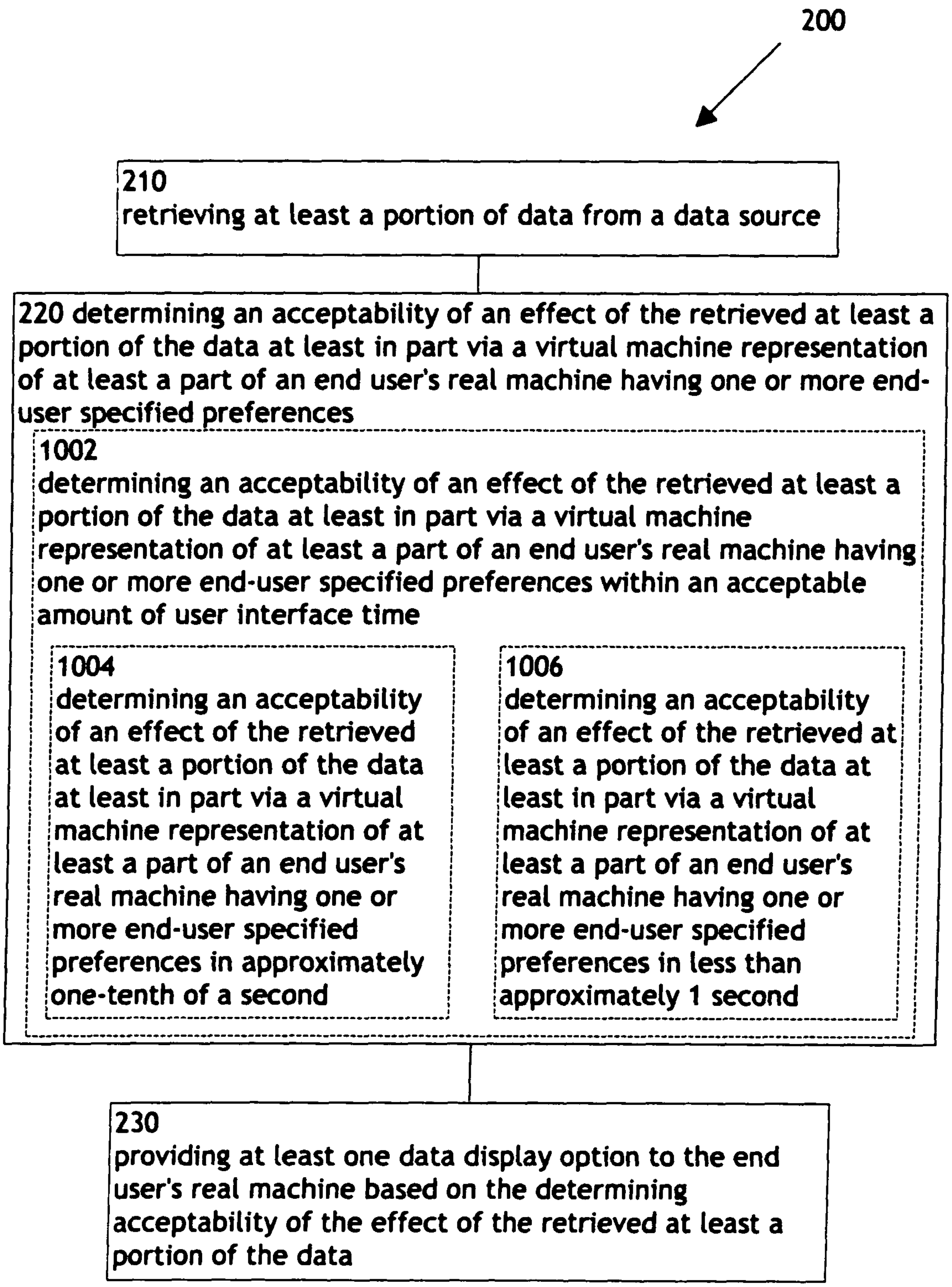
FIG. 10 illustrates an alternative embodiment of the operational flow of FIG. 2.

FIG. 10 illustrates alternative embodiments of the example operational flow 200 of FIG. 2. FIG. 10 illustrates example embodiments where the operation 220 may include at least one additional operation. Additional operations may include an operation 1002, an operation 1004, and/or an operation 1006.

The operation 1002 illustrates determining an acceptability of an effect of the retrieved at least a portion of the data at least in part via a virtual machine representation of at least a part of an end user's real machine having one or more end-user specified preferences within an acceptable amount of user interface time. Continuing the example above, FIG. 1A illustrates an Effect of data acceptability determination engine 106. Effect of data acceptability determination engine 106 may receive data from data retriever engine 102. Effect of data acceptability determination engine 106 (FIG. 1A) may utilize, for example, virtual machine 12 (FIG. 1A) spawned by virtual machine module 118 to determine whether data associated with Link 2 would result in a change in the operating system of real machine 130 contra to a user preference regarding the operating system as stored in the user preference database 120. Effect of data acceptability determination may be determined within an acceptable amount of user interface time (e.g. a tolerable wait time for information retrieval). An acceptable amount of user interface time may be within a range from an amount of time approximating an instantaneous effect of data acceptability determination to an amount of time approximating a maximum time a user may be willing to wait for a result before abandoning a data retrieval (e.g., a downloading webpage).

The operation 1004 illustrates determining an acceptability of an effect of the retrieved at least a portion of the data at least in part via a virtual machine representation of at least a part of an end user's real machine having one or more end-user specified preferences in approximately one-tenth of a second. Continuing the example above, Effect of data acceptability determination engine 106 (FIG. 1A) may utilize, for example, virtual machine 12 (FIG. 1A) spawned by virtual machine module 118 to determine whether data associated with Link 2 would result in a change in the operating system of real machine 130 contra to a user preference regarding the operating system as stored in the user preference database 120. A user interface time of approximately one-tenth of a second may approximate an acceptable amount elapsed time for a user to feel that the Effect of data acceptability determination engine 106 is reacting instantaneously.

The operation 1006 illustrates determining an acceptability of an effect of the retrieved at least a portion of the data at least in part via a virtual machine representation of at least a part of an end user's real machine having one or more end-user specified preferences in less than approximately 1 second. Continuing the example above, Effect of data acceptability determination engine 106 (FIG. 1A) may utilize, for example, virtual machine 12 (FIG. 1A) spawned by virtual machine module 118 to determine whether data associated with Link 2 would result in a change in the operating system of real machine 130 contra to a user preference regarding the operating system as stored in the user preference database 120. A user interface time of less than approximately one second may approximate an acceptable amount elapsed time for a user to notice a delay in the Effect of data acceptability determination without abandoning the information retrieval.

Figure 11:
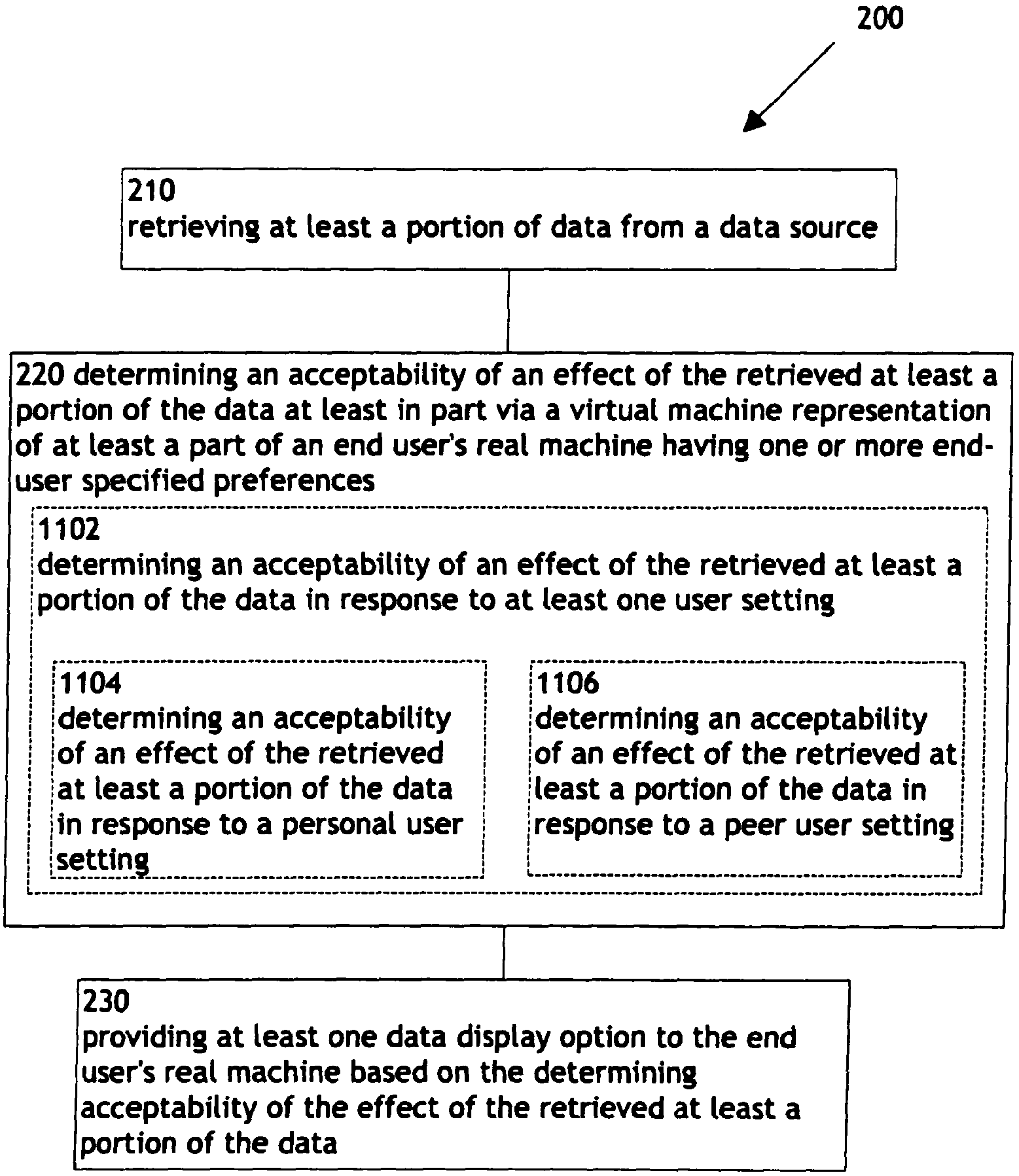
FIG. 11 illustrates an alternative embodiment of the operational flow of FIG. 2.

FIG. 11 illustrates alternative embodiments of the example operational flow 200 of FIG. 2. FIG. 11 illustrates example embodiments where the operation 220 may include at least one additional operation. Additional operations may include an operation 1102, an operation 1104, and/or an operation 1106.

The operation 1102 illustrates determining an acceptability of an effect of the retrieved at least a portion of the data in response to at least one user setting. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. An acceptability of an effect of the data may be determined by determining if a state change to at least one of virtual machines 11, 12, and/or 13 has occurred and comparing the state change of at least one of virtual machines 11, 12, and/or 13 to user preference database information spawned on at least one of virtual machines 11, 12, and/or 13. Comparison may be made, for example, by transferring user preference database information from the user preference database 120 (FIG. 1A) to the virtual machine module 118 (FIG. 1A) which spawns a copy of at least a portion of the user preference database 120 (FIG. 1A) onto at least one of virtual machines 11, 12, and/or 13. User preference database 120 may include at least one end-user specified preference relating to at least one of content, software, hardware and/or an operating system of a real machine 130. At least one of virtual machines 11, 12, and/or 13 may determine an acceptability of an effect of the data based on at least one user setting contained in a user preference database at least a portion of which may be spawned onto at least one of virtual machines 11, 12, and/or 13 via virtual machine module 118 (e.g., does a website contain only images, text, audio or visual data suitable for viewing by a user based on a setting established by a user such as a political or cultural preference setting). Further examples of user preferences include specific religion or lifestyle preference, such as "return only links relating to Roman Catholicism" or "return only links relating to a vegan lifestyle" that may be stored in the real machine 130. User-specific preference may also relate to user information safety or computer safety, such as "do not display links requesting information from my computer," or "do not display links that transfer viruses onto my computer."

The operation 1104 illustrates determining an acceptability of an effect of the retrieved at least a portion of the data in response to a personal user setting. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. User preference database information stored in the user preference database 120 (FIG. 1A) may be transferred to the virtual machine module 118 (FIG. 1A), which spawns a copy of at least a portion of the user preference database 120 (FIG. 1A) onto at least one of virtual machines 11, 12, and/or 13. At least one of virtual machines 11, 12, and/or 13 (FIG. 1B) may compare the data received from the virtual machine module 118 (FIG. 1A) to a personal user setting (e.g., "show only automobile related data") contained in user preference database information spawned on at least one of virtual machines 11, 12, and/or 13. User preference database 120 may include at least one personal user setting relating to at least one of content, software, hardware and/or an operating system of a real machine 130. Personal user setting may be a setting input by a user that is personal to the user, such as an information security level, a content filter level, or a personal desirability setting such as "show only non-religious data" or "show only automobile related data."

The operation 1106 illustrates determining an acceptability of an effect of the retrieved at least a portion of the data in response to a peer user setting. Continuing the example above, user preference database 120 may include at least one peer user setting relating to at least one of content, software, hardware and/or an operating system of an end user's real machine 130. Peer user setting may be a setting input by a user that is determined by a peer group, such as a peer group determined information security level such as "display only 100 percent secure websites", a peer group determined data filter level such as "filter 100% of obscene data", or a peer group desirability setting such as "show only classical music related data" or "show only knitting related data."

Figure 12:
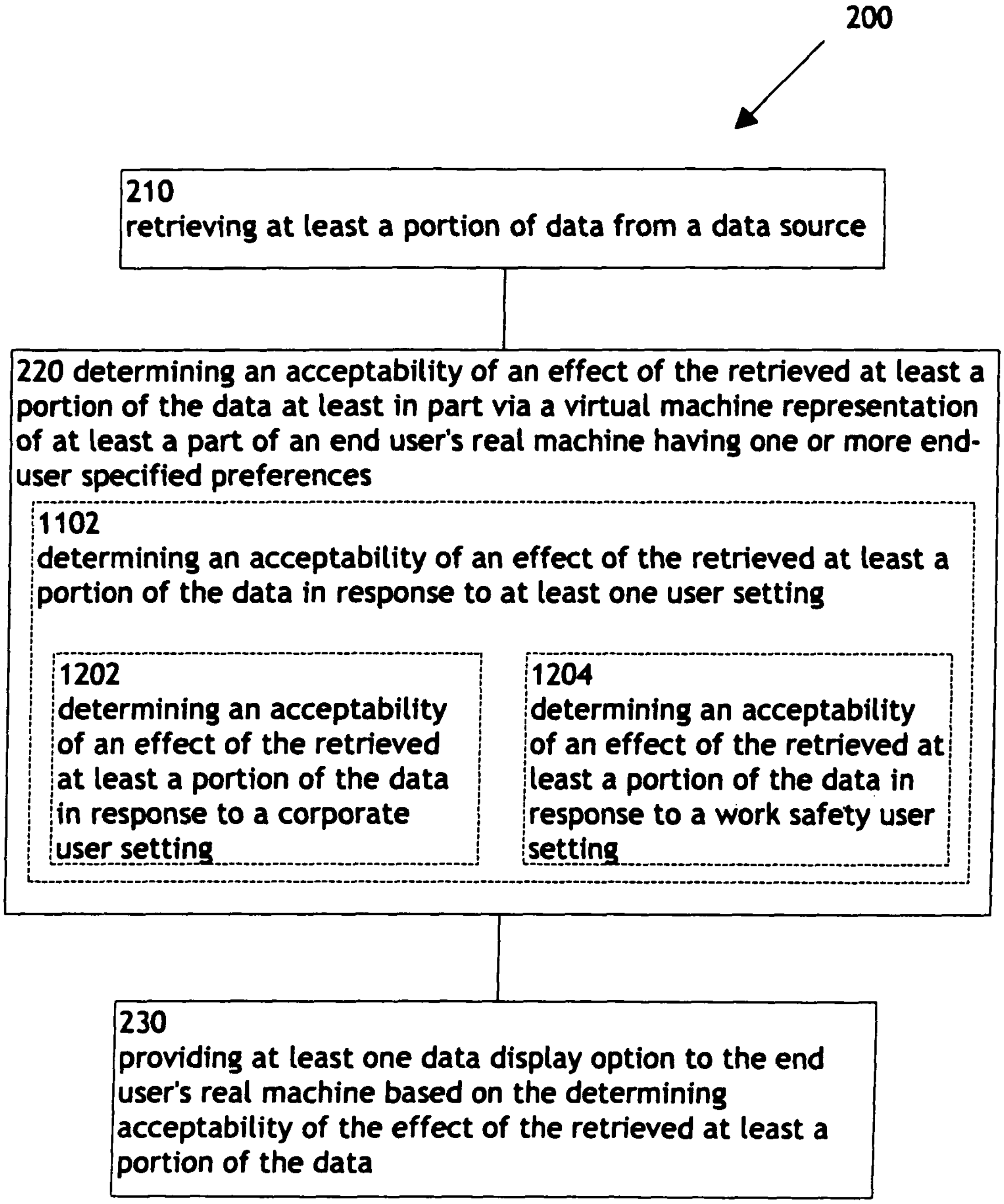
FIG. 12 illustrates an alternative embodiment of the operational flow of FIG. 2.

FIG. 12 illustrates alternative embodiments of the example operational flow 200 of FIG. 2. FIG. 12 illustrates example embodiments where the operation 220 may include at least one additional operation. Additional operations may include an operation 1202, and/or an operation 1204. The operation 1202 illustrates determining an acceptability of an effect of the retrieved at least a portion of the data in response to a corporate user setting. Continuing the example above, at least one of virtual machines 11, 12, and/or 13 (FIG. 1B) may compare the data received from the virtual machine module 118 (FIG. 1A) to a corporate user setting contained in user preference database information spawned on at least one of virtual machines 11, 12, and/or 13. User preference database 120 may include at least one corporate user setting relating to at least one of content, software, hardware and/or an operating system of an end user's real machine 130. Corporate user setting may be a setting input by a corporation that is determined to the corporation, such as a corporate desirability setting such as "show only real-estate related data" or "show only agricultural related data."

The operation 1204 illustrates determining an acceptability of an effect of the retrieved at least a portion of the data in response to a work safety user setting. Continuing the example above, at least one of virtual machines 11, 12, and/or 13 (FIG. 1B) may compare the data received from the virtual machine module 118 (FIG. 1A) to a work safety user setting contained in user preference database information spawned on at least one of virtual machines 11, 12, and/or 13. User preference database 120 may include at least one work safety user setting relating to at least one of content, software, hardware and/or an operating system of an end user's real machine 130. Thus, in one specific example, a webpage or website data may be determined to be displayable if the data satisfies a work safety user setting such as a corporate information security level, corporate user setting, or a corporate information content filter level corporate user setting.

Figure 13:
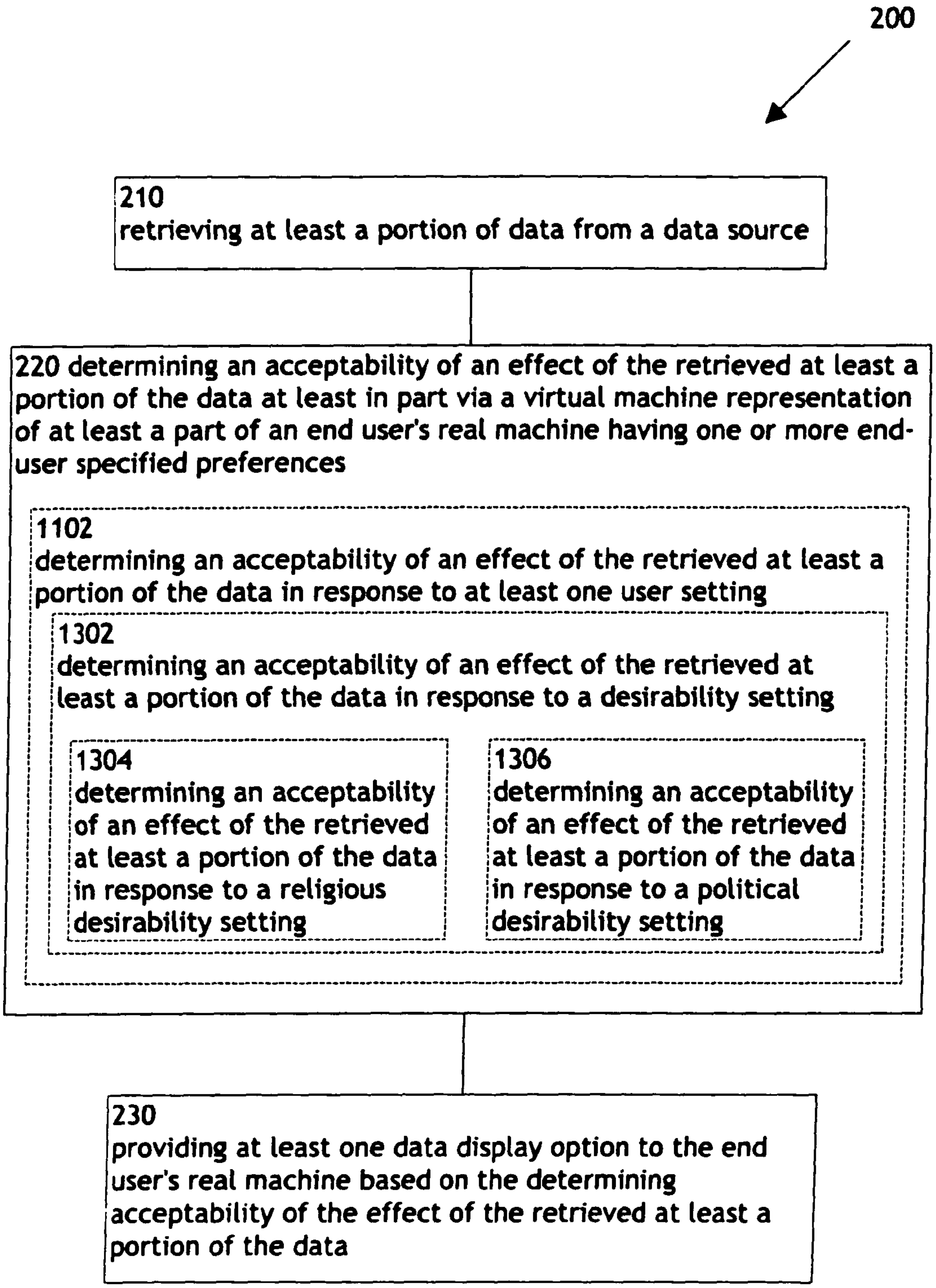
FIG. 13 illustrates an alternative embodiment of the operational flow of FIG. 2.

FIG. 13 illustrates alternative embodiments of the example operational flow 200 of FIG. 2. FIG. 13 illustrates example embodiments where the operation 220 may include at least one additional operation. Additional operations may include an operation 1302, an operation 1304, and/or an operation 1306. The operation 1302 illustrates determining an acceptability of an effect of the retrieved at least a portion of the data in response to a desirability setting. Continuing the example above, at least one of virtual machines 11, 12, and/or 13 (FIG. 1B) may compare the data received from the virtual machine module 118 (FIG. 1A) to a desirability setting (e.g., does a website contain only images, text, audio or visual data suitable for viewing by a user based on a desirability setting established by a user such as a desire to view only non-obscene material) contained in user preference database information spawned on at least one of virtual machines 11, 12, and/or 13. User preference database 120 may include at least one desirability setting relating to at least one of content, software, hardware and/or an operating system of an end user's real machine 130.

The operation 1304 illustrates determining an acceptability of an effect of the retrieved at least a portion of the data in response to a religious desirability setting. Continuing the example above, at least one of virtual machines 11, 12, and/or 13 may compare the data received from the virtual machine module 118 to a religious desirability setting (e.g., does a website contain only images, text, audio or visual data suitable for viewing by a user based on a religious desirability setting established by a user such as a desire to view only Hindu material) contained in user preference database information spawned on at least one of virtual machines 11, 12, and/or 13. A religious desirability setting may be include any setting regarding a major, minor, or other religion such as Christianity, Judaism, Islam, Hinduism, and so on.

The operation 1306 illustrates determining an acceptability of an effect of the retrieved at least a portion of the data in response to a political desirability setting. Continuing the example above, at least one of virtual machines 11, 12, and/or 13 (FIG. 1B) may compare the data received from the virtual machine module 118 (FIG. 1A) to a political desirability setting (e.g., does a website contain only images, text, audio or visual data suitable for viewing by a user based on a political desirability setting established by a user such as a desire to view only Democratic Party material) contained in user preference database information spawned on at least one of virtual machines 11, 12, and/or 13. A political desirability setting may include any setting regarding a political party or affiliation (e.g., Republican, Democratic, Libertarian, Green Party, etc.).

Figure 14:
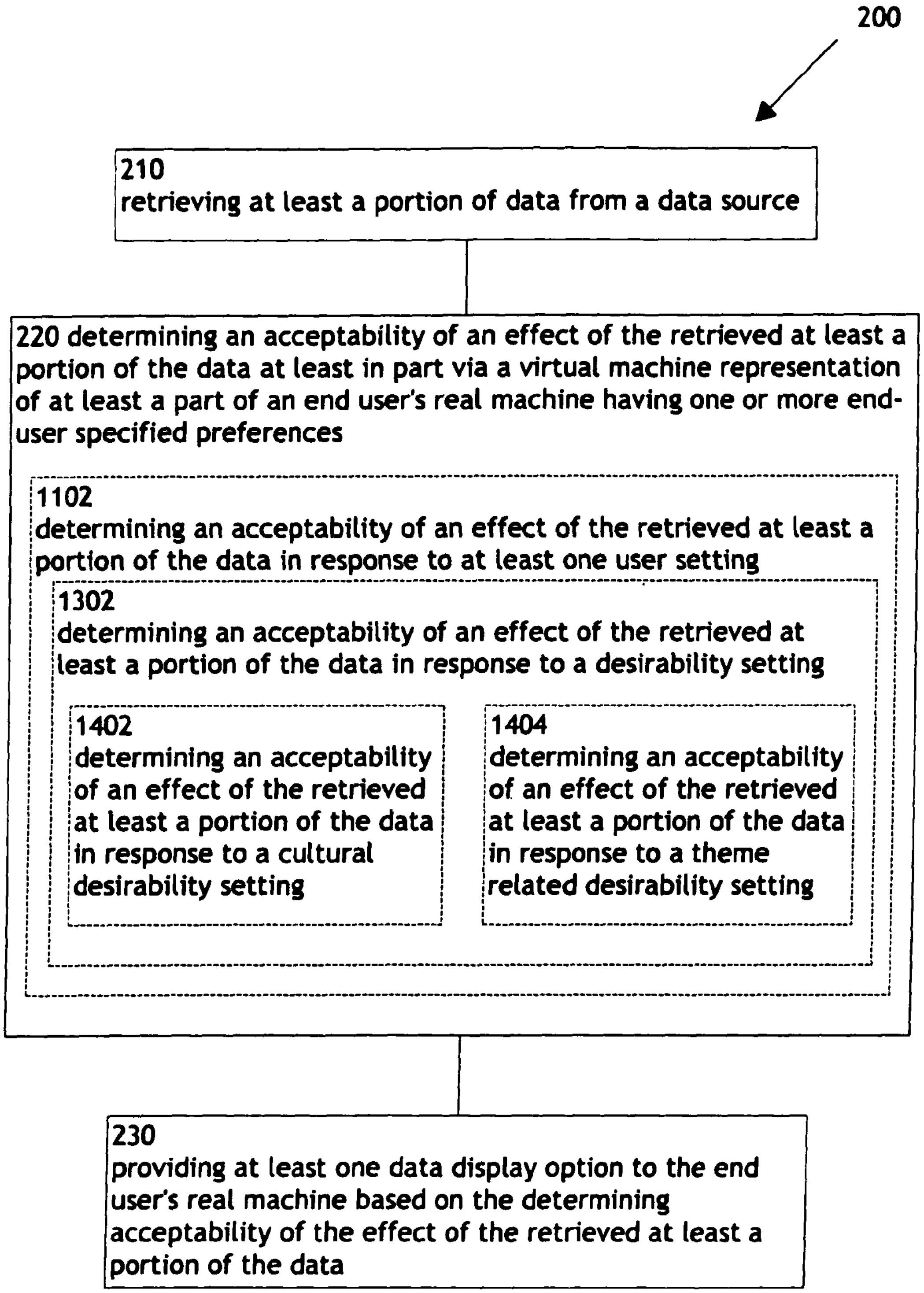
FIG. 14 illustrates an alternative embodiment of the operational flow of FIG. 2.

FIG. 14 illustrates alternative embodiments of the example operational flow 200 of FIG. 2. FIG. 14 illustrates example embodiments where the operation 220 may include at least one additional operation. Additional operations may include an operation 1402, and/or an operation 1404. The operation 1402 illustrates determining an acceptability of an effect of the retrieved at least a portion of the data in response to a cultural desirability setting. Continuing the example above, at least one of virtual machines 11, 12, and/or 13 (FIG. 1B) may compare the data received from the virtual machine module 118 (FIG. 1A) to a cultural desirability setting (e.g., does a website contain only images, text, audio or visual data suitable for viewing by a user based on a cultural desirability setting established by a user such as a desire to view only materials regarding early Mayan civilization) contained in user preference database information spawned on at least one of virtual machines 11, 12, and/or 13. A cultural desirability setting may include any culturally related information such as a religious, ethnic, regional, or heritage based cultural desirability setting or any other cultural desirability setting.

The operation 1404 illustrates determining an acceptability of an effect of the retrieved at least a portion of the data in response to a theme related desirability setting. Continuing the example above, at least one of virtual machines 11, 12, and/or 13 (FIG. 1B) may compare the data received from the virtual machine module 118 (FIG. 1A) to a theme related desirability setting (e.g., does a website contain only images, text, audio or visual data suitable for viewing by a user based on a theme related desirability setting established by a user such as a desire to view only materials regarding collectible stamps) contained in user preference database information spawned on at least one of virtual machines 11, 12, and/or 13. A theme related desirability setting may include any theme related information, such as information relating to cars, fashion, electronics, sports, hobbies, collector's items, or any theme or category that may be of interest to a user.

Figure 15:
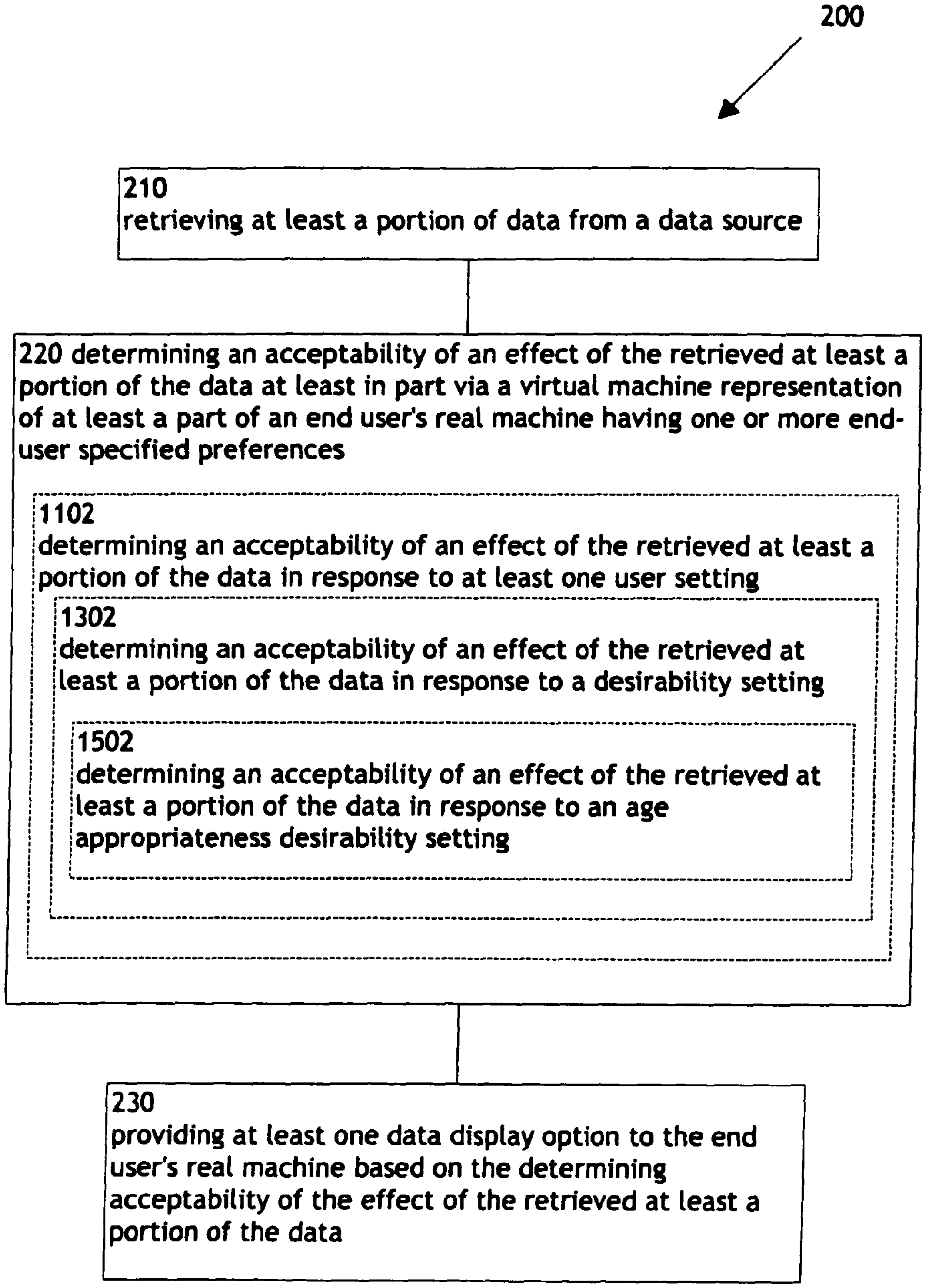
FIG. 15 illustrates an alternative embodiment of the operational flow of FIG. 2.

FIG. 15 illustrates alternative embodiments of the example operational flow 200 of FIG. 2. FIG. 15 illustrates example embodiments where the operation 220 may include at least one additional operation. Additional operations may include an operation 1502. The operation 1502 illustrates determining an acceptability of an effect of the retrieved at least a portion of the data in response to an age appropriateness desirability setting. Continuing the example above, at least one of virtual machines 11, 12, and/or 13 (FIG. 1B) may compare the data received from the virtual machine module 118 (FIG. 1A) to an age appropriateness desirability setting (e.g., does a website contain only images, text, audio or visual data suitable for viewing by a user based on an age appropriateness desirability setting established by a user such as a desire to view only materials given a PG or lower rating as determined by the Motion Picture of America Association film rating system) contained in user preference database information spawned on at least one of virtual machines 11, 12, and/or 13. An age appropriateness desirability setting may include any age appropriate setting, such as a rating threshold or a profanity threshold.

Figure 16:
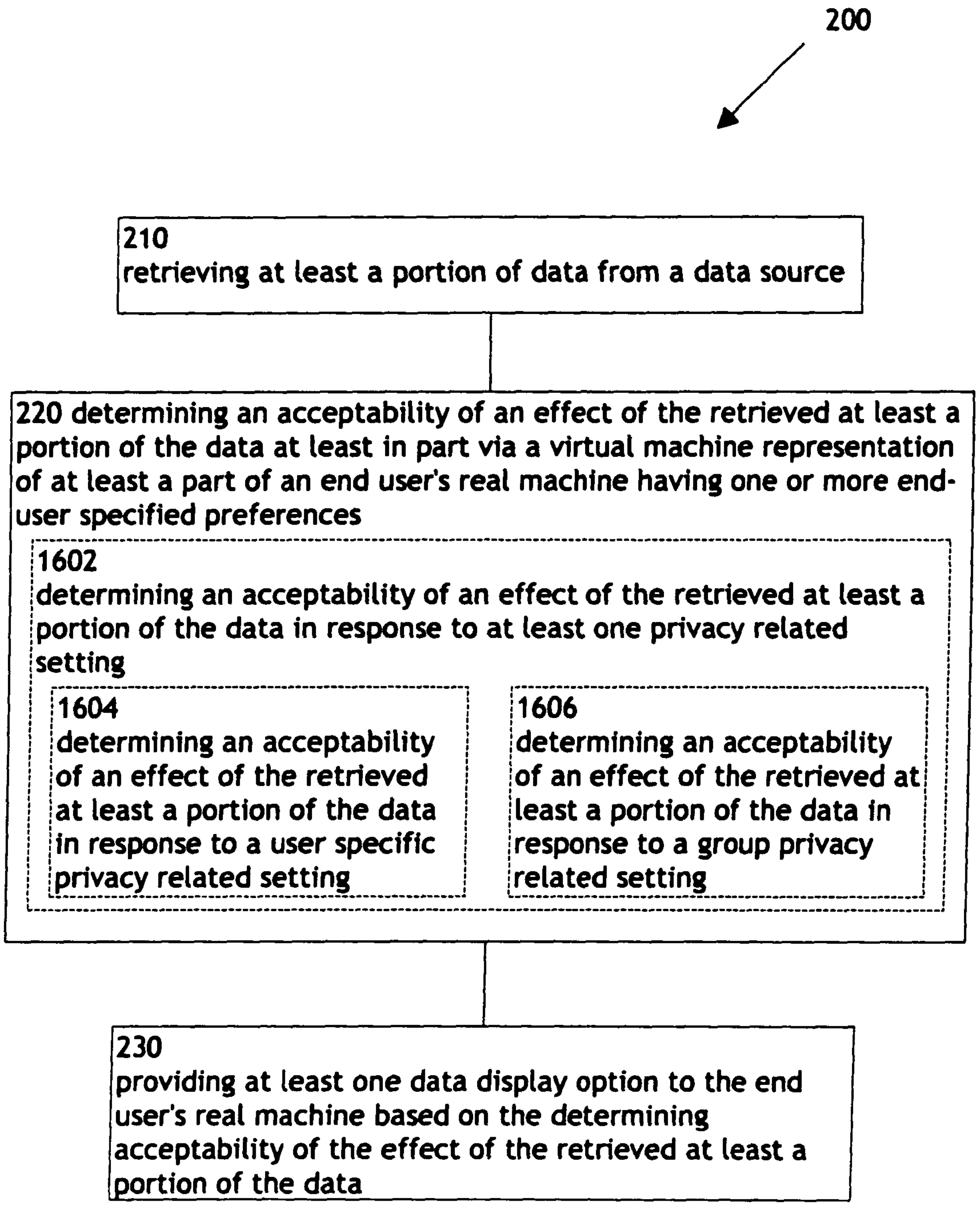
FIG. 16 illustrates an alternative embodiment of the operational flow of FIG. 2.

FIG. 16 illustrates alternative embodiments of the example operational flow 200 of FIG. 2. FIG. 16 illustrates example embodiments where the operation 220 may include at least one additional operation. Additional operations may include an operation 1602, an operation 1604, and/or an operation 1606.

The operation 1602 illustrates determining an acceptability of an effect of the retrieved at least a portion of the data in response to at least one privacy related setting. Continuing the example above, at least one of virtual machines 11, 12, and/or 13 (FIG. 1B) may compare the data received from the virtual machine module 118 (FIG. 1A) to a privacy related setting (e.g., does a website contain only images, text, audio or visual data suitable for viewing by a user based on a privacy related setting established by a user) contained in user preference database information spawned on at least one of virtual machines 11, 12, and/or 13. A privacy related setting may include any privacy related settings (e.g., does a website contain only data that will not request information from my computer or allow others to view personal information saved on my computer).

The operation 1604 illustrates determining an acceptability of an effect of the retrieved at least a portion of the data in response to a user specific privacy related setting. Continuing the example above, at least one of virtual machines 11, 12, and/or 13 (FIG. 1B) may compare the data received from the virtual machine module 118 (FIG. 1A) to a user specific privacy related setting (e.g., will a website request specific information about the user such as name, address, telephone number) contained in user preference database information spawned on at least one of virtual machines 11, 12, and/or 13. A user specific privacy related setting may include any user specific privacy related settings (e.g., a setting relating to a user's biographical information or financial information).

The operation 1606 illustrates determining an acceptability of an effect of the retrieved at least a portion of the data in response to a group privacy related setting. Continuing the example above, at least one of virtual machines 11, 12, and/or 13 (FIG. 1B) may compare the data received from the virtual machine module 118 (FIG. 1A) to a group privacy related setting (e.g., will a website request information about an organization such as name, address, telephone number) contained in user preference database information spawned on at least one of virtual machines 11, 12, and/or 13. A group privacy related setting may include any group privacy related settings (e.g., a setting relating to a group's membership). Group privacy related setting may be any setting established by a group such as a work group (e.g., employees of a company), a peer group (e.g., members of a book club), or a family group (e.g., members of family unit) privacy related setting.

Figure 17:
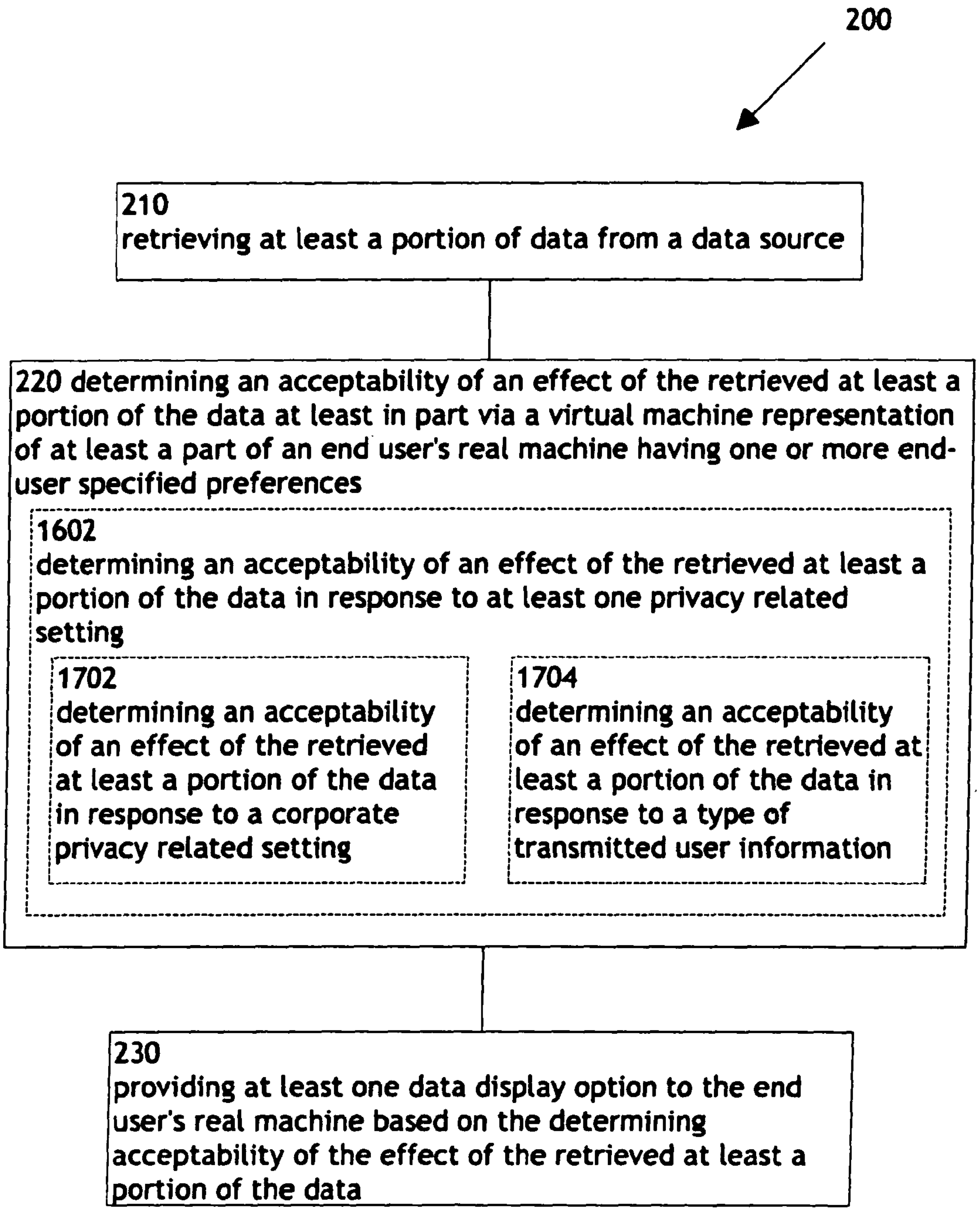
FIG. 17 illustrates an alternative embodiment of the operational flow of FIG. 2.

FIG. 17 illustrates alternative embodiments of the example operational flow 200 of FIG. 2. FIG. 17 illustrates example embodiments where the operation 220 may include at least one additional operation. Additional operations may include an operation 1702, and/or an operation 1704. The operation 1702 illustrates determining an acceptability of an effect of the retrieved at least a portion of the data in response to a corporate privacy related setting. Continuing the example above, at least one of virtual machines 11, 12, and/or 13 (FIG. 1B) may compare the data received from the virtual machine module 118 (FIG. 1A) to a corporate privacy related setting (e.g., will a website request information about a corporation such as data stored on a real machine belonging to the corporation) contained in user preference database information spawned on at least one of virtual machines 11, 12, and/or 13. Corporate privacy related setting may be determined by a corporate issued privacy manual, or other such document or mandate set forth by officers of a corporation.

The operation 1704 illustrates determining an acceptability of an effect of the retrieved at least a portion of the data in response to a type of transmitted user information. Continuing the example above, at least one of virtual machines 11, 12, and/or 13 (FIG. 1B) may compare the data received from the virtual machine module 118 (FIG. 1A) to at least one acceptable type of transmitted user information setting (e.g., do not return links that will transmit my e-mail address, home address or telephone number to an external location) contained in user preference database information spawned on at least one of virtual machines 11, 12, and/or 13. Acceptable type of transmitted user information setting may be determined by a user 10 (FIG. 1B). For instance, acceptability of the effect of the data may be determined in response to whether or not private user information, such as credit card numbers, bank accounts, personal identification information or any other personal user information may be transmitted to a location external to the real machine by selecting the link.

Figure 18:
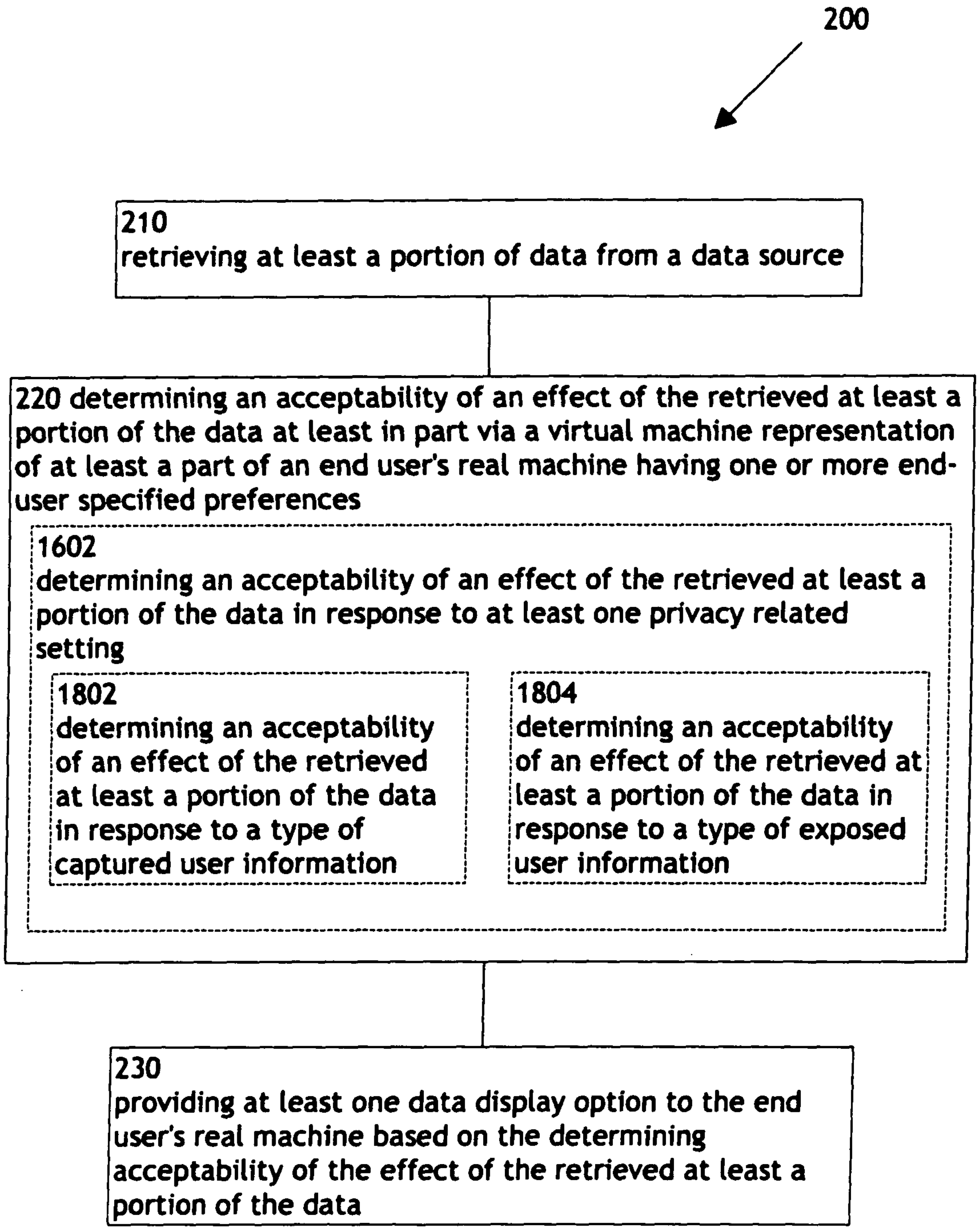
FIG. 18 illustrates an alternative embodiment of the operational flow of FIG. 2.

FIG. 18 illustrates alternative embodiments of the example operational flow 200 of FIG. 2. FIG. 18 illustrates example embodiments where the operation 220 may include at least one additional operation. Additional operations may include an operation 1802, and/or an operation 1804. The operation 1802 illustrates determining an acceptability of an effect of the retrieved at least a portion of the data in response to a type of captured user information. Continuing the example above, at least one of virtual machines 11, 12, and/or 13 (FIG. 1B) may compare the data received from the virtual machine module 118 (FIG. 1A) to at least one acceptable type of captured user information setting (e.g., do not return links that will capture my e-mail address, home address or telephone number) contained in user preference database information spawned on at least one of virtual machines 11, 12, and/or 13. Acceptable type of captured user information setting may be determined by a user 10 (FIG. 1B). For instance, acceptability of the effect of the data may be determined in response to whether or not private user information, such as credit card numbers, bank accounts, personal identification information or any other personal user information may be captured by a machine located at a location external to the real machine by selecting the link.

The operation 1804 illustrates determining an acceptability of an effect of the retrieved at least a portion of the data in response to a type of exposed user information. Continuing the example above, at least one of virtual machines 11, 12, and/or 13 (FIG. 1B) may compare the data received from the virtual machine module 118 (FIG. 1A) to at least one acceptable type of exposed user information setting (e.g., do not return links that will expose personal financial information stored on the real machine 130) contained in user preference database information spawned on at least one of virtual machines 11, 12, and/or 13. Acceptable types of exposed user information settings may be determined by a user 10 (FIG. 1B). For instance, acceptability of the effect of the data may be determined in response to whether or not private user information, such as credit card numbers, bank accounts, personal identification information or any other personal user information may be exposed to a machine located at a location external to the real machine by selecting the link.

Figure 19:
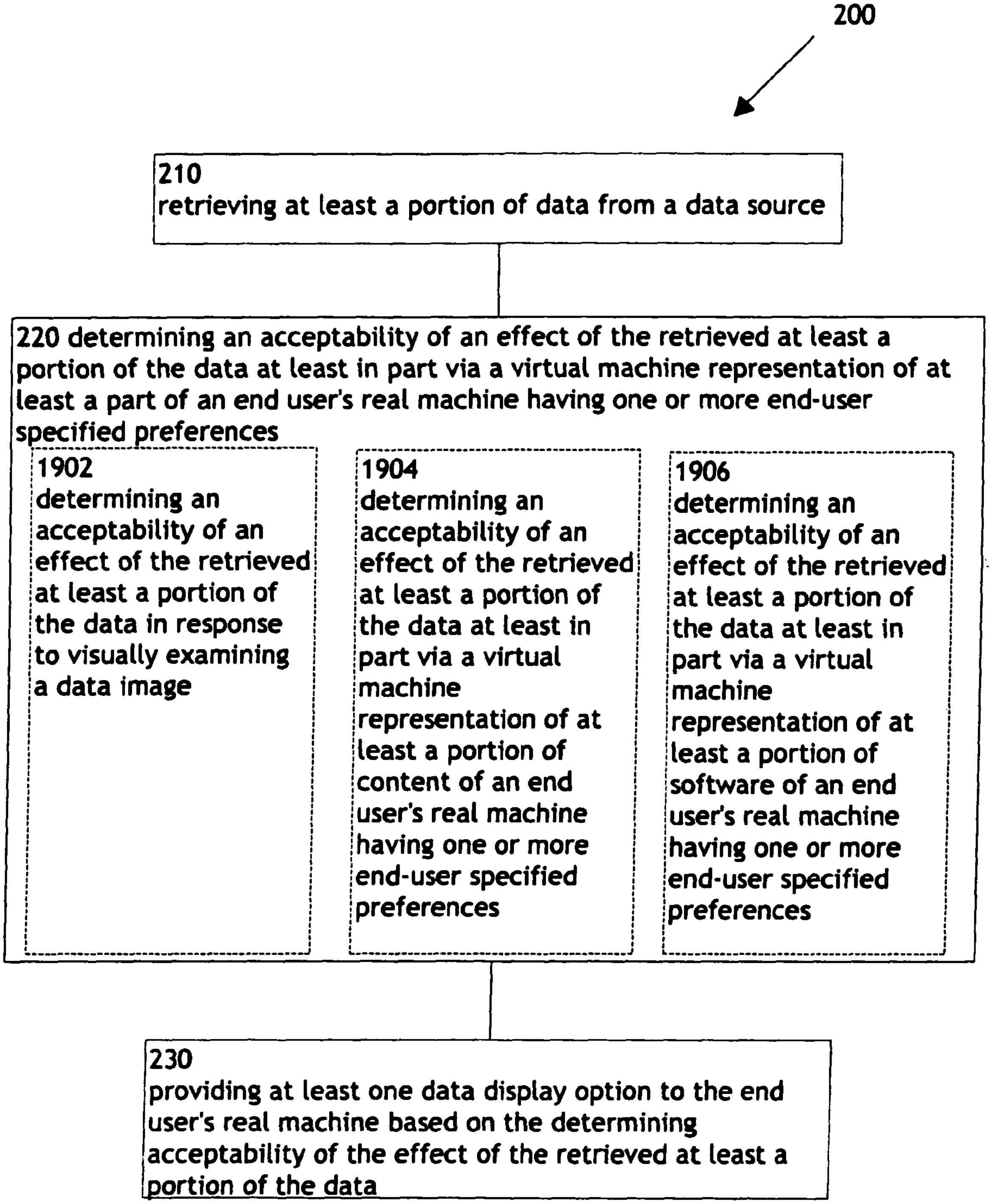
FIG. 19 illustrates an alternative embodiment of the operational flow of FIG. 2.

FIG. 19 illustrates alternative embodiments of the example operational flow 200 of FIG. 2. FIG. 19 illustrates example embodiments where the operation 220 may include at least one additional operation. Additional operations may include an operation 1902, an operation 1904, and/or an operation 1906.

The operation 1902 illustrates determining an acceptability of an effect of the retrieved at least a portion of the data in response to visually examining a data image. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. To visually examine a data image, at least one of virtual machines 11, 12, and/or 13 (FIG. 1B) may include an image scanning module. In one embodiment, visually examining a data image may include computer implemented image analysis, such as, color analysis, pattern-matching, pattern-recognition, or any other technique for recognizing a particular image or type of image.

The operation 1904 illustrates determining an acceptability of an effect of the retrieved at least a portion of the data at least in part via a virtual machine representation of at least a portion of content of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. FIG. 1B shows virtual machines 11, 12, and 13 encompassing a virtual machine representation of real machine 130, post (e.g., subsequent to) activation of Link 1, Link 2, and Link 3, respectively (e.g., as at least a part of real machine 130 would exist had Link 1, Link 2, and/or Link 3 actually been traversed on real machine 130). FIG. 1B further depicts virtual machines 11, 12, and 13 including a virtual machine representation of content of the real machine 130 post activation of Link 1, Link 2, and/or Link 3, respectively. Examples of such content include a movie, music file, a script (e.g., Java script or Active X control), a markup language, an email, etc. downloaded onto real machine 130 from one or more sources associated with activation/traversal of Link 1, Link 2, and/or Link 3. An example of determining an acceptability of an effect of the data at least in part via a virtual machine representation may include determining an acceptability of an effect of the data at least in part via a virtual machine representation of at least a portion of the content of the real machine include determining whether or not a video or image has been loaded onto, for example, the virtual machine 11 after loading at least a portion of the data contained in Link 1.

The operation 1906 illustrates determining an acceptability of an effect of the retrieved at least a portion of the data at least in part via a virtual machine representation of at least a portion of software of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. FIG. 1B shows virtual machines 11, 12, and 13 encompassing a virtual machine representation of real machine 130, post (e.g., subsequent to) activation of Link 1, Link 2, and Link 3, respectively (e.g., as at least a part of real machine 130 would exist had Link 1, Link 2, and/or Link 3 actually been traversed on real machine 130). FIG. 1B illustrates virtual machine 11 including a virtual machine representation of software (e.g., a state of software, such as a state of Windows Media Player) of the real machine 130 post (e.g., subsequent to) activation of Link 1. Examples of such software might include a commercial word processing program or suite of programs (e.g., Microsoft® Office for Windows), an open source Web browser (e.g., Mozilla's Firefox® Browser), an AJAX mash up (e.g., an executing JavaScript™ and/or data obtained by same via an XML-like scheme), a commercial database management system (e.g., one or more of Oracle Corporation's various products), a commercial anti-malware/spyware program (e.g., such as those of Symantec Corporation or McAfee, Inc.), a multi-media program (e.g., QuickTime) etc. An example of determining an acceptability of an effect of the data at least in part via a virtual machine representation may include determining an acceptability of an effect of the content of the data at least in part via a virtual machine representation of at least a portion of the software of the real machine include determining whether or not an unauthorized program or suite of programs (e.g., music downloading software) has been loaded, for example, onto virtual machine 12 after loading at least a portion of the data contained in Link 2.

Figure 20:
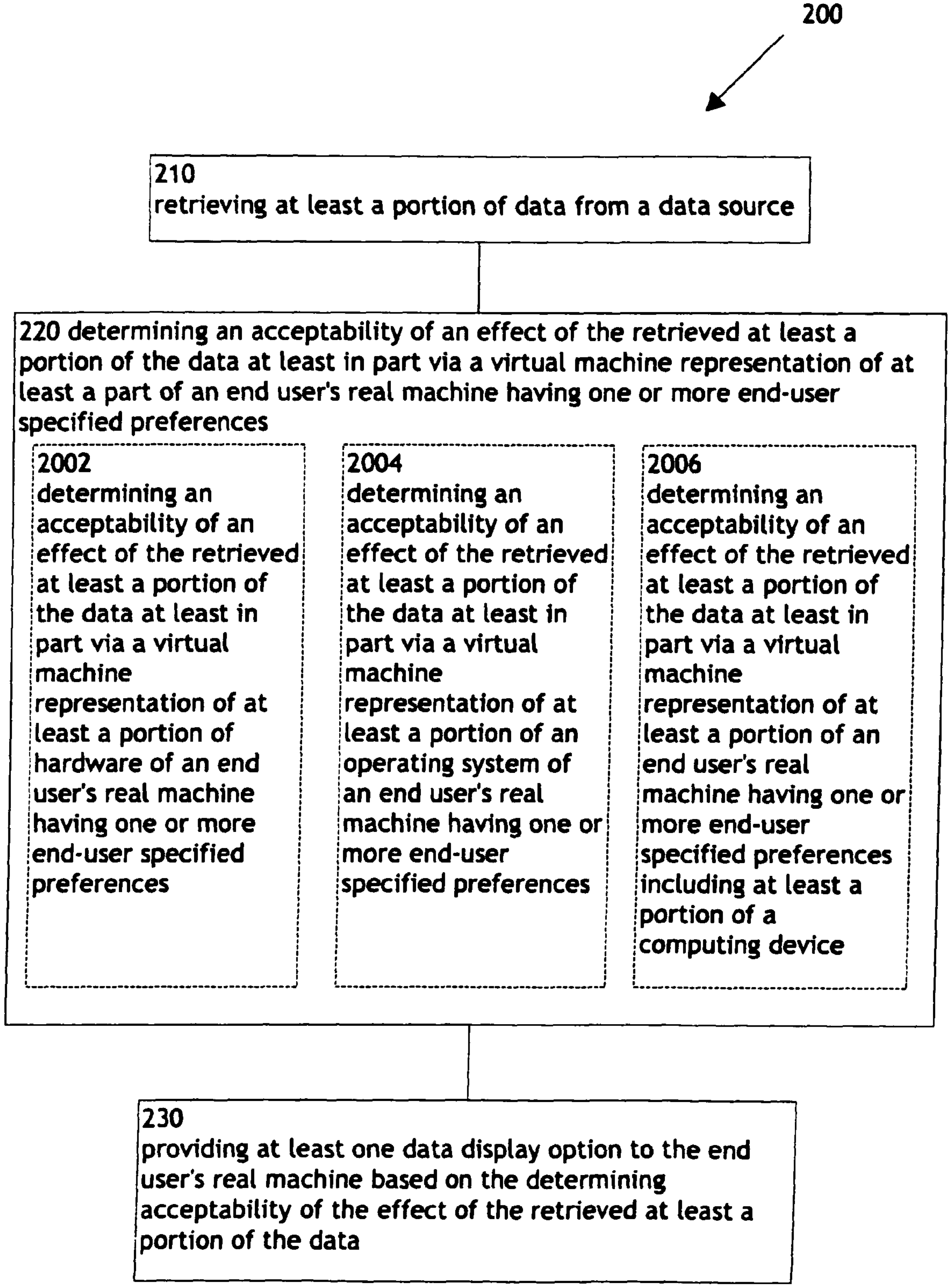
FIG. 20 illustrates an alternative embodiment of the operational flow of FIG. 2.

FIG. 20 illustrates alternative embodiments of the example operational flow 200 of FIG. 2. FIG. 20 illustrates example embodiments where the operation 220 may include at least one additional operation. Additional operations may include an operation 1902, an operation 2004, and/or an operation 2006.

The operation 2002 illustrates determining an acceptability of an effect of the retrieved at least a portion of the data at least in part via a virtual machine representation of at least a portion of hardware of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. FIG. 1B illustrates virtual machine 11 including a virtual machine representation of hardware (e.g., a state of the hardware) of the real machine 130 post activation of Link 1. Examples of such hardware might include all or part of a chipset (e.g., data processor and/or graphics processor chipsets such as those of Intel Corporation and/or NvidiaCorporation), a memory chip (e.g., flash memory and/or random access memories such as those of Sandisk Corporation and/or Samsung Electronics, Co., LTD), a data bus, a hard disk (e.g., such as those of Seagate Technology, LLC), a network adapter (e.g., wireless and/or wired LAN adapters such as those of Linksys and/or CiscoTechnology, Inc.), printer, a removable drive (e.g., flash drive), a cell phone, etc. An example of determining an acceptability of an effect of the data at least in part via a virtual machine representation includes determining an acceptability of an effect of the data at least in part via a virtual machine representation of at least a portion of the hardware of the real machine includes determining whether a network adapter on, for example, virtual machine 12 has been disabled after loading at least a portion of the data contained in Link 2.

The operation 2004 illustrates determining an acceptability of an effect of the retrieved at least a portion of the data at least in part via a virtual machine representation of at least a portion of an operating system of an end user's real machine having one or more end-user specified preferences. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13, and transfer the data to at least one of virtual machines 11, 12, and/or 13. FIG. 1B shows virtual machines 11, 12, and 13 encompassing a virtual machine representation of real machine 130, post (e.g., subsequent to) activation of Link 1, Link 2, and Link 3, respectively (e.g., as at least a part of real machine 130 would exist had link 1, link 2, and/or link 3 actually been traversed on real machine 130). FIG. 1B illustrates virtual machine 11 including a virtual machine representation of an operating system (e.g., a state of an operating system and/or network operating system) of the real machine 130 post activation of Link 1. Examples of such an operating system might include a computer operating system (e.g., Microsoft® Windows 2000, Unix, Linux, etc) and/or a network operating system (e.g., the Internet Operating System available from Cisco Technology, Inc. Netware® available from Novell, Inc., and/or Solaris available from Sun Microsystems, Inc.). An example of determining an acceptability of an effect of the data at least in part via a virtual machine representation includes determining an acceptability of an effect of the data at least in part via a virtual machine representation of at least a portion of an operating system of the real machine include determining whether a portion of the operating system (e.g., Microsoft Vista) on for example, virtual machine 12 has been disabled after loading at least a portion of the data contained in Link 2.

The operation 2006 illustrates determining an acceptability of an effect of the retrieved at least a portion of the data at least in part via a virtual machine representation of at least a portion of an end user's real machine having one or more end-user specified preferences including at least a portion of a computing device. FIG. 1D illustrates real machine 130 including at least a part of a computing device 132. The computing device 132 may be any device capable of processing one or more programming instructions. For example, the computing device 132 may be a desktop computer, a laptop computer, a notebook computer, a mobile phone, a personal digital assistant (PDA), combinations thereof, and/or other suitable computing devices.

Figure 21:
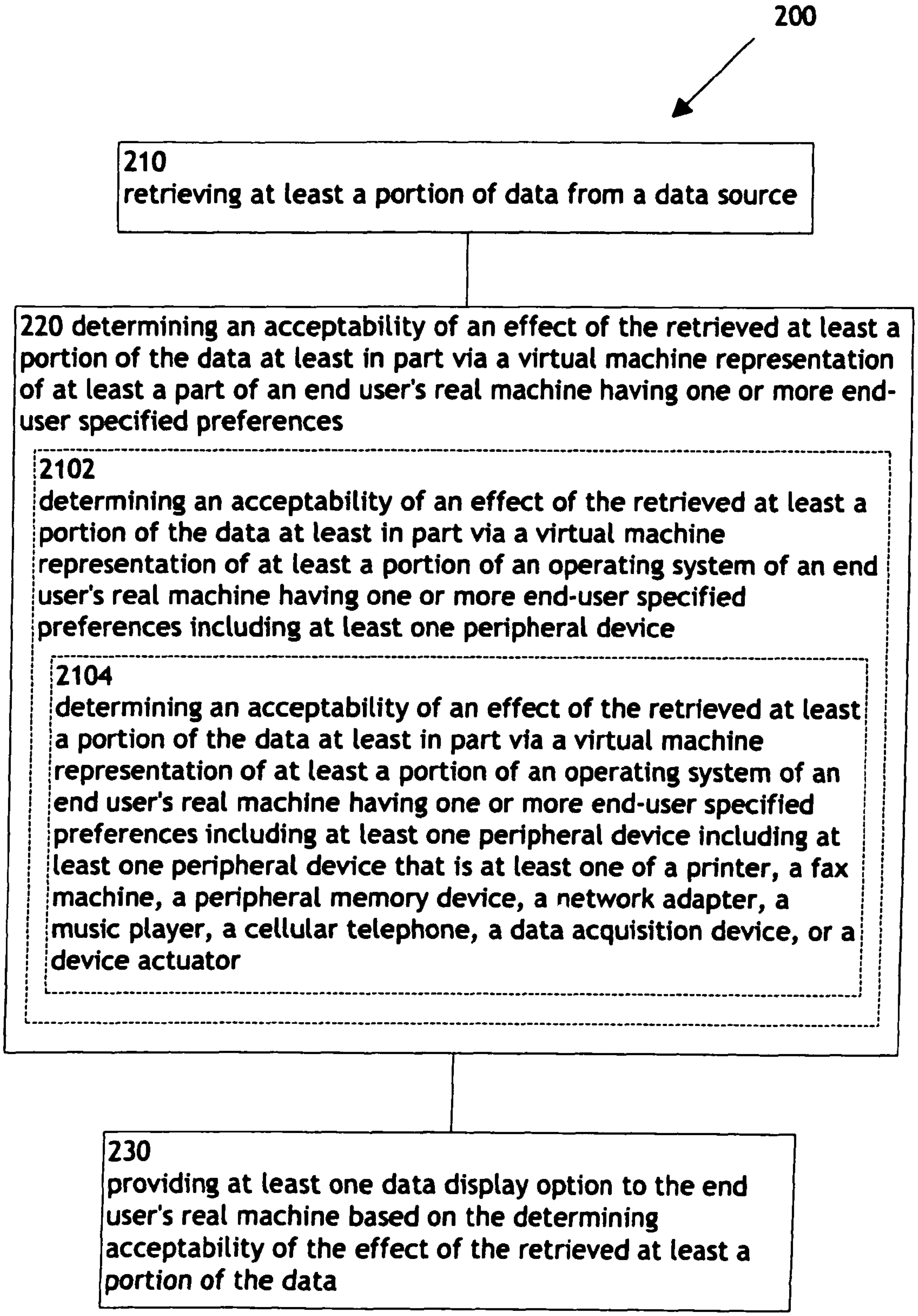
FIG. 21 illustrates an alternative embodiment of the operational flow of FIG. 2.

FIG. 21 illustrates alternative embodiments of the example operational flow 200 of FIG. 2. FIG. 21 illustrates example embodiments where the operation 220 may include at least one additional operation. Additional operations may include an operation 2102, and/or an operation 2104.

The operation 2102 illustrates determining an acceptability of an effect of the retrieved at least a portion of the data at least in part via a virtual machine representation of at least a portion of an end user's real machine having one or more end-user specified preferences including at least one peripheral device. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one virtual machine 11, 12, and/or 13 that may be a virtual machine representation of at least a part of real machine 130. Real machine 130 (FIG. 1B) may include at least one peripheral device. For instance, FIG. 1D illustrates real machine 130 including at least one peripheral device 134-146. FIG. 1D shows a representative view of an implementation of real machine 130 (e.g., a desktop, notebook, or other type computing system, and/or one or more peripheral devices) in which all/part of system 100 may be implemented. FIG. 1D illustrates that implementations of real machine 130 may include all/part of computing device 132 and/or all/part of one or one or more peripherals associated computing device 132.

The operation 2104 illustrates determining an acceptability of an effect of the retrieved at least a portion of the data at least in part via a virtual machine representation of at least a portion of an end user's real machine having one or more end-user specified preferences including at least one peripheral device including at least one peripheral device that is at least one of a printer, a fax machine, a peripheral memory device, a network adapter, a music player, a cellular telephone, a data acquisition device, or a device actuator. Continuing the example above, FIG. 1A shows the Effect of data acceptability determination engine 106. Effect of data acceptability determination engine 106 may receive data from data retriever engine 102. FIG. 1A further illustrates the Effect of data acceptability determination engine 106 further including a virtual machine module 118 and a user preference database 120. Effect of data acceptability determination engine 106 may transfer the data to the virtual machine module 118. Virtual machine module 118 (FIG. 1A) may spawn at least one of virtual machines 11, 12, and/or 13 that may be a virtual machine representation of at least a part of real machine 130. Real machine 130 may include at least one peripheral device. For instance, FIG. 1D illustrates an end user's real machine may also include at least a portion of one or more peripheral devices connected/connectable (e.g., via wired, waveguide, or wireless connections) to real machine 130. Peripheral devices may include one or more printers 134, one or more fax machines 136, one or more peripheral memory devices 138 (e.g., flash drive, memory stick), one or more network adapters 139 (e.g., wired or wireless network adapters), one or more music players 140, one or more cellular telephones 142, one or more data acquisition devices 144 (e.g., robots) and/or one or more device actuators 146 (e.g., a computer-controlled manufacturing device, medical device, an hydraulic arm, a radiation emitter, or any other component(s) of industrial/medical systems).

Figure 22:
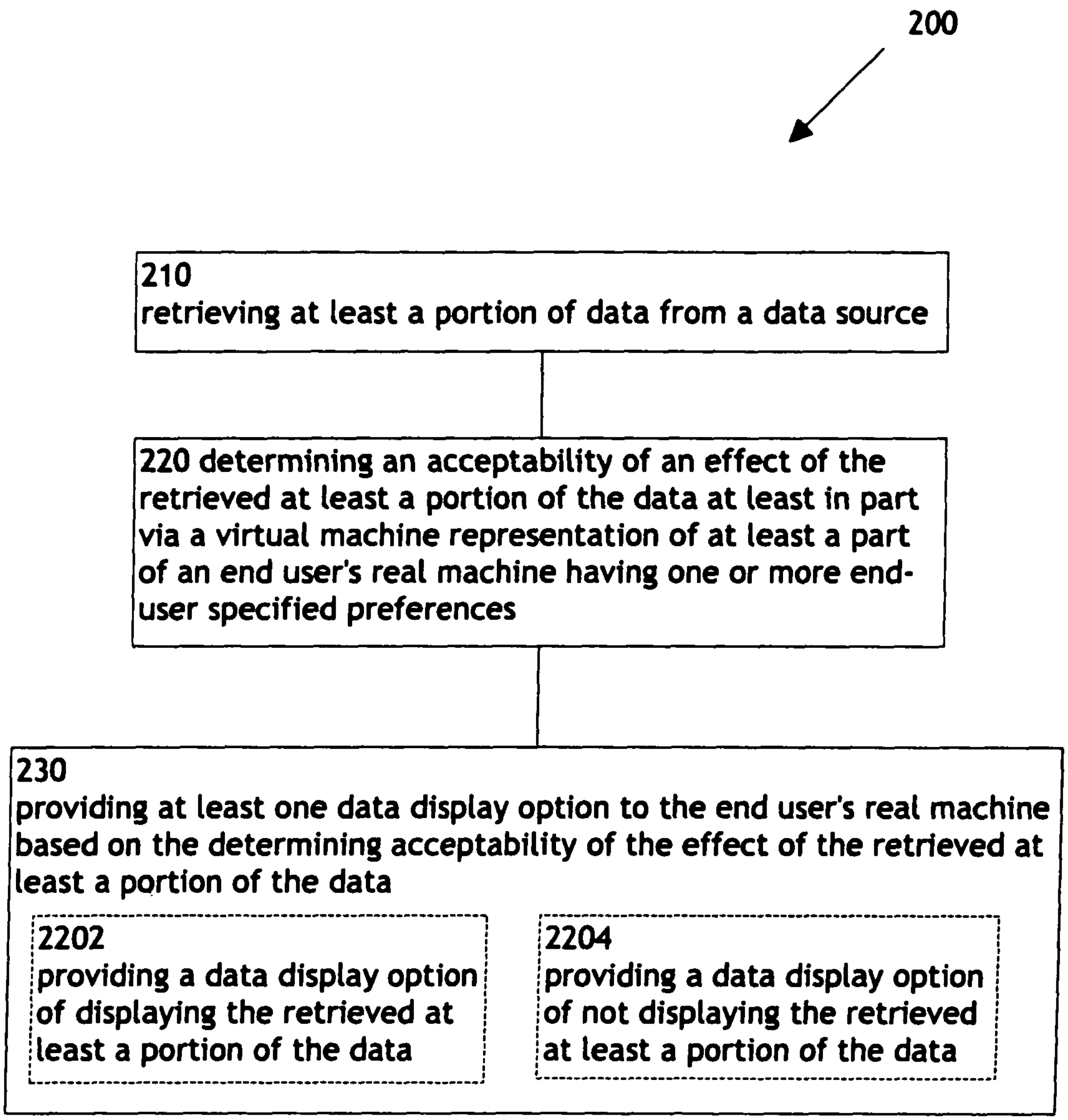
FIG. 22 illustrates an alternative embodiment of the operational flow of FIG. 2.

FIG. 22 illustrates alternative embodiments of the example operational flow 200 of FIG. 2. FIG. 22 illustrates example embodiments where the operation 230 may include at least one additional operation. Additional operations may include an operation 2202, and/or an operation 2204.

The operation 2202 illustrates providing a data display option of displaying the retrieved at least a portion of the data. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination to the data provider engine 108 to provide the data display option of displaying at least a portion of the data. For instance, data provider engine 108 may receive at least one display instruction (e.g., OK to display the entire text of link 1) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the display instruction to the data provider engine 108. Data provider engine 108 may then display the data. Displayed data may be an unmodified web page of text, images and/or video, or a web page including links to additional web pages and may be displayed on an end user's real machine display such as a computer screen.

The operation 2204 illustrates providing a data display option of not displaying the retrieved at least a portion of the data. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination to the data provider engine 108 to provide the data display option of not displaying at least a portion of the data. For instance, data provider engine 108 may receive at least one do not display instruction (e.g., Do not display the text of link 1) from at least one component of Effect of data acceptability determination engine 106 (FIG. 1A). At least one of virtual machines 11, 12, and/or 13 (FIG. 1B) may include one or more instruction generating modules configured to provide a do not display instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the do not display instruction to the data provider engine 108. The data display option of not displaying the data may include a message indicated why the data is not being displayed, or may be, for example, a blank page displayed on a display of the real machine.

Figure 23:
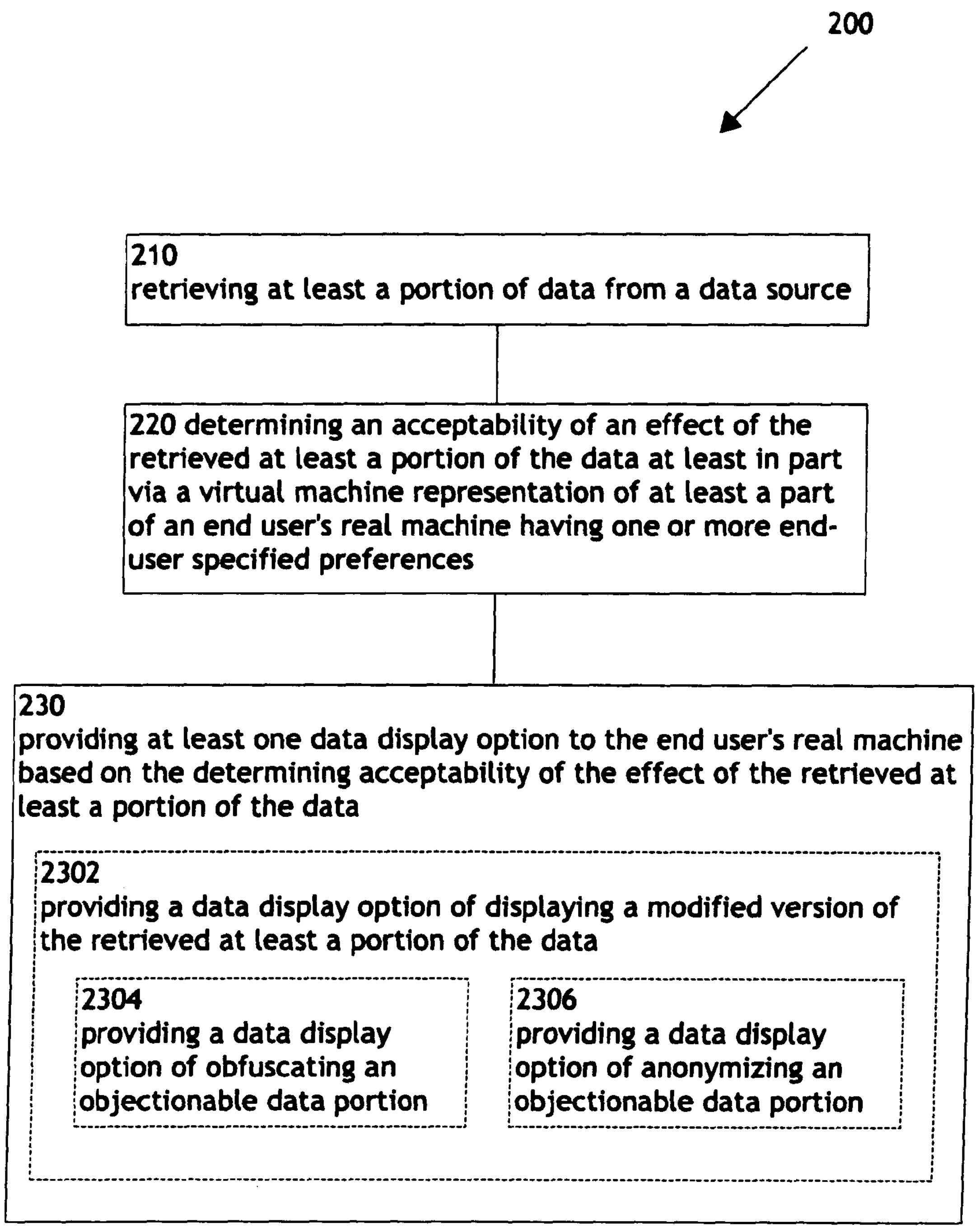
FIG. 23 illustrates an alternative embodiment of the operational flow of FIG. 2.

FIG. 23 illustrates alternative embodiments of the example operational flow 200 of FIG. 2. FIG. 23 illustrates example embodiments where the operation 230 may include at least one additional operation. Additional operations may include an operation 2302, an operation 2304, and/or an operation 2306.

The operation 2302 illustrates providing a data display option of displaying a modified version of the retrieved at least a portion of the data Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination to the data provider engine 108 to provide the data display option of displaying at least a modified version of the data. For instance, data provider engine 108 (FIG. 1A) may receive at least one modify data instruction (e.g., display only lines 1-10 of the text of link 1) from at least one component of Effect of data acceptability determination engine 106. (FIG. 1A). At least one of virtual machines 11, 12, and/or 13 may include one or more instruction generating modules configured to provide a modify data instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the modify data instruction to the data provider engine 108. The data provider engine 108 may transmit the modify data instruction to the data modification engine 122 for modification of the data. Data modification engine may transmit the modified data to the data provider engine 108. Data provider engine 108 may then display the modified version of the data. Displayed data may be a modified web page of text, a modified image and/or a modified video, or a modified web page including links to additional web pages. For instance, a webpage or website may be displaying, but any obscenities on the web page or website may replaced by non-obscene word alternatives.

The operation 2304 illustrates providing a data display option of obfuscating an objectionable data portion. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination to the data provider engine 108 to provide the data display option of obfuscating (e.g., blurring) a portion of the data (e.g., obscene photos). For instance, data provider engine 108 may receive at least one obfuscate data instruction (e.g., display only non-obscene portions of the image in link 1) from at least one component of Effect of data acceptability determination engine 106 (FIG. 1A). At least one of virtual machines 11, 12, and/or 13 (FIG. 1B) may include one or more instruction generating modules configured to provide an obfuscate data instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the obfuscate data instruction to the data provider engine 108. The data provider engine 108 may transmit the obfuscate data instruction to the data modification engine 122 which may transmit the obfuscate data instruction to the data obfuscation engine 124. Data obfuscation engine 124 may transmit the obfuscated data to the data modification engine 122 for transmission to the data provider engine 108. Data provider engine 108 may then display the obfuscated version of the data. For example, obfuscating logic may obfuscate restricted data or imagery within a webpage or image. Obfuscation may include blurring or blocking of the objectionable data portion.

The operation 2306 illustrates providing a data display option of anonymizing an objectionable data portion. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination and an instruction to the data provider engine 108 to provide the data display option of anonymizing (e.g., obscuring source information) for a portion of the data (e.g., graphic videos). For instance, data provider engine 108 may receive at least one anonymize data instruction (e.g., obscure source information for portions of the video in link 1) from at least one component of Effect of data acceptability determination engine 106 (FIG. 1A). At least one of virtual machines 11, 12, and/or 13 may include one or more instruction generating modules configured to provide an anonymize data instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the anonymize data instruction to the data provider engine 108. The data provider engine 108 may transmit the anonymize data instruction to the data modification engine 122 which may transmit the anonymize data instruction to the data anonymization engine 126. Data anonymization engine 126 may transmit the anonymized data to the data modification engine 122 for transmission to the data provider engine 108. Data provider engine 108 may then display the anonymized version of the data. Anonymized data may be data in which the original identity information of the data is hidden, obscured, replaced, and/or otherwise modified.

Figure 24:
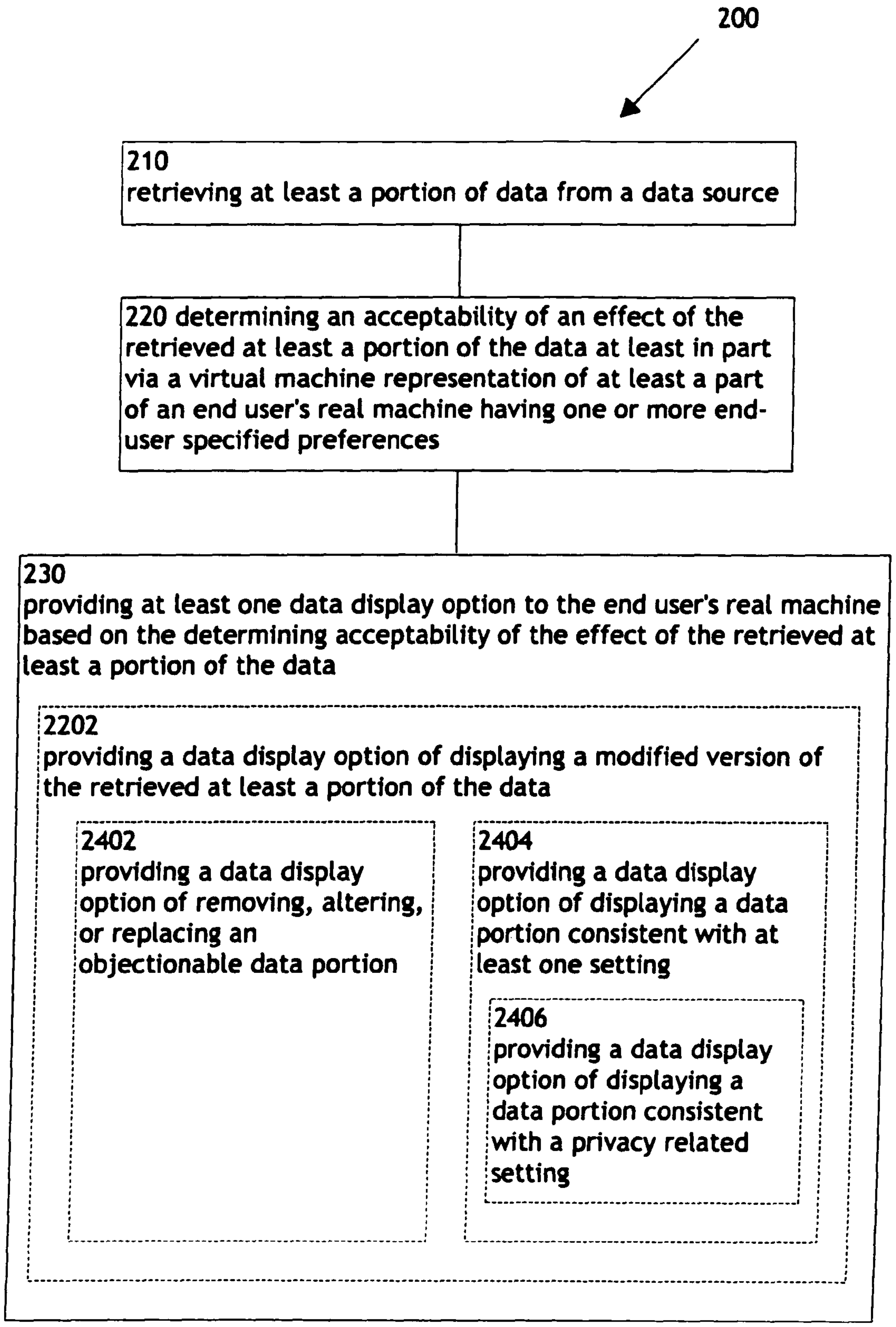
FIG. 24 illustrates an alternative embodiment of the operational flow of FIG. 2.

FIG. 24 illustrates alternative embodiments of the example operational flow 200 of FIG. 2. FIG. 24 illustrates example embodiments where the operation 230 may include at least one additional operation. Additional operations may include an operation 2402, an operation 2404, and/or an operation 2406. The operation 2402 illustrates providing a data display option of removing, altering, or replacing an objectionable data portion. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination and an instruction to the data provider engine 108 to provide the data display option of removing, altering or replacing an objectionable data portion (e.g., replacing profanity with innocuous language) for a portion of the data (e.g., explicit lyrics). For instance, data provider engine 108 may receive at least one alter, remove or replace instruction (e.g., obscure source information for portions of the video in link 1) from at least one component of Effect of data acceptability determination engine 106 (FIG. 1A). At least one of virtual machines 11, 12, and/or 13 may include one or more instruction generating modules configured to provide a remove, alter or replace data instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the remove, alter or replace data instruction to the data provider engine 108. The data provider engine 108 may transmit the anonymize data instruction to the data modification engine 122 which may then remove, alter or replace the data. Data modification engine 122 may transmit the data containing removed, altered or replaced portions to the data provider engine 108. Data provider engine 108 may then display the data containing removed, altered, or replaced portions. Thus, in one specific example, a portion of a webpage produced by a search including data relating to religions other than Catholicism may be removed from the web page prior to display of the data on an end user's real machine display such as a computer screen.

The operation 2404 illustrates providing a data display option of displaying a data portion consistent with at least one setting. Continuing the example above, data provider engine 108 (FIG. 1A) may be in communication with Effect of data acceptability determination engine 106 (FIG. 1A), which may receive data from data obtainer engine 102 (FIG. 1A). Effect of data acceptability determination engine 106 may transfer effect of data acceptability determination to the data provider engine 108 to provide the data display option of displaying data consistent with at least one setting. For instance, data provider engine 108 may receive at least one display instruction (e.g., OK to display webpage) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a setting stored, for example, in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one setting, the data provider engine 108 (FIG. 1A) may transmit the modify data instruction to the data modification engine 122 for modification of the data. Data modification engine 122 (FIG. 1A) may transmit the modified data to the data provider engine 108. Data provider engine 108 may then display the data consistent with the setting. Thus, a webpage or website data may be determined to be displayable if the data satisfies a setting when at least one of virtual machines 11, 12, and/or 13 compares the data to the setting. For instance, a portion of a webpage produced by a search including non-English text may be removed from the web page prior to display of the data on a computer screen. Further, in one specific example, a webpage or website data may be determined to be displayable if the data satisfies a peer setting, or a webpage or website data may be determined to be displayable if the data satisfies, for instance, a corporate setting.

The operation 2406 illustrates providing a data display option of displaying a data portion consistent with a privacy related setting. Continuing the example above, at least one of virtual machines 11, 12, and/or 13 may include one or more instruction generating modules configured to provide an instruction to the Effect of data acceptability determination engine 106 after a comparison of an activation of a link to a privacy related setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one privacy related setting, the data provider engine 108 (FIG. 1A) may transmit the modify data instruction to the data modification engine 122 (FIG. 1A) for modification of the data. Data modification engine 122 may transmit the modified data to the data provider engine 108. Data provider engine 108 may then display the data consistent with the privacy related setting. For instance, a portion of a returned webpage including data requesting private user information such as a user's social security number or e-mail address may be removed from the web page prior to display of the data on a computer screen. Further specific examples include a webpage or website data may be determined to be displayable if the data satisfies a setting such as a privacy related setting such as a setting relating to a user's biographical information or financial information, a webpage or website data may be determined to be displayable if the data satisfies a group privacy related setting such as a work group (e.g., employees of a company), a peer group (e.g., members of a book club), or a family group (e.g., members of family unit) privacy related setting, or a webpage or website data may be determined to be displayable if the data satisfies a privacy setting determined by a corporation or other organization to maintain corporate or organization privacy.

Figure 25:
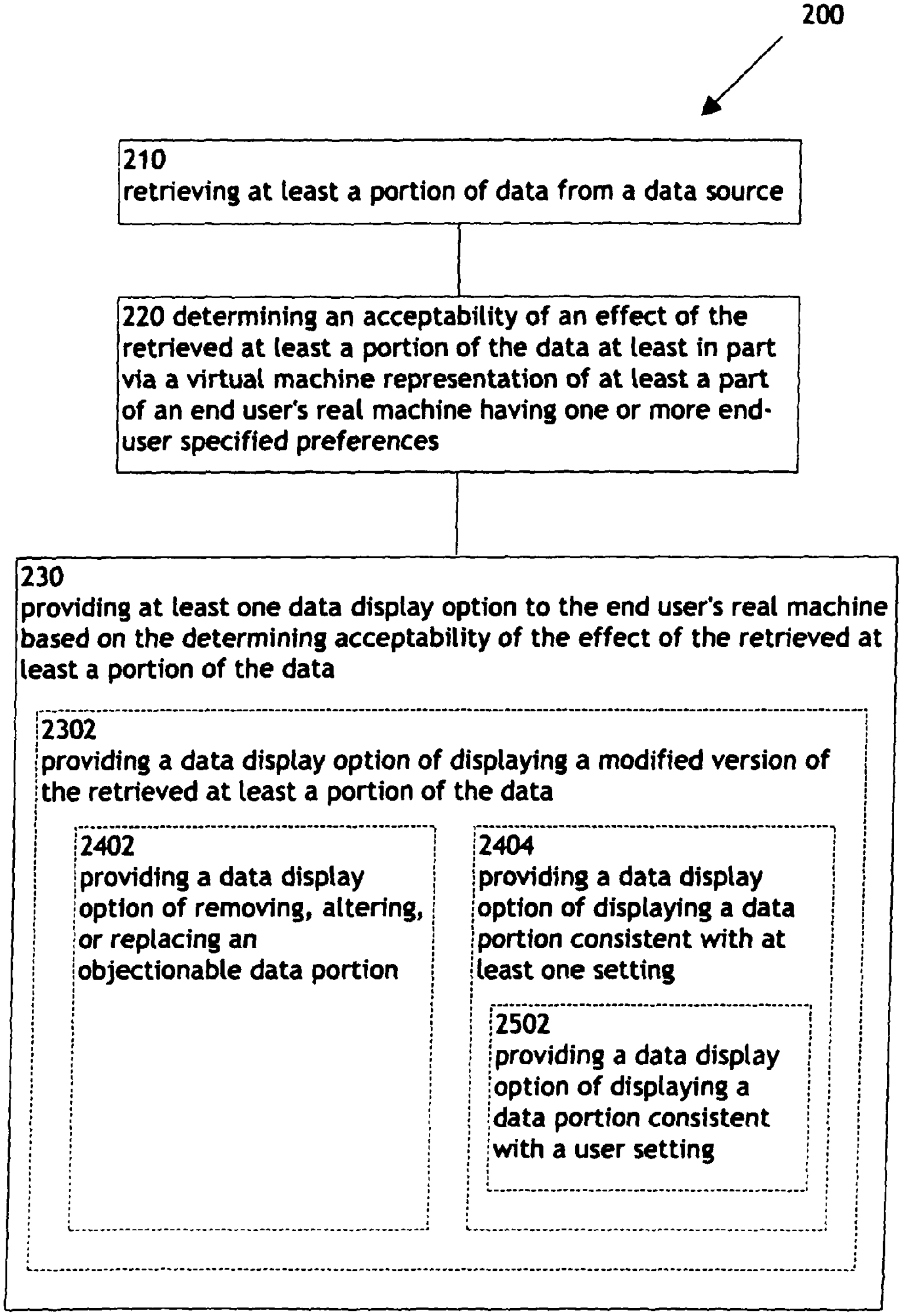
FIG. 25 illustrates an alternative embodiment of the operational flow of FIG. 2.

FIG. 25 illustrates alternative embodiments of the example operational flow 200 of FIG. 2. FIG. 25 illustrates example embodiments where the operation 230 may include at least one additional operation. Additional operations may include an operation 2502. The operation 2502 illustrates providing a data display option of displaying a data portion consistent with a user setting. Continuing the example above, Effect of data acceptability determination engine 106 may transfer effect of data acceptability determination to the data provider engine 108 to provide the data display option of displaying data consistent with at least one user setting. For instance, data provider engine 108 may receive at least one display instruction (e.g., OK to display webpage) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a user setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one user setting, the data provider engine 108 (FIG. 1A) may transmit the modify data instruction to the data modification engine 122 for modification of the data. Data modification engine 122 (FIG. 1A) may transmit the modified data to the data provider engine 108. Data provider engine 108 may then display the data consistent with the user setting. Thus, a webpage or website data may be determined to be displayable if the data satisfies a user setting when at least one of virtual machines 11, 12, and/or 13 compares the data to the user setting. For instance, a portion of a webpage produced by a search including non-English text may be removed from the web page prior to display of the data on a computer screen. Further, in one specific example, a webpage or website data may be determined to be displayable if the data satisfies a peer user setting, or a webpage or website data may be determined to be displayable if the data satisfies, for instance, a corporate user setting.

Figure 26:
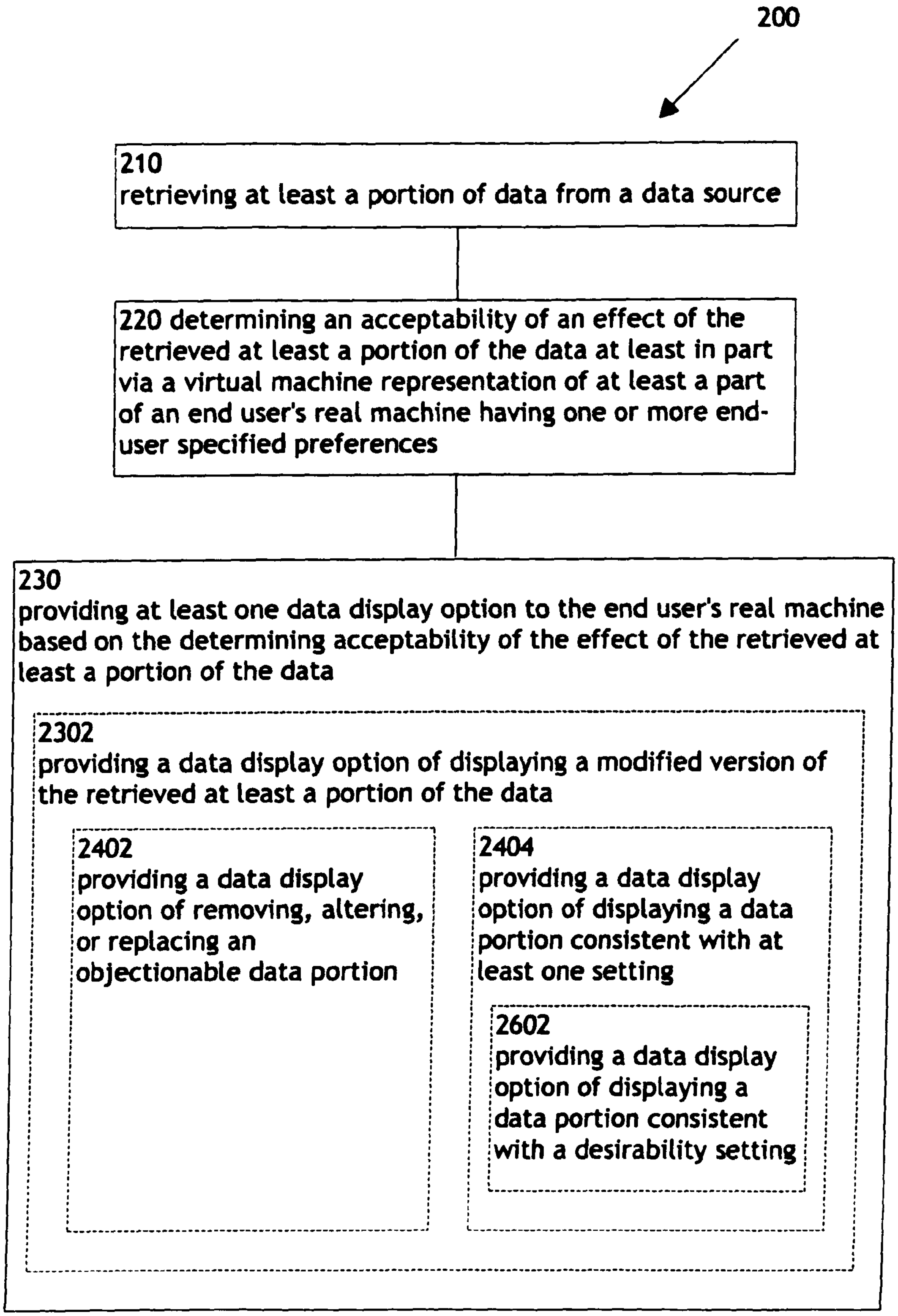
FIG. 26 illustrates an alternative embodiment of the operational flow of FIG. 2.

FIG. 26 illustrates alternative embodiments of the example operational flow 200 of FIG. 2. FIG. 26 illustrates example embodiments where the operation 230 may include at least one additional operation. Additional operations may include an operation 2602. The operation 2602 illustrates providing a data display option of displaying a data portion consistent with a desirability setting. Continuing the example above, at least one of virtual machines 11, 12, and/or 13 may include one or more instruction generating modules configured to provide an instruction to the Effect of data acceptability determination engine 106 after a comparison of an activation of a link to a desirability setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one desirability setting, the data provider engine 108 (FIG. 1A) may transmit the modify data instruction to the data modification engine 122 (FIG. 1A) for modification of the data. Data modification engine 122 may transmit the modified data to the data provider engine 108. Data provider engine 108 may then display the data portion consistent with the desirability setting. For instance, the data display option may be displaying on a display of an end user's real machine only a data portion consistent with a Christian desirability setting such as "display only Christianity related data." In other examples, a webpage or website data may be determined to be displayable if the data satisfies a desirability setting, a webpage or website data may be determined to be displayable if the data satisfies a religious desirability setting such as a Christian, Jewish, and/or Muslim, based religious desirability setting, or may be based on any other major, minor or alternative religious desirability setting, a webpage or website data may be determined to be displayable if the data satisfies a political desirability setting such as a Republican, Democratic, Libertarian or Green Party political desirability setting, a webpage or website data may be determined to be displayable if the data satisfies a cultural desirability setting such as a religious, ethnic, regional, or heritage based cultural desirability setting or any other cultural desirability setting, a webpage or website data may be determined to be displayable if the data satisfies a theme related desirability setting such as boating or card games, or a webpage or website data may be determined to be displayable if the data satisfies an age appropriateness desirability setting such as a setting based on the Motion Picture of America Association film rating system.

Figure 27:
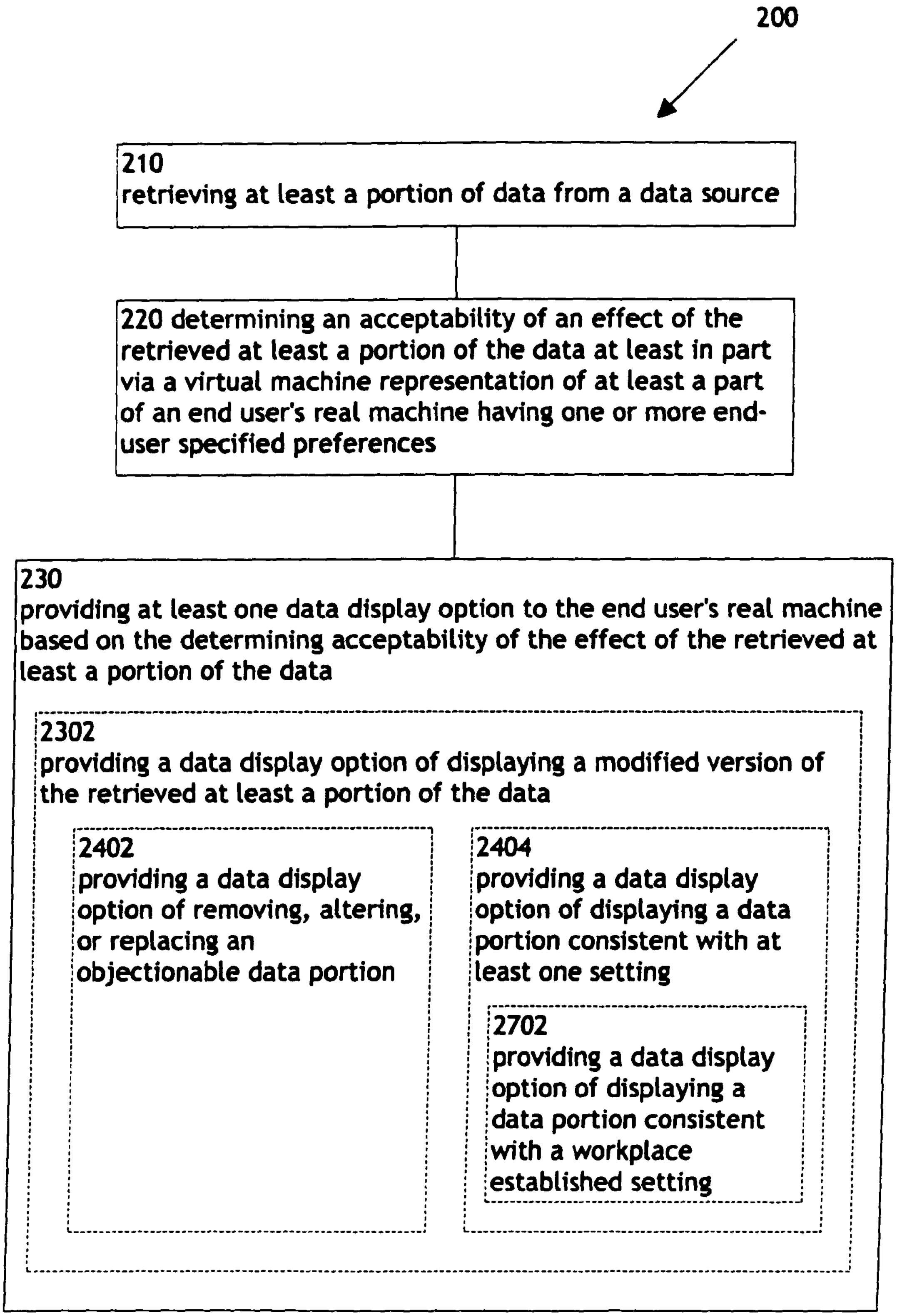
FIG. 27 illustrates an alternative embodiment of the operational flow of FIG. 2.

FIG. 27 illustrates alternative embodiments of the example operational flow 200 of FIG. 2. FIG. 27 illustrates example embodiments where the operation 230 may include at least one additional operation. Additional operations may include an operation 2702. The operation 2702 illustrates providing a data display option of displaying a data portion consistent with a workplace established setting. Continuing the example above, at least one of virtual machines 11, 12, and/or 13 may include one or more instruction generating modules configured to provide an instruction to the Effect of data acceptability determination engine 106 after a comparison of an activation of a link to a workplace established setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one workplace established setting, the data provider engine 108 (FIG. 1A) may transmit the modify data instruction to the data modification engine 122 (FIG. 1A) for modification of the data. Data modification engine 122 may transmit the modified data to the data provider engine 108. Data provider engine 108 may then display the data portion consistent with the workplace established setting. For instance, the data display option may be displaying on a display of an end user's real machine only a data portion consistent with a workplace appropriateness desirability setting such as "display only non-obscene data."

Figure 28:
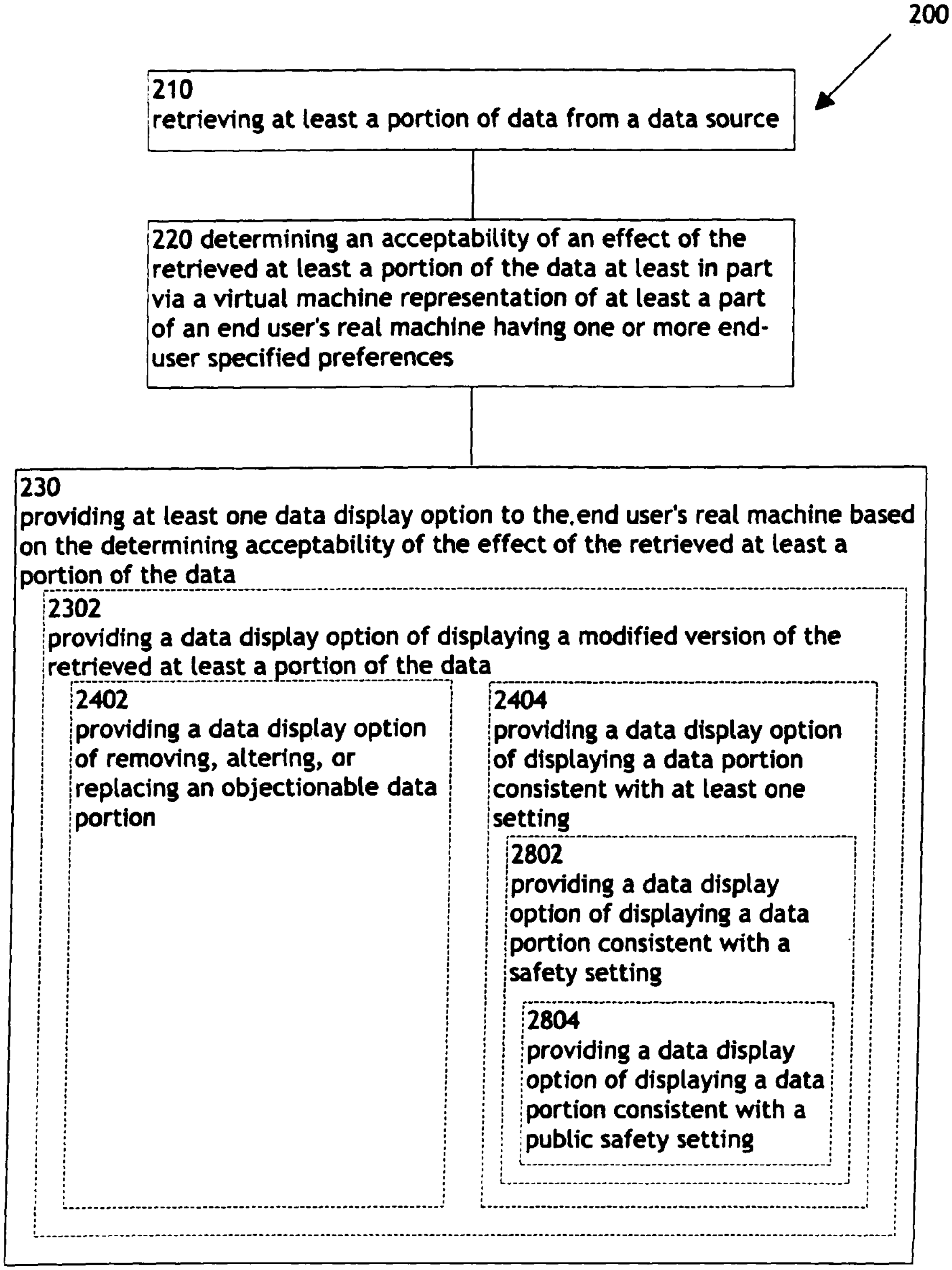
FIG. 28 illustrates an alternative embodiment of the operational flow of FIG. 2.

FIG. 28 illustrates alternative embodiments of the example operational flow 200 of FIG. 2. FIG. 28 illustrates example embodiments where the operation 230 may include at least one additional operation. Additional operations may include an operation 2802, and/or an operation 2804. The operation 2802 illustrates providing a data display option of displaying a data portion consistent with a safety setting. Continuing the example above, at least one of virtual machines 11, 12, and/or 13 may include one or more instruction generating modules configured to provide an instruction to the Effect of data acceptability determination engine 106 after a comparison of an activation of a link to a safety setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one safety setting, the data provider engine 108 (FIG. 1A) may transmit the modify data instruction to the data modification engine 122 (FIG. 1A) for modification of the data. Data modification engine 122 may transmit the modified data to the data provider engine 108. Data provider engine 108 may then display the data portion consistent with the safety setting. For instance, the data display option may be displaying on a display of an end user's real machine only a data portion consistent with child safety setting such as "display only non-violent data," or "display only ethnic and gender neutral data."

The operation 2804 illustrates providing a data display option of displaying a data portion consistent with a public safety setting. Continuing the example above, at least one of virtual machines 11, 12, and/or 13 may include one or more instruction generating modules configured to provide an instruction to the Effect of data acceptability determination engine 106 after a comparison of an activation of a link to a desirability setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one public safety setting, the data provider engine 108 (FIG. 1A) may transmit the modify data instruction to the data modification engine 122 (FIG. 1A) for modification of the data. Data provider engine 108 may then display the data portion consistent with the public safety setting. For instance, the data display option may be displaying on a display of an end user's real machine only a data portion consistent with public safety setting such as "display only non-confidential data."

Figure 29:
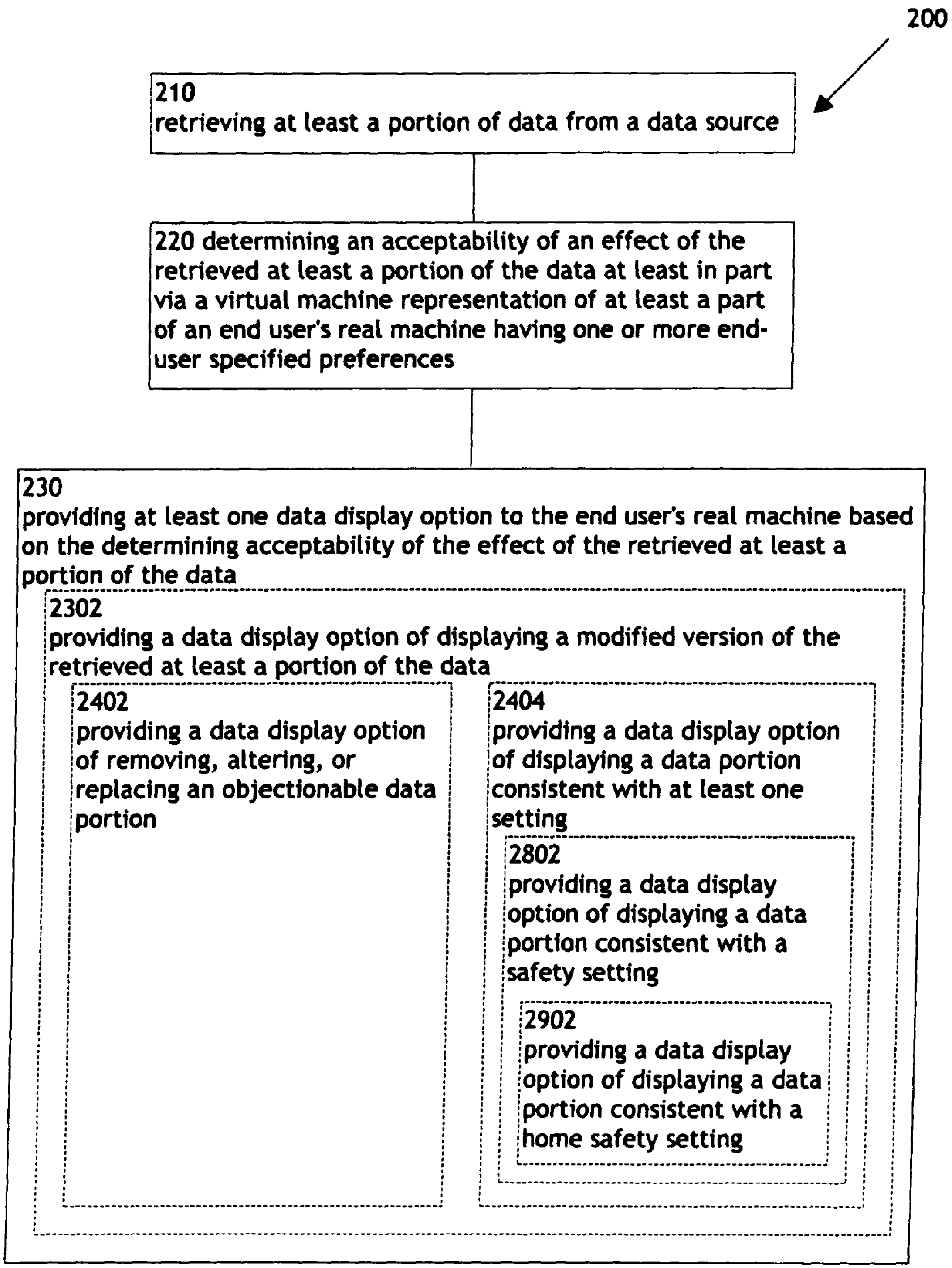
FIG. 29 illustrates an alternative embodiment of the operational flow of FIG. 2.

FIG. 29 illustrates alternative embodiments of the example operational flow 200 of FIG. 2. FIG. 29 illustrates example embodiments where the operation 230 may include at least one additional operation. Additional operations may include an operation 2902. The operation 2902 illustrates providing a data display option of displaying a data portion consistent with a home safety setting. Continuing the example above, Effect of data acceptability determination engine 106 may transfer effect of data acceptability determination to the data provider engine 108 to provide the data display option of displaying data consistent with at least one home safety setting. For instance, data provider engine 108 may receive at least one display instruction from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a home safety setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one home safety setting, the data provider engine 108 (FIG. 1A) may transmit the modify data instruction to the data modification engine 122 (FIG. 1A) for modification of the data. Data provider engine 108 may then display the data portion consistent with the home safety setting. For instance, the data display option may be displaying on a display of an end user's real machine only a data portion consistent with home safety setting such as "okay to display private or confidential data."

Figure 30:
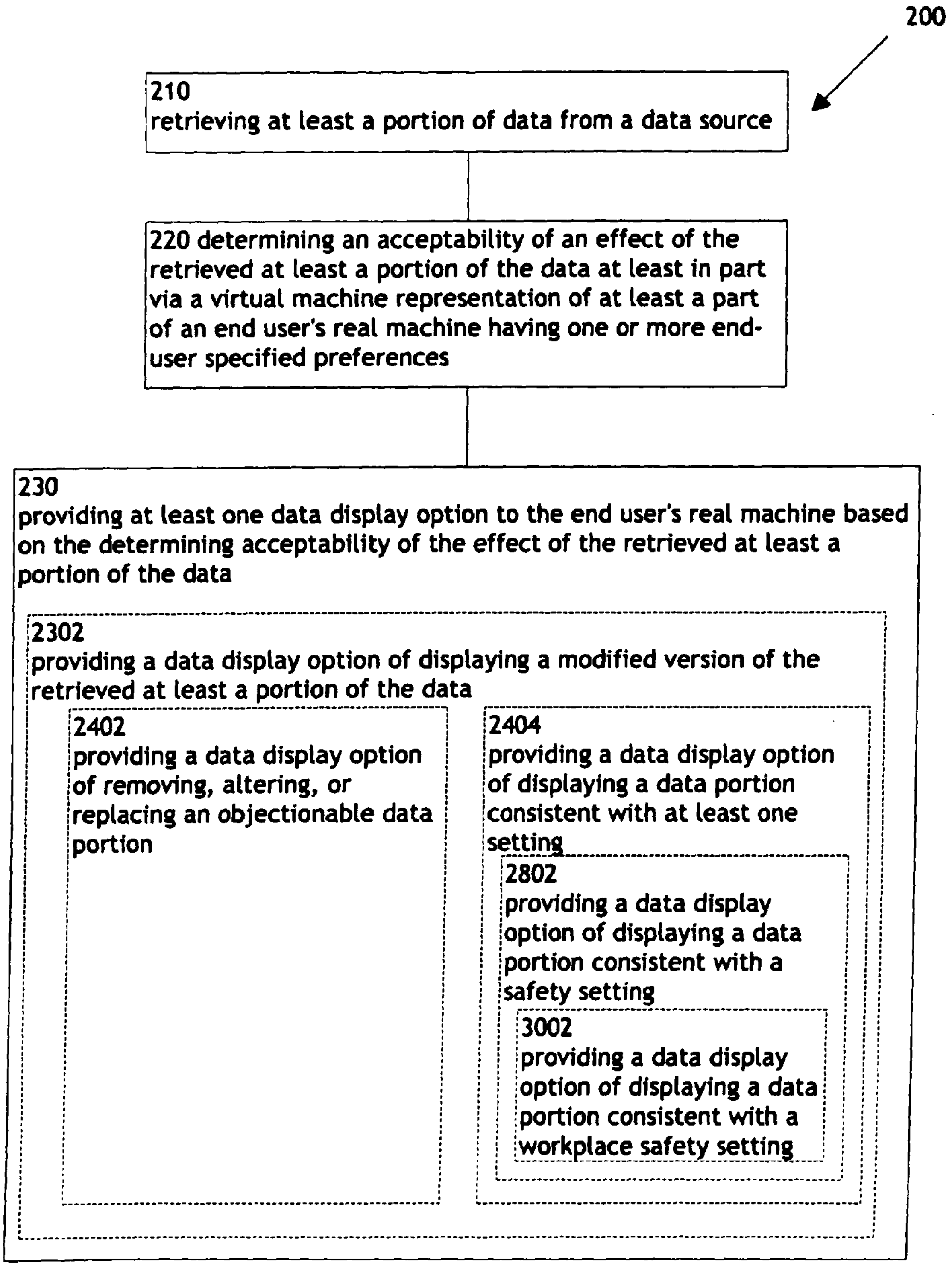
FIG. 30 illustrates an alternative embodiment of the operational flow of FIG. 2.

FIG. 30 illustrates alternative embodiments of the example operational flow 200 of FIG. 2. FIG. 30 illustrates example embodiments where the operation 230 may include at least one additional operation. Additional operations may include an operation 3002. The operation 3002 illustrates providing a data display option of displaying a data portion consistent with a workplace safety setting. Continuing the example above, Effect of data acceptability determination engine 106 may transfer effect of data acceptability determination to the data provider engine 108 to provide the data display option of displaying data consistent with at least one workplace safety setting. For instance, data provider engine 108 may receive at least one display instruction from at least one component of Effect of data acceptability determination engine 106 (FIG. 1A). Each of virtual machines 11, 12, and/or 13 may include one or more instruction generating modules configured to provide an instruction to the Effect of data acceptability determination engine 106 after a comparison of an activation of a link to a workplace safety setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one workplace safety setting, the data provider engine 108 (FIG. 1A) may transmit the modify data instruction to the data modification engine 122 (FIG. 1A) for modification of the data. Data provider engine 108 may then display the data portion consistent with the workplace safety setting. For instance, the data display option may be displaying on a display of an end user's real machine only a data portion consistent with a workplace safety setting such as "display only non-personal data."

Figure 31:
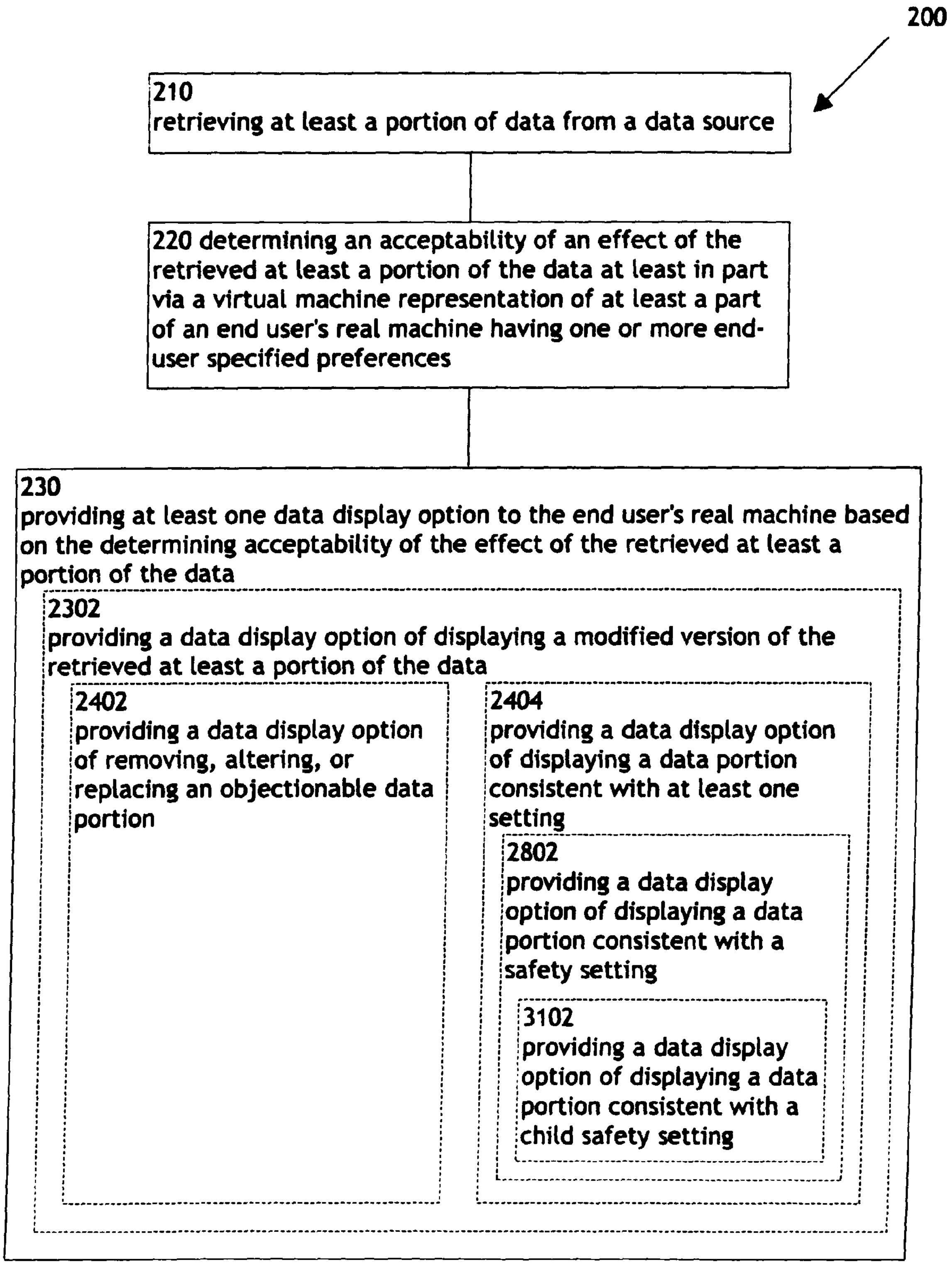
FIG. 31 illustrates an alternative embodiment of the operational flow of FIG. 2.

FIG. 31 illustrates alternative embodiments of the example operational flow 200 of FIG. 2. FIG. 31 illustrates example embodiments where the operation 230 may include at least one additional operation. Additional operations may include an operation 3102. The operation 3102 illustrates providing a data display option of displaying a data portion consistent with a child safety setting. Continuing the example above, Effect of data acceptability determination engine 106 may transfer effect of data acceptability determination to the data provider engine 108 to provide the data display option of displaying data consistent with at least one child safety setting. For instance, data provider engine 108 may receive at least one display instruction from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a child safety setting stored in a copy of the user preference database 120 (FIG. 1A) spawned on the virtual machine 11, 12, and/or 13. Effect of data acceptability determination engine 106 may communicate the display instruction to the data provider engine 108. If displayed data needs to be modified to be consistent with at least one child safety setting, the data provider engine 108 (FIG. 1A) may transmit the modify data instruction to the data modification engine 122 (FIG. 1A) for modification of the data. Data provider engine 108 may then display the data portion consistent with the child safety setting. For instance, the data display option may be displaying on a display of an end user's real machine only a data portion consistent with a child safety setting such as "display only non-violent data."

Figure 32:
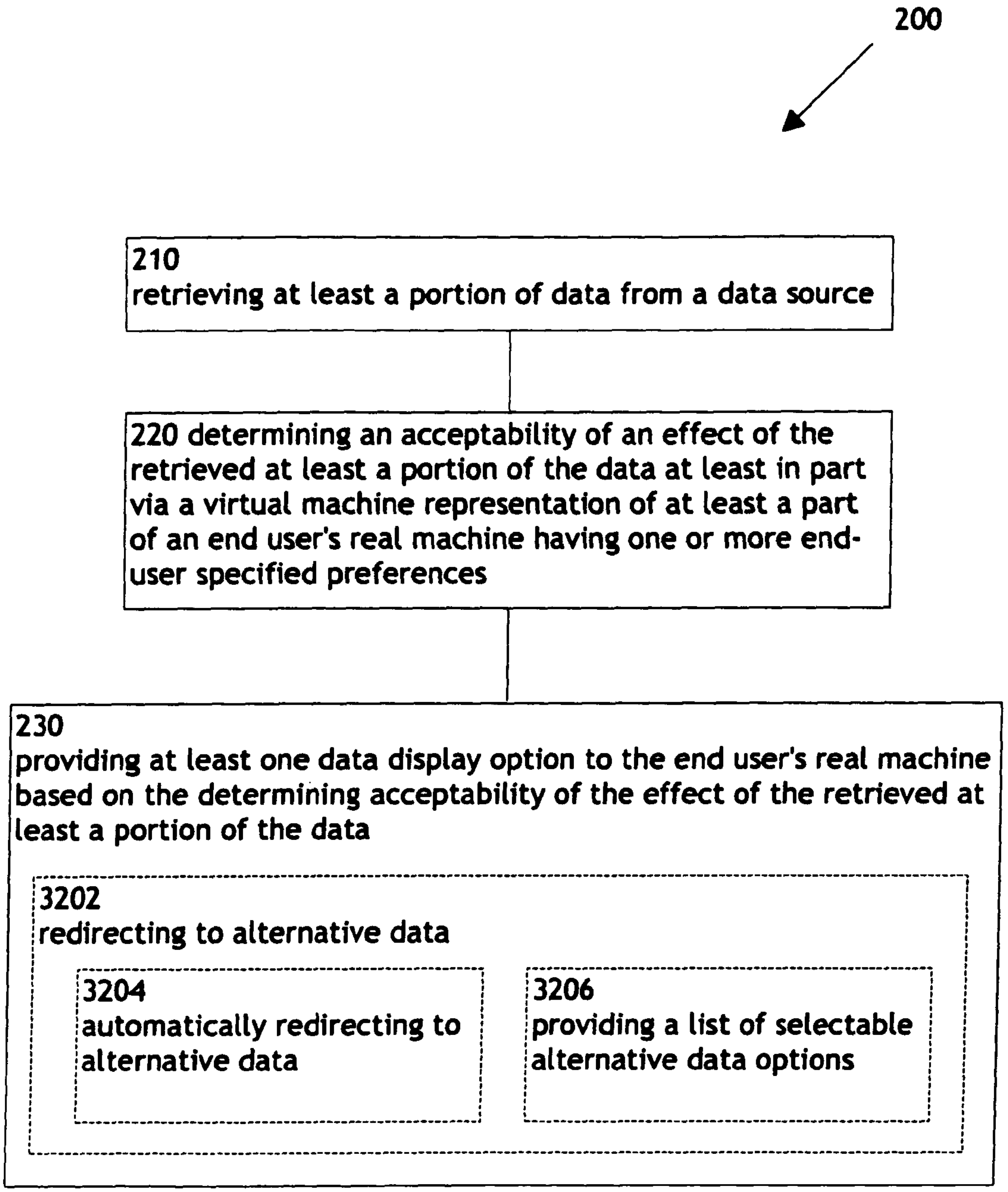
FIG. 32 illustrates an alternative embodiment of the operational flow of FIG. 2.

FIG. 32 illustrates alternative embodiments of the example operational flow 200 of FIG. 2. FIG. 32 illustrates example embodiments where the operation 230 may include at least one additional operation. Additional operations may include an operation 3202, an operation 3204, and/or an operation 3206.

The operation 3202 illustrates redirecting to alternative data. Continuing the example above, data provider engine 108 (FIG. 1A) may be in communication with Effect of data acceptability determination engine 106 (FIG. 1A), which may receive data from data retriever engine 102 (FIG. 1A). Effect of data acceptability determination engine 106 may transfer effect of data acceptability determination to the data provider engine 108, and an instruction to provide the data display option of redirecting to alternative data (e.g., another website). For instance, data provider engine 108 may receive at least one redirect instruction from at least one component of Effect of data acceptability determination engine 106 (FIG. 1A). Each of virtual machines 11, 12, and/or 13 may include one or more instruction generating modules configured to provide a redirect instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the redirect instruction to the data provider engine 108. The data provider engine 108 may transmit the redirect data instruction to the data redirection engine 128 for redirection to alternative data. The data redirection engine 128 may transmit the redirection to the data provider engine 108. Data provider engine 108 may then display the alternative data.

The operation 3204 illustrates automatically redirecting to alternative data. Continuing the example above, Effect of data acceptability determination engine 106 may transfer effect of data acceptability determination to the data provider engine 108 to provide the data display option of automatically redirecting to alternative data (e.g., another website) consistent with a user preference. For instance, data provider engine 108 may receive at least one automatically redirect instruction from at least one component of Effect of data acceptability determination engine 106 (FIG. 1A). At least one of virtual machines 11, 12, and/or 13 may include one or more instruction generating modules configured to provide an automatically redirect instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate an automatically redirect to alternative data consistent with the user preference instruction to the data provider engine 108. The data provider engine 108 may transmit the redirect instruction to the data redirection engine 128 for automatic redirection to alternative data consistent with the user preference. The data redirection engine 128 may transmit the automatic redirection to the data provider engine 108. Data provider engine 108 may then automatically (e.g., prior to alerting a user) display the alternative data. For instance, an end user's real machine 130 may be automatically redirected to an acceptable web link, or a page of acceptable data.

The operation 3206 illustrates providing a list of selectable alternative data options. Continuing the example above, Effect of data acceptability determination engine 106 may transfer effect of data acceptability determination to the data provider engine 108, and an instruction to provide the data display option of providing a list of selectable alternative data options (e.g., a list of alternative websites) consistent with a user preference. For instance, data provider engine 108 may receive at least one provide selectable alternatives instruction from at least one component of Effect of data acceptability determination engine 106 (FIG. 1A). At least one of virtual machines 11, 12, and/or 13 may include one or more instruction generating modules configured to transmit a provide selectable alternatives instruction to the Effect of data acceptability determination engine 106 after a comparison of an activation of a link to a user preference stored in a copy of the user preference database 120 (FIG. 1A) spawned on the virtual machine 11, 12, and/or 13. Effect of data acceptability determination engine 106 may communicate the provide selectable alternatives instruction to the data provider engine 108. The data provider engine 108 may transmit the provide selectable alternatives instruction to the data redirection engine 128 to provide selectable alternatives consistent with the user preference. The data redirection engine 128 may transmit the list of selectable alternatives to the data provider engine 108. Data provider engine 108 may then display the list of selectable alternatives. For instance, the list of selectable alternative data options may include a list of acceptable web links or a selectable list of web pages. Selectable web links and web pages may include a thumbnail image of the first page of the web link or of the web page.

Figure 33:
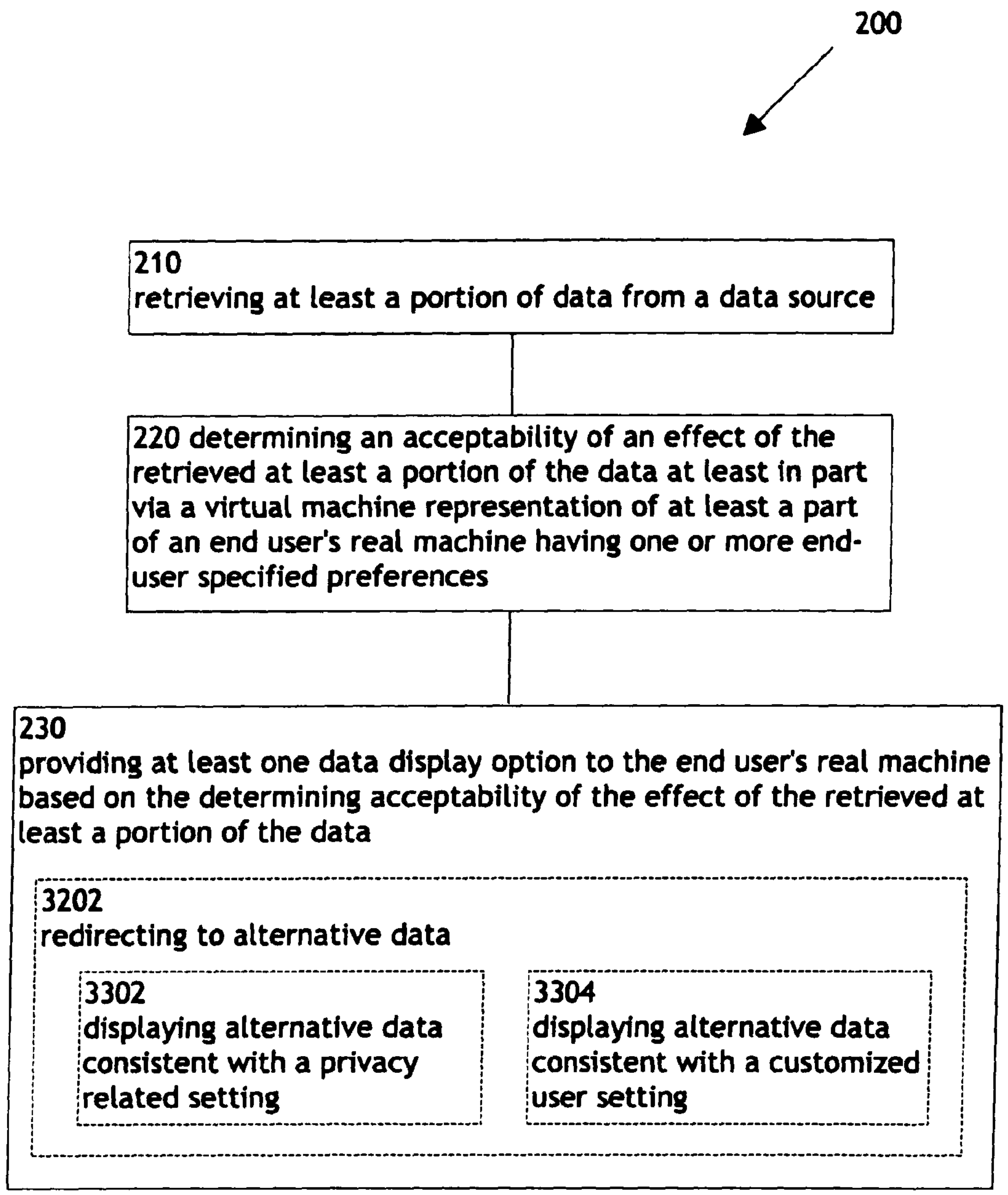
FIG. 33 illustrates an alternative embodiment of the operational flow of FIG. 2.

FIG. 33 illustrates alternative embodiments of the example operational flow 200 of FIG. 2. FIG. 33 illustrates example embodiments where the operation 230 may include at least one additional operation. Additional operations may include an operation 3302, and/or an operation 3304. The operation 3302 illustrates displaying alternative data consistent with a privacy related setting. Continuing the example above, Effect of data acceptability determination engine 106 may transfer effect of data acceptability determination to the data provider engine 108, and an instruction to provide the data display option of displaying data consistent with at least one privacy related setting. For instance, data provider engine 108 may receive at least one display instruction (e.g., OK to display webpage) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a privacy related setting stored in a copy of the user preference database 120 (FIG. 1A) spawned on the virtual machine 11, 12, and/or 13. Effect of data acceptability determination engine 106 may communicate the display instruction to the data provider engine 108. If data needs to be modified to be consistent with at least one privacy related setting, the data provider engine 108 may transmit the modify data instruction to the data modification engine 122 for modification of the data. Data modification engine 122 may transmit the modified data to the data provider engine 108. Data provider engine 108 may then display the data consistent with the privacy related setting. For instance, a portion of a returned webpage including data requesting private user information such as a user's social security number or e-mail address may be removed from the web page prior to display of the data on a computer screen. Further specific examples include a webpage or website data may be determined to be displayable if the data satisfies a setting such as a privacy related setting such as a setting relating to a user's biographical information or financial information, a webpage or website data may be determined to be displayable if the data satisfies a group privacy related setting such as a work group (e.g., employees of a company), a peer group (e.g., members of a book club), or a family group (e.g., members of family unit) privacy related setting, or a webpage or website data may be determined to be displayable if the data satisfies a privacy setting determined by a corporation or other organization to maintain corporate or organization privacy.

The operation 3304 illustrates displaying alternative data consistent with a customized user setting. Continuing the example above, Effect of data acceptability determination engine 106 may transfer effect of data acceptability determination to the data provider engine 108, and an instruction to provide the data display option of displaying data consistent with at least one customized user setting. For instance, data provider engine 108 may receive at least one display instruction (e.g., OK to display webpage) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a customized user setting stored in a copy of the user preference database 120 (FIG. 1A) spawned on the virtual machine 11, 12, and/or 13. Effect of data acceptability determination engine 106 may communicate the display instruction to the data provider engine 108. If data needs to be modified to be consistent with at least one customized user setting, the data provider engine 108 may transmit the modify data instruction to the data modification engine 122 for modification of the data. Data modification engine 122 may transmit the modified data to the data provider engine 108. Data provider engine 108 may then display the data consistent with the customized user setting. Thus, a webpage or website data may be determined to be displayable if the data satisfies a customized user setting when at least one of virtual machines 11, 12, and/or 13 compares the data to the customized user setting. For instance, a portion of a webpage produced by a search including non-English text may be removed from the web page prior to display of the data on a computer screen. Further, in one specific example, a webpage or website data may be determined to be displayable if the data satisfies a customized peer user setting, or a webpage or website data may be determined to be displayable if the data satisfies, for instance, a customized corporate user setting.

Figure 34:
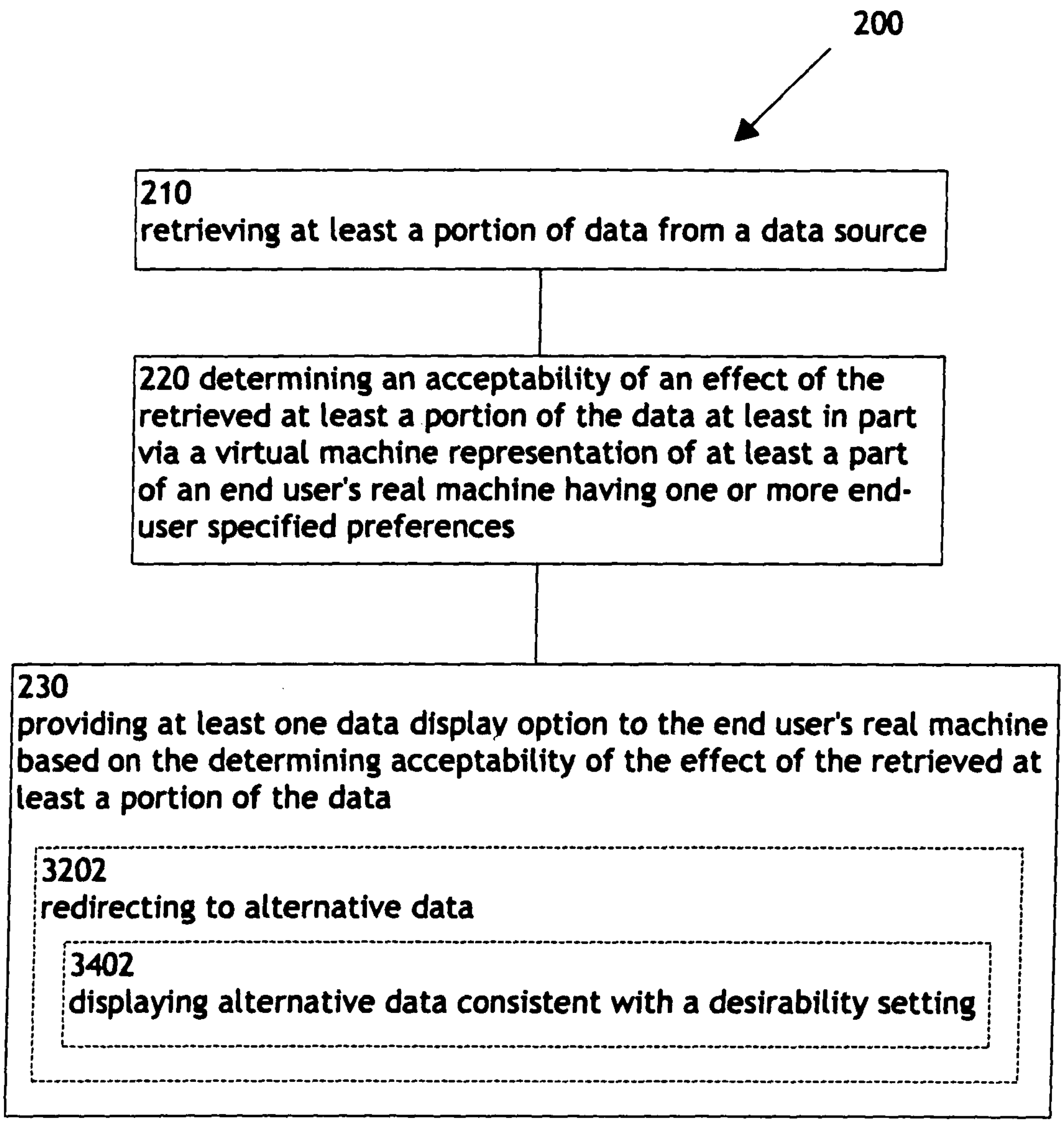
FIG. 34 illustrates an alternative embodiment of the operational flow of FIG. 2.

FIG. 34 illustrates alternative embodiments of the example operational flow 200 of FIG. 2. FIG. 34 illustrates example embodiments where the operation 230 may include at least one additional operation. Additional operations may include an operation 3402. The operation 3402 illustrates displaying alternative data consistent with a desirability setting. Continuing the example above, Effect of data acceptability determination engine 106 may transfer effect of data acceptability determination to the data provider engine 108, and an instruction to provide the data display option of displaying data consistent with at least one desirability setting. For instance, data provider engine 108 may receive at least one display instruction (e.g., OK to display image) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a desirability setting stored in a copy of the user preference database 120 (FIG. 1A) spawned on the virtual machine 11, 12, and/or 13. Effect of data acceptability determination engine 106 may communicate the display instruction to the data provider engine 108. If data needs to be modified to be consistent with at least one desirability setting, the data provider engine 108 may transmit the modify data instruction to the data modification engine 122 for modification of the data. Data modification engine 122 may transmit the modified data to the data provider engine 108. Data provider engine 108 may then display the data portion consistent with the desirability setting. For instance, the data display option may be displaying on a display of an end user's real machine only a data portion consistent with a Christian desirability setting such as "display only Christianity related data." In other examples, a webpage or website data may be determined to be displayable if the data satisfies a desirability setting, a webpage or website data may be determined to be displayable if the data satisfies a religious desirability setting such as a Christian, Jewish, and/or Muslim, based religious desirability setting, or may be based on any other major, minor or alternative religious desirability setting, a webpage or website data may be determined to be displayable if the data satisfies a political desirability setting such as a Republican, Democratic, Libertarian or Green Party political desirability setting, a webpage or website data may be determined to be displayable if the data satisfies a cultural desirability setting such as a religious, ethnic, regional, or heritage based cultural desirability setting or any other cultural desirability setting, a webpage or website data may be determined to be displayable if the data satisfies a theme related desirability setting such as boating or card games, or a webpage or website data may be determined to be displayable if the data satisfies an age appropriateness desirability setting such as a setting based on the Motion Picture of America Association film rating system.

Figure 35:
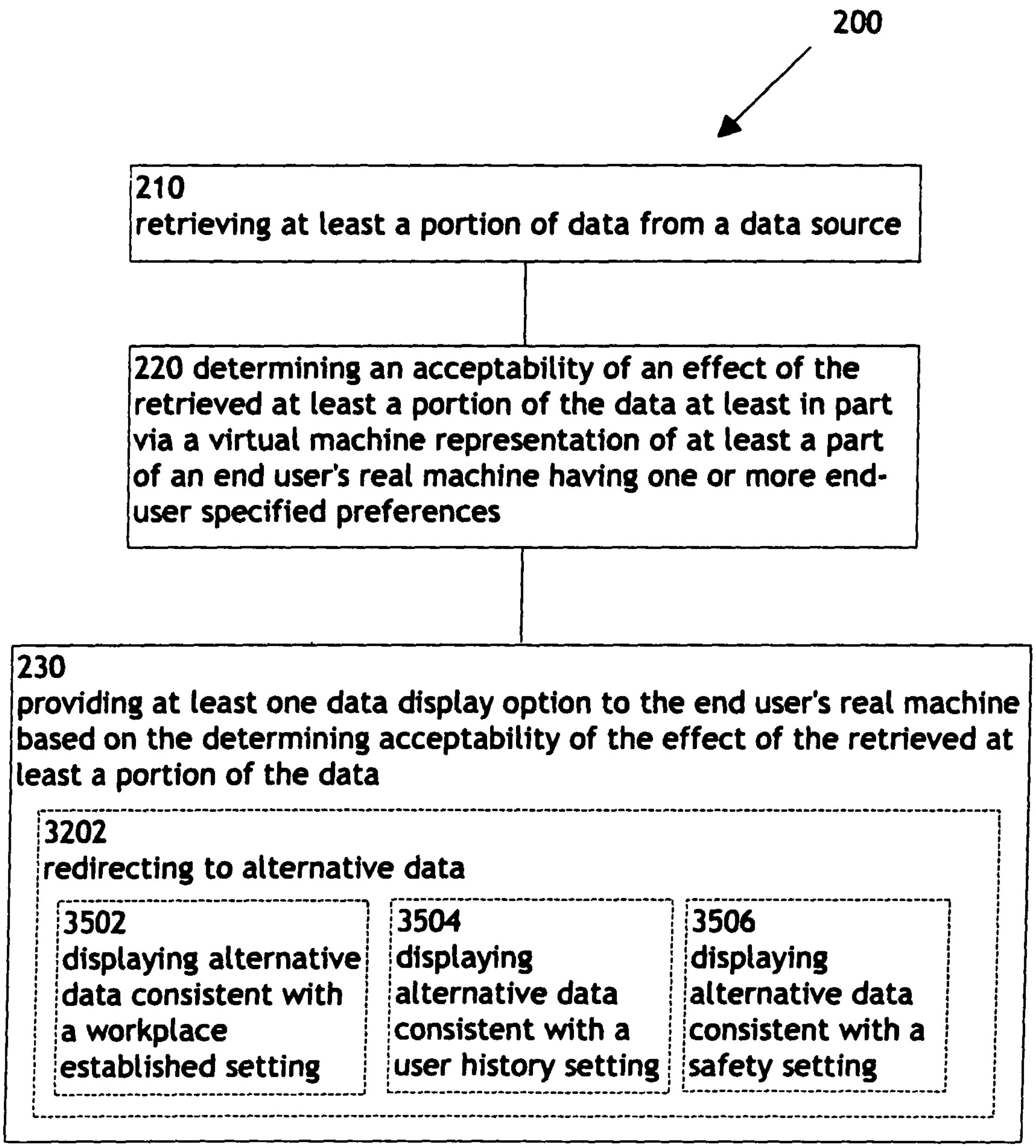
FIG. 35 illustrates an alternative embodiment of the operational flow of FIG. 2.

FIG. 35 illustrates alternative embodiments of the example operational flow 200 of FIG. 2. FIG. 35 illustrates example embodiments where the operation 230 may include at least one additional operation. Additional operations may include an operation 3502, an operation 3504, and/or an operation 3506. The operation 3502 illustrates displaying alternative data consistent with a workplace established setting. Continuing the example above, data provider engine 108 may receive at least one display instruction (e.g., do not display data) from at least one component of Effect of data acceptability determination engine 106 (FIG. 1A). At least one of virtual machines 11, 12, and/or 13 may include one or more instruction generating modules configured to provide an instruction to the Effect of data acceptability determination engine 106 after a comparison of an activation of a link to a workplace established setting stored in a copy of the user preference database 120 (FIG. 1A) spawned on the virtual machine 11, 12, and/or 13. Effect of data acceptability determination engine 106 may communicate the display instruction to the data provider engine 108. If data needs to be modified to be consistent with at least one workplace established setting, the data provider engine 108 may transmit the modify data instruction to the data modification engine 122 for modification of the data. Data modification engine 122 may transmit the modified data to the data provider engine 108. Data provider engine 108 may then display the data portion consistent with the workplace established setting. For instance, the data display option may be displaying on a display of an end user's real machine only a data portion consistent with a workplace appropriateness desirability setting such as "display only non-obscene data."

The operation 3504 illustrates displaying alternative data consistent with a user history setting. Continuing the example above, Effect of data acceptability determination engine 106 may transfer effect of data acceptability determination to the data provider engine 108, and an instruction to provide the data display option of redirecting to alternative data consistent with a user history setting (e.g., another website). For instance, data provider engine 108 may receive at least one redirect instruction from at least one component of Effect of data acceptability determination engine 106 (FIG. 1A). At least one of virtual machines 11, 12, and/or 13 may include one or more instruction generating modules configured to provide a redirect instruction to the Effect of data acceptability determination engine 106 after a comparison of an activation of a link to a user history setting stored in a copy of the user preference database 120 (FIG. 1A) spawned on the virtual machine 11, 12, and/or 13. Effect of data acceptability determination engine 106 may communicate the redirect to alternative data consistent with a user history setting instruction to the data provider engine 108. The data provider engine 108 may transmit the redirect data instruction to the data redirection engine 128 for redirection to alternative data consistent with a user history setting. The data redirection engine 128 may transmit the redirection to the data provider engine 108. Data provider engine 108 may then display the alternative data. For instance, displayed alternative data may be consistent with a user history such as having viewed only music related data and pages.

The operation 3506 illustrates displaying alternative data consistent with a safety setting. Continuing the example above, Effect of data acceptability determination engine 106 may transfer effect of data acceptability determination to the data provider engine 108, and an instruction to provide the data display option of redirecting to alternative data consistent with a safety setting (e.g., another website). For instance, data provider engine 108 may receive at least one redirect instruction from at least one component of Effect of data acceptability determination engine 106 (FIG. 1A). At least one of virtual machines 11, 12, and/or 13 may include one or more instruction generating modules configured to provide a redirect instruction to the Effect of data acceptability determination engine 106 after a comparison of an activation of a link to a safety setting stored in a copy of the user preference database 120 (FIG. 1A) spawned on the virtual machine 11, 12, and/or 13. Effect of data acceptability determination engine 106 may communicate the redirect to alternative data consistent with a safety setting instruction to the data provider engine 108. The data provider engine 108 may transmit the redirect data instruction to the data redirection engine 128 for redirection to alternative data consistent with a safety setting. The data redirection engine 128 may transmit the redirection to the data provider engine 108. Data provider engine 108 may then display the alternative data. Displaying alternative data consistent with a safety setting may include displaying a different webpage including only information consistent with a safety setting such as "do not display links requesting credit card information."

Figure 36:
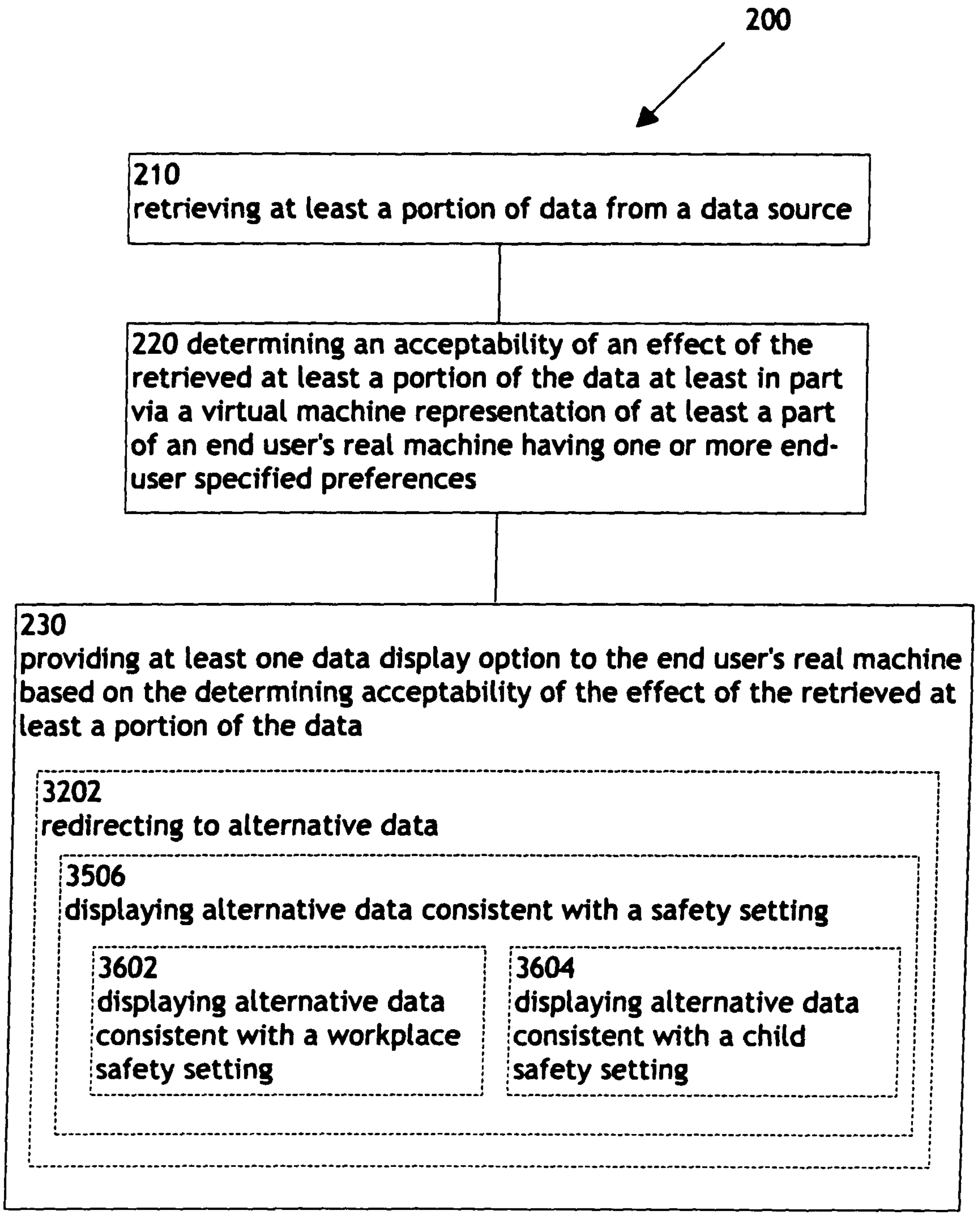
FIG. 36 illustrates an alternative embodiment of the operational flow of FIG. 2.

FIG. 36 illustrates alternative embodiments of the example operational flow 200 of FIG. 2. FIG. 36 illustrates example embodiments where the operation 230 may include at least one additional operation. Additional operations may include an operation 3602, and/or an operation 3604.

The operation 3602 illustrates displaying alternative data consistent with a workplace safety setting. Continuing the example above, Effect of data acceptability determination engine 106 may transfer effect of data acceptability determination to the data provider engine 108, and an instruction to provide the data display option of redirecting to alternative data consistent with a workplace safety setting (e.g., another website). For instance, data provider engine 108 may receive at least one redirect instruction from at least one component of Effect of data acceptability determination engine 106 (FIG. 1A). At least one of virtual machines 11, 12, and/or 13 may include one or more instruction generating modules configured to provide a redirect instruction to the Effect of data acceptability determination engine 106 after a comparison of an activation of a link to a workplace safety setting stored in a copy of the user preference database 120 (FIG. 1A) spawned on the virtual machine 11, 12, and/or 13. Effect of data acceptability determination engine 106 may communicate the redirect to alternative data consistent with a workplace safety setting instruction to the data provider engine 108. The data provider engine 108 may transmit the redirect data instruction to the data redirection engine 128 for redirection to alternative data consistent with a workplace safety setting. The data redirection engine 128 may transmit the redirection to the data provider engine 108. Data provider engine 108 may then display the alternative data. Displaying alternative data consistent with a workplace safety setting may include displaying a different webpage including only information consistent with a workplace safety setting such as "do not display links requesting information on this computer."

The operation 3604 illustrates displaying alternative data consistent with a child safety setting. Continuing the example above, Effect of data acceptability determination engine 106 may transfer effect of data acceptability determination to the data provider engine 108 to provide the data display option of redirecting to alternative data consistent with a child safety setting (e.g., another website). For instance, data provider engine 108 may receive at least one redirect instruction from at least one component of Effect of data acceptability determination engine 106 (FIG. 1A). At least one of virtual machines 11, 12, and/or 13 may include one or more instruction generating modules configured to provide a redirect instruction to the Effect of data acceptability determination engine 106 after a comparison of an activation of a link to a child safety setting stored in a copy of the user preference database 120 (FIG. 1A) spawned on the virtual machine 11, 12, and/or 13. Effect of data acceptability determination engine 106 may communicate the redirect to alternative data consistent with a child safety setting instruction to the data provider engine 108. The data provider engine 108 may transmit the redirect data instruction to the data redirection engine 128 for redirection to alternative data consistent with a child safety setting. The data redirection engine 128 may transmit the redirection to the data provider engine 108. Data provider engine 108 may then display the alternative data. Displaying alternative data consistent with a child safety setting may include displaying a different webpage including only information consistent with a child safety setting such as "do not display links containing trailers for rated 'R' movies."

Figure 37:
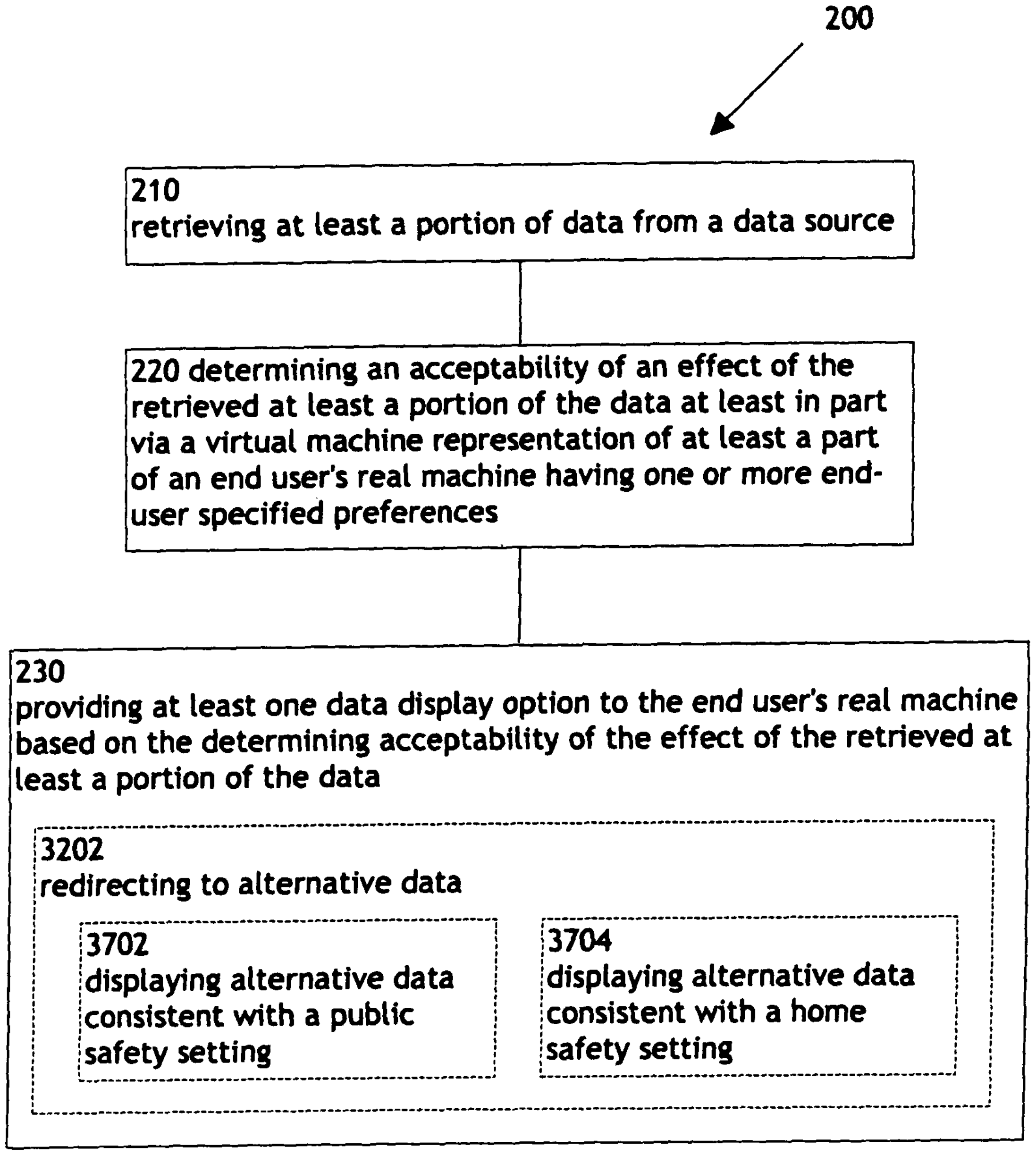
FIG. 37 illustrates an alternative embodiment of the operational flow of FIG. 2.

FIG. 37 illustrates alternative embodiments of the example operational flow 200 of FIG. 2. FIG. 36 illustrates example embodiments where the operation 230 may include at least one additional operation. Additional operations may include an operation 3702, and/or an operation 3704. The operation 3702 illustrates displaying alternative data consistent with a public safety setting. Continuing the example above, at least one of virtual machines 11, 12, and/or 13 may include one or more instruction generating modules configured to provide a redirect instruction to the Effect of data acceptability determination engine 106 after a comparison of an activation of a link to a public safety setting stored in a copy of the user preference database 120 (FIG. 1A) spawned on the virtual machine 11, 12, and/or 13. Effect of data acceptability determination engine 106 may communicate the redirect to alternative data consistent with a public safety setting instruction to the data provider engine 108. The data provider engine 108 may transmit the redirect data instruction to the data redirection engine 128 for redirection to alternative data consistent with a public safety setting. The data redirection engine 128 may transmit the redirection to the data provider engine 108. Data provider engine 108 may then display the alternative data Displaying alternative data consistent with a public safety setting may include displaying a different webpage including only information consistent with a public safety setting such as "display only non-confidential data." Public safety setting may include a transmittable information safety setting, a viewable information safety setting and a receivable information safety setting. Transmittable or viewable information may be private user information, such as credit card numbers, bank accounts, personal identification information or any other personal user information. Receivable information may be any information such as text, images, a virus, spyware, or any other information that a user's real machine may be capable of receiving from an external source.

The operation 3704 illustrates displaying alternative data consistent with a home safety setting. Continuing the example above, Effect of data acceptability determination engine 106 may transfer effect of data acceptability determination to the data provider engine 108, and an instruction to provide the data display option of redirecting to alternative data consistent with a public safety setting (e.g., another website). For instance, data provider engine 108 may receive at least one redirect instruction from at least one component of Effect of data acceptability determination engine 106 (FIG. 1A). Effect of data acceptability determination engine 106 may transfer effect of data acceptability determination to the data provider engine 108, and an instruction to provide the data display option of redirecting to alternative data consistent with a home safety setting (e.g., another website). For instance, data provider engine 108 may receive at least one redirect instruction from at least one component of Effect of data acceptability determination engine 106 (FIG. 1A). At least one of virtual machines 11, 12, and/or 13 may include one or more instruction generating modules configured to provide a redirect instruction to the Effect of data acceptability determination engine 106 after a comparison of an activation of a link to a home safety setting stored in a copy of the user preference database 120 (FIG. 1A) spawned on the virtual machine 11, 12, and/or 13. Effect of data acceptability determination engine 106 may communicate the redirect to alternative data consistent with a home safety setting instruction to the data provider engine 108. The data provider engine 108 may transmit the redirect data instruction to the data redirection engine 128 for redirection to alternative data consistent with a home safety setting. The data redirection engine 128 may transmit the redirection to the data provider engine 108. Data provider engine 108 may then display the alternative data. Displaying alternative data consistent with a home safety setting may include displaying a different webpage including only information consistent with a home safety setting such as "do not display links requesting address information."

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to claims containing only one such recitation, even when the same claim includes the introductory phrases “one or more” or “at least one” and indefinite articles such as “a” or “an” (e.g., “a” and/or “an” should typically be interpreted to mean “at least one” or “one or more”); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of “two recitations,” without other modifiers, typically means at least two recitations, or two or more recitations). Furthermore, in those instances where a convention analogous to “at least one of A, B, and C, etc.” is used, in general such a construction is intended in the sense one having skill in the art would understand the convention (e.g., “a system having at least one of A, B, and C” would include but not be limited to systems that have A alone, B alone, C alone, A and B together, A and C together, B and C together, and/or A, B, and C together, etc.). In those instances where a convention analogous to “at least one of A, B, or C, etc.” is used, in general such a construction is intended in the sense one having skill in the art would understand the convention (e.g., “a system having at least one of A, B, or C” would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase “A or B” will be typically understood to include the possibilities of “A” or “B” or “A and B.”

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

What is claimed is:

1. A computationally-implemented system, implemented in a processor, comprising:

a data retriever engine configured to retrieve at least a portion of data from a data source in response to an activation of at least one link;

an effect of content acceptability determination engine implemented in a processing device configured to determine an acceptability of an effect of the retrieved at least a portion of data on at least a part of at least one real machine at least in part via determining a state change of a virtual machine representation of at least a part of the at least one real machine after loading the at least a portion of data; and a data provider engine configured to display at least one data display option to the end user’s real machine based on a determination of an acceptability of an effect of the retrieved at least a portion of data.

2. The computationally-implemented system of claim 1, wherein the effect of content acceptability determination is further configured to determine an acceptability of an effect of the retrieved at least a portion of data on at least one real machine at least in part via determining a state change in on at least two virtual machine representations of at least a part of the least one real machine.

3. The computationally-implemented system of claim 2, wherein the at least two virtual machine representations of at least a part of the least one real machine include:

at least two virtual machine representations of at least a part of the least one real machine, at least one of the at least two virtual machine representations operating on a separate core of a system comprising at least two cores.

4. The computationally-implemented system of claim 2, wherein the at least two virtual machine representations of at least a part of the at least one real machine includes:

at least two virtual machine representations of at least a part of the at least one real machine having at least one of the at least two virtual machine representations operating on a separate operating system.

5. The computationally-implemented system of claim 4, wherein the at least one of the at least two virtual machine representations operating on a separate operating system includes:

at least one of the at least two virtual machine representations operating on a separate operating system at a location of the retrieved at least a portion of data.

6. The computationally-implemented system of claim 4, wherein the at least one of the at least two virtual machine representations operating on a separate operating system each running on a separate operating system includes:

at least one of the at least two virtual machine representations operating on a separate operating system at a location geographically distinct from a location of the retrieved at least a portion of data.

7. The computationally-implemented system of claim 1, wherein the determining a state change of a virtual machine representation of at least a part of the least one real machine after loading at least a portion of data includes:

determining a state of a virtual machine representation of at least a part of the least one real machine prior to loading at least a portion of data.

8. The computationally-implemented system of claim 1, wherein the determining a state change of a virtual machine representation of at least a part of the least one real machine after loading at least a portion of data includes:

determining a state of a virtual machine representation of at least a part of the least one real machine after loading at least a portion of data.

9. The computationally-implemented system of claim 1, wherein the determining a state change of a virtual machine representation of at least a part of the least one real machine after loading at least a portion of data includes:

determining whether the state change is an undesirable state change based on one or more end-user specified preferences.

10. The computationally-implemented system of claim 1, wherein the effect of content acceptability determination engine is further configured to determine an acceptability of an effect of the retrieved at least a portion of data on at least one real machine at least in part via determining a state change in a virtual machine representation of at least a part of an end user's real machine within an acceptable amount of user interface time.

11. The computationally-implemented system of claim 10, wherein the acceptable amount of user interface time is approximately one-tenth of a second.

12. The computationally-implemented system of claim 10, wherein the acceptable amount of user interface time is less than approximately 1 second.

13. The computationally-implemented system of claim 1, wherein the effect of content acceptability determination is further configured to determine an acceptability of an effect of the retrieved at least a portion of data on at least one real machine in response to at least one user setting.

14. The computationally-implemented system of claim 13, wherein the at least one user setting includes:

a desirability setting.

15. The computationally-implemented system of claim 14, wherein the desirability setting includes:

a religious desirability setting.

16. The computationally-implemented system of claim 14, wherein the desirability setting includes:

a political desirability setting.

17. The computationally-implemented system of claim 14, wherein the desirability setting includes:

a cultural desirability setting.

18. The computationally-implemented system of claim 14, wherein the desirability setting includes:

a theme related desirability setting.

19. The computationally-implemented system of claim 1, wherein the effect of content acceptability determination engine is further configured to determine an acceptability of an effect of the retrieved at least a portion of data on at least one real machine in response to at least one privacy related setting.

20. The computationally-implemented system of claim 19, wherein the at least one privacy related setting includes:

a type of transmitted user information.

21. The computationally-implemented system of claim 19, wherein the at least one privacy related setting includes:

a type of captured user information.

22. The computationally-implemented system of claim 19, wherein the at least one privacy related setting includes:

a type of exposed user information.

23. The computationally-implemented system of claim 1, wherein the effect of content acceptability determination engine is further configured to determine an acceptability of an effect of the retrieved at least a portion of data on at least one real machine in response to visually examining a data image.

24. The computationally-implemented system of claim 1, wherein the effect of content acceptability determination engine is further configured to determine an acceptability of an effect of the retrieved at least a portion of data on at least one real machine at least in part via a virtual machine representation of at least a portion of content of the real machine.

25. The computationally-implemented system of claim 1, wherein the effect of content acceptability determination engine is further configured to determine an acceptability of an effect of the retrieved at least a portion of data on at least one real machine at least in part via a virtual machine representation of at least a portion of software of the real machine.

26. The computationally-implemented system of claim 1, wherein the effect of content acceptability determination engine is further configured to determine an acceptability of an effect of the retrieved at least a portion of data on at least one real machine at least in part via a virtual machine representation of at least a portion of hardware of the real machine.

27. The computationally-implemented system of claim 1, wherein the effect of content acceptability determination engine is further configured to determine an acceptability of an effect of the retrieved at least a portion of data on at least one real machine at least in part via a virtual machine representation of at least a portion of an operating system of the real machine.

28. The computationally implemented system of claim 1, wherein the effect of content acceptability determination engine is further configured to determine an acceptability of an effect of the retrieved at least a portion of data on at least one real machine at least in part via a virtual machine representation of at least a portion of at least a portion of a computing device.

29. The computationally-implemented system of claim 1, wherein the data provider engine is further configured to provide a data display option of displaying the retrieved at least a portion of data.

30. The computationally-implemented system of claim 1, wherein the data provider engine is further configured to provide a data display option of not displaying the retrieved at least a portion of data.

31. The computationally-implemented system of claim 1, wherein the data provider engine is further configured to provide a data display option of displaying a modified version of the retrieved at least a portion of data.

32. The computationally-implemented system of claim 31, wherein the data display option of displaying a modified version of the retrieved at least a portion of data includes:

a data obfuscation engine configured to provide a data display option of obfuscating an objectionable data portion.

33. The computationally-implemented system of claim 31, wherein the data display option of displaying a modified version of the retrieved at least a portion of data includes:

a data display option of anonymizing an objectionable data portion.

34. The computationally-implemented system of claim 1, wherein the data provider engine is further configured to redirect to alternative data.

35. The computationally-implemented system of claim 34, wherein the alternative data includes:

a list of selectable alternative data options.

* * * * *

UNITED STATES PATENT AND TRADEMARK OFFICE

CERTIFICATE OF CORRECTION

PATENT NO. : 8,489,981 B2
APPLICATION NO. : 12/214784
DATED : July 16, 2013
INVENTOR(S) : Gary W. Flake et al.

It is certified that error appears in the above-identified patent and that said Letters Patent is hereby corrected as shown below:

In the Claims:

Claim 32, Column 52, Line 48:
Please delete "a data obfuscation engine configured to provide..."

Signed and Sealed this
First Day of October, 2013

Teresa Stanek Rea
*Deputy Director of the United States Patent and Trademark Office*